United States Patent
Christie et al.

(10) Patent No.: US 8,970,503 B2
(45) Date of Patent: *Mar. 3, 2015

(54) GESTURES FOR DEVICES HAVING ONE OR MORE TOUCH SENSITIVE SURFACES

(75) Inventors: Greg Christie, Cupertino, CA (US); Wayne Carl Westerman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1084 days.

This patent is subject to a terminal disclaimer.

(21) Appl. No.: 11/818,466

(22) Filed: Jun. 13, 2007

(65) Prior Publication Data

US 2008/0165255 A1    Jul. 10, 2008

Related U.S. Application Data

(60) Provisional application No. 60/878,828, filed on Jan. 5, 2007.

(51) Int. Cl.
*G06F 3/041* (2006.01)
*G06F 3/0488* (2013.01)
*G09G 5/08* (2006.01)
*G09G 5/34* (2006.01)

(52) U.S. Cl.
CPC .. *G06F 3/04883* (2013.01); *G06F 2203/04808* (2013.01); *G09G 5/08* (2013.01); *G09G 5/34* (2013.01); *G09G 2340/0407* (2013.01); *G09G 2340/045* (2013.01); *G09G 2340/0464* (2013.01)
USPC ........................................ 345/173; 178/18.01

(58) Field of Classification Search
USPC ............................. 345/173; 178/17–20, 18.01
See application file for complete search history.

(56) References Cited

U.S. PATENT DOCUMENTS

| | | |
|---|---|---|
| 5,335,557 A | 8/1994 | Yasutake |
| 5,421,213 A | 6/1995 | Okada |
| 5,483,261 A | 1/1996 | Yasutake |
| 5,488,204 A | 1/1996 | Mead et al. |
| 5,590,219 A | 12/1996 | Gourdol |
| 5,612,719 A | 3/1997 | Beernink et al. |
| 5,805,137 A | 9/1998 | Yasutake |
| 5,808,567 A | 9/1998 | McCloud |
| 5,825,352 A | 10/1998 | Bisset et al. |

(Continued)

FOREIGN PATENT DOCUMENTS

| | | | |
|---|---|---|---|
| EP | 0156593 A2 * | 10/1985 | ............ G06F 3/037 |
| EP | 0 665 508 A2 | 8/1995 | |

(Continued)

OTHER PUBLICATIONS

Non-Final Office Action mailed Apr. 5, 2012, for U.S. Appl. No. 13/372,452, filed Feb. 13, 2012, four pages.

(Continued)

*Primary Examiner* — Adam J Snyder
(74) *Attorney, Agent, or Firm* — Morrison & Foerster LLP

(57) ABSTRACT

Rolling gestures on a touch sensitive surface of a device can be used to control the device or to remotely control another device. The device detects a roll, determines a parameter of the roll and performs an operation relating to the device or the other device based on the determined parameter. The touch sensitive surface of the device can be positioned on the device to enable a set of gestures for configuring the operation of the device, for operating the device and for enabling additional gestures for operating the device.

19 Claims, 36 Drawing Sheets

(56) References Cited

U.S. PATENT DOCUMENTS

| | | | |
|---|---|---|---|
| 5,835,079 A | 11/1998 | Shieh | |
| 5,880,411 A | 3/1999 | Gillespie et al. | |
| 5,942,733 A | 8/1999 | Allen et al. | |
| 6,188,391 B1 | 2/2001 | Seely et al. | |
| 6,268,857 B1 | 7/2001 | Fishkin et al. | |
| 6,278,443 B1* | 8/2001 | Amro et al. | 345/173 |
| 6,310,610 B1 | 10/2001 | Beaton et al. | |
| 6,323,846 B1 | 11/2001 | Westerman et al. | |
| 6,378,381 B1 | 4/2002 | Okada et al. | |
| 6,392,636 B1* | 5/2002 | Ferrari et al. | 345/173 |
| 6,597,347 B1 | 7/2003 | Yasutake | |
| 6,597,384 B1 | 7/2003 | Harrison | |
| 6,690,387 B2 | 2/2004 | Zimmerman et al. | |
| 6,750,848 B1 | 6/2004 | Pryor | |
| 6,950,539 B2* | 9/2005 | Bjorn et al. | 345/157 |
| 7,015,894 B2 | 3/2006 | Morohoshi | |
| 7,084,856 B2 | 8/2006 | Huppi | |
| 7,184,064 B2 | 2/2007 | Zimmerman et al. | |
| 7,312,785 B2 | 12/2007 | Tsuk et al. | |
| 7,345,671 B2 | 3/2008 | Robbin et al. | |
| 7,663,607 B2 | 2/2010 | Hotelling et al. | |
| 7,694,231 B2* | 4/2010 | Kocienda et al. | 715/773 |
| 8,144,129 B2 | 3/2012 | Hotelling et al. | |
| 8,479,122 B2 | 7/2013 | Hotelling et al. | |
| 2002/0015024 A1* | 2/2002 | Westerman et al. | 345/173 |
| 2002/0176016 A1 | 11/2002 | Misawa et al. | |
| 2002/0190727 A1 | 12/2002 | Morimoto | |
| 2003/0137494 A1* | 7/2003 | Tulbert | 345/173 |
| 2004/0012579 A1* | 1/2004 | Nagasaka et al. | 345/204 |
| 2004/0055396 A1 | 3/2004 | Morimoto | |
| 2004/0140984 A1* | 7/2004 | Hinckley et al. | 345/684 |
| 2004/0164954 A1 | 8/2004 | Rekimoto | |
| 2005/0104867 A1* | 5/2005 | Westerman et al. | 345/173 |
| 2005/0264538 A1 | 12/2005 | Yeh | |
| 2006/0026521 A1* | 2/2006 | Hotelling et al. | 715/702 |
| 2006/0026535 A1 | 2/2006 | Hotelling et al. | |
| 2006/0044260 A1 | 3/2006 | Harley et al. | |
| 2006/0044280 A1* | 3/2006 | Huddleston et al. | 345/173 |
| 2006/0066588 A1 | 3/2006 | Lyon et al. | |
| 2006/0097991 A1 | 5/2006 | Hotelling et al. | |
| 2006/0103633 A1 | 5/2006 | Gioeli | |
| 2006/0111093 A1 | 5/2006 | Shim et al. | |
| 2006/0176270 A1 | 8/2006 | Sachs | |
| 2006/0197750 A1 | 9/2006 | Kerr et al. | |
| 2006/0197753 A1 | 9/2006 | Hotelling | |
| 2006/0238517 A1 | 10/2006 | King et al. | |
| 2006/0238522 A1 | 10/2006 | Westerman et al. | |
| 2007/0080953 A1* | 4/2007 | Lii | 345/173 |
| 2007/0097096 A1* | 5/2007 | Rosenberg | 345/173 |
| 2007/0182722 A1 | 8/2007 | Hotelling et al. | |
| 2007/0198926 A1 | 8/2007 | Joguet et al. | |
| 2007/0273658 A1* | 11/2007 | Yli-Nokari et al. | 345/173 |
| 2008/0042978 A1 | 2/2008 | Perez-Noguera | |
| 2008/0158172 A1 | 7/2008 | Hotelling et al. | |
| 2008/0309634 A1 | 12/2008 | Hotelling et al. | |
| 2012/0139860 A1 | 6/2012 | Hotelling et al. | |

FOREIGN PATENT DOCUMENTS

| | | |
|---|---|---|
| EP | 0 665 508 A3 | 8/1995 |
| EP | 0 665 508 B1 | 8/1995 |
| EP | 1 418 491 A2 | 5/2004 |
| EP | 1 418 491 A3 | 5/2004 |
| EP | 1 445 682 A2 | 8/2004 |
| EP | 1 445 682 A3 | 8/2004 |
| JP | 2000-163031 A | 6/2000 |
| JP | 2002-342033 A | 11/2002 |
| WO | WO-97/18547 A1 | 5/1997 |
| WO | WO-2004/053782 A1 | 6/2004 |
| WO | WO-2004/114105 A2 | 12/2004 |
| WO | WO-2004/114105 A3 | 12/2004 |
| WO | WO-2005/114624 A2 | 12/2005 |
| WO | WO-2005/114624 A3 | 12/2005 |
| WO | WO-2006/013485 A2 | 2/2006 |
| WO | WO-2006/075267 A2 | 7/2006 |
| WO | WO-2006/075267 A3 | 7/2006 |
| WO | WO-2006/096501 A1 | 9/2006 |
| WO | WO-2008/085789 A2 | 7/2008 |
| WO | WO-2008/085789 A3 | 7/2008 |
| WO | WO-2008/085790 A2 | 7/2008 |

OTHER PUBLICATIONS

International Search Report mailed Mar. 30, 2009, for PCT Application No. PCT/US2007/089173, filed Dec. 28, 2007, nine pages.
Non-Final Office Action mailed Feb. 16, 2011, for U.S. Appl. No. 11/818,499, filed Jun. 13, 2007, 12 pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.
Rubine, D.H. (May 1992). "Combining Gestures and Direct Manipulation," CHI ' 92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Final Office Action mailed Sep. 7, 2012, for U.S. Appl. No. 13/372,452, filed Feb. 13, 2012, 14 pages.
Notice of Allowance mailed Oct. 18, 2011, for U.S. Appl. No. 11/818,499, 7 pages.
P. Dietz, et al., "DiamondTouch: A Multi-User Touch Technology," UIST 2001, pp. 219-226.
M. Fukumoto, et al., "Body Coupled FingeRing: Wireless Wearable Keyboard," Computer Human Interaction, 1997.
J. Rekimoto, "SmartSkin: An Infrastructure for Freehand Manipulation on Interactive Surfaces," Computer Human Interaction, 2002.
J. Rekimoto, et al., ToolStone: Effective Use of the Physical Manipulation Vocabularies of Input Devices, UIST 2000, pp. 109-117.
D. Rubine, et al., "Programmable Finger-tracking Instrument Controllers," Computer Music Journal, vol. 14, No, 1, Spring 1990.
Non-Final Office Action mailed Apr. 16, 2014, for U.S. Appl. No. 13/372,452, filed Feb. 13, 2012, 15 pages.
Anonymous. (2008). NoviiRemote Deluxe Review from The Gadgeteer.com located at <http://www.novii.tv/news/article//allarticle/article5/ . . . >, last visited May 8, 2008, six pages.
Anonymous. (Feb. 21, 2008). "Apple iPhone Trackpad Turns into PC Remote Control," Video Review located at <http://www.phonesreview.co.uk/2008/02/21/video-apple-iphone-trackpad-turns-into-pc-remote-control-download-it-now . . . >, last visited Apr. 18, 2008, three pages.
Hromadka, J. (Jul. 6, 2005). "NoviiRemote Blaster," Treocentral.com, located at <http://www.treocentral.com/content/Stories/630-1.html>, last visited May 8, 2008, three pages.
Iftode, L. et al. (2008). "Smart Phone: An Embedded System for Universal Interactions," *Rutger's University, Department of Computer Science*, seven pages.
International Search Report mailed Nov. 26, 2008, for PCT Application No. PCT/US2007/089172, filed Dec. 28, 2007, six pages.
Izadi, S. et al. (2007). "C-Slate: A Multi-Touch and Object Recognition System for Remote Collaboration using Horizontal Surfaces," *Microsoft Research—Cambridge*, eight pages.
Sellers, D. (Mar. 2, 2006). "Apple Files New Patent for Wide Touchpad for Notebooks," *Macsimum News*, located at <http://www.macsimumnews.com/index.php/archive/apple_files_new_patent_for_wide_touchpad_for_notebooks/>, last visited Apr. 11, 2008, 11 pages.
Webb, W. (Jan. 10, 2005), "Smart Phones: The Next Embedded Interface," Forbes.com, located at <http/:www.forbes.com/technology/wireless/feeds/wireless/2005/01...005_01_10_eng-cahners_eng-cahners_084514_7136474990124214945.html>, last visited May 8, 2008, six pages.

* cited by examiner

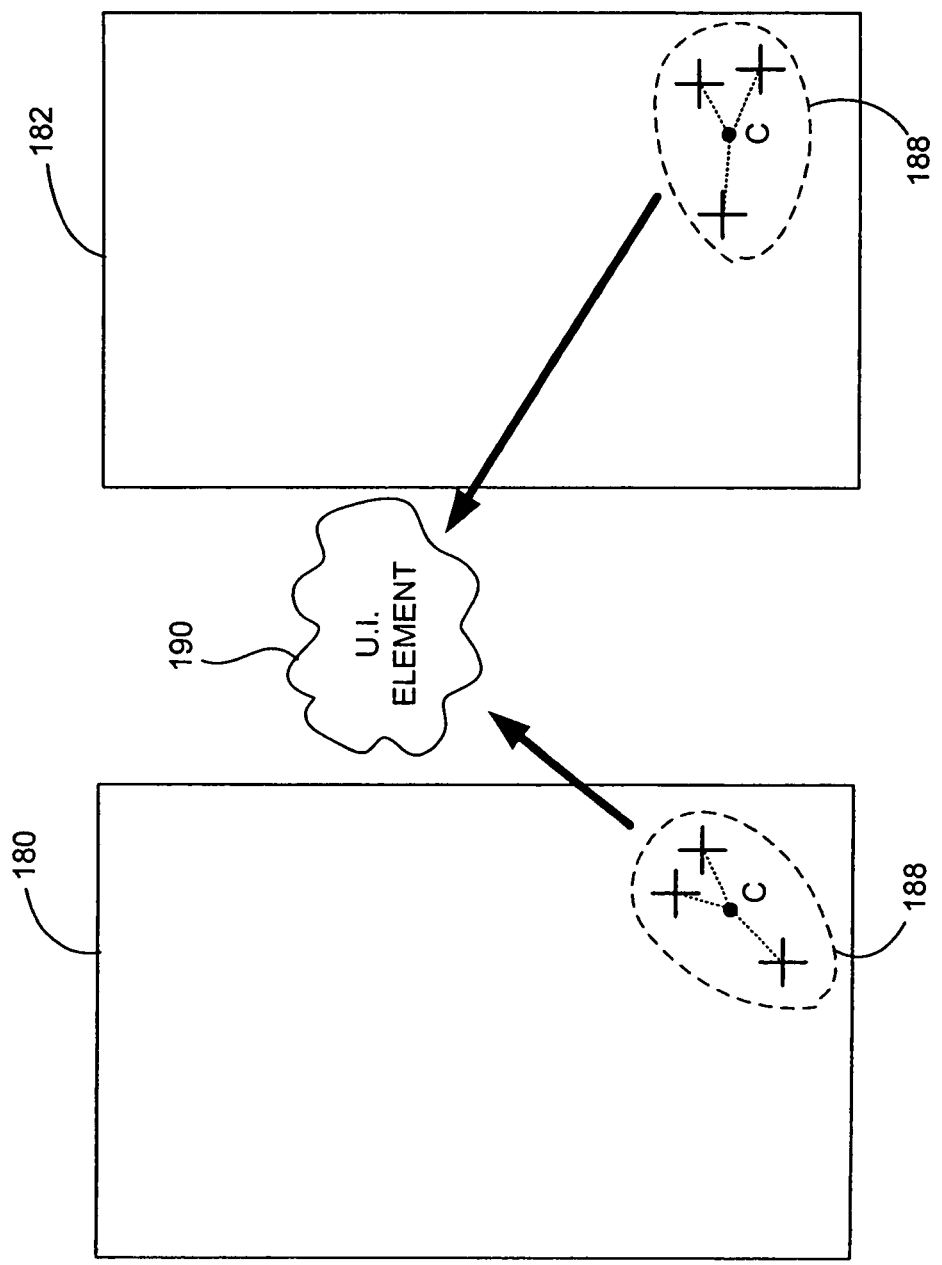

GESTURES FOR DEVICES HAVING ONE OR MORE TOUCH SENSITIVE SURFACES

CROSS-REFERENCE TO RELATED APPLICATION

The present invention claims the benefit under 35 USC 119(e) of U.S. provisional patent application Ser. No. 60/878,828 filed Jan. 5, 2007, the contents of which are incorporated by reference herein.

FIELD OF THE INVENTION

This relates to rolling gestures on a touch sensitive surface of a device for controlling the device and for remotely controlling another device. This also relates to gestures enabled by the placement of one or more touch sensitive surfaces for configuring the operation of the device, for operating the device and for enabling additional gestures for operating the device.

BACKGROUND OF THE INVENTION

There exist today many styles of input devices for performing operations in a computer system. The operations generally correspond to moving a cursor and making selections on a display screen. The operations can also include paging, scrolling, panning, zooming, etc. By way of example, the input devices can include buttons, switches, keyboards, mice, trackballs, touch pads, joy sticks, touch screens and the like. Each of these devices has advantages and disadvantages that are taken into account when designing a computer system.

Buttons and switches are generally mechanical in nature and provide limited control with regards to the movement of the cursor and making selections. For example, they are generally dedicated to moving the cursor in a specific direction (e.g., arrow keys) or to making specific selections (e.g., enter, delete, number, etc.).

In using a mouse instrument, the movement of the input pointer on a display generally corresponds to the relative movements of the mouse as the user moves the mouse along a surface. In using a trackball instrument, the movement of the input pointer on the display generally corresponds to the relative movements of a trackball as the user moves the ball within a housing. Mouse and trackball instruments typically also include one or more buttons for making selections. A mouse instrument can also include scroll wheels that allow a user to scroll the displayed content by rolling the wheel forward or backward.

With a touch pad instrument, such as touch pads on a personal laptop computer, the movement of the input pointer on a display generally corresponds to the relative movements of the user's finger (or stylus) as the finger is moved along a surface of the touch pad. Touch screens, on the other hand, are a type of display screen that typically include a touch-sensitive transparent panel (or "skin") that overlays the display screen. When using a touch screen, a user typically makes a selection on the display screen by pointing directly to objects (such as GUI objects) displayed on the screen (usually with a stylus or finger).

To provide additional functionality, hand gestures have been implemented with some of these input devices. By way of example, in touch pads, selections can be made when one or more taps are detected on the surface of the touch pad. In some cases, any portion of the touch pad can be tapped, and in other cases a dedicated portion of the touch pad can be tapped. In addition to selections, scrolling can be initiated by using finger motion at the edge of the touch pad.

U.S. Pat. Nos. 5,612,719 and 5,590,219, assigned to Apple Computer, Inc. describe some other uses of gesturing. U.S. Pat. No. 5,612,719 discloses an onscreen button that is responsive to at least two different button gestures made on the screen on or near the button. U.S. Pat. No. 5,590,219 discloses a method for recognizing an ellipse-type gesture input on a display screen of a computer system.

In recent times, more advanced gestures have been implemented. For example, scrolling can be initiated by placing four fingers on the touch pad so that the scrolling gesture is recognized and thereafter moving these fingers on the touch pad to perform scrolling events. The methods for implementing these advanced gestures, however, are limited and in many instances counter intuitive.

Based on the above, there is a need for improvements in the way gestures are performed on touch sensitive devices. Gestures are needed that are able to easily and intuitively operate the touch sensitive device including objects displayed on the device, configure the operation of the device and remotely operate another device.

SUMMARY OF THE INVENTION

This relates to a system, method, and software for implementing gestures with a device having one or more touch sensitive services for operating the device, configuring the operation of the device and remotely controlling another device.

Rolling gestures with one or more fingers on a touch sensitive surface of a device can be used to remotely control another device. The user can intuitively control the other device by using his one or more fingers as a joystick.

Rolling gestures on a touch sensitive surface of a device can also be used to operate the device itself. The rolling gestures can be combined with other gestures to provide an efficient way to operate the device.

Also, one or more touch sensitive surfaces of a device can be positioned on the device to enable a set of gestures for configuring the operation of the device, for operating the device and for enabling additional gestures for operating the device. For example, touch sensitive surfaces can be placed on the device to detect a right hand grasp such that the device can be configured for operation by the free left hand.

BRIEF DESCRIPTION OF THE DRAWINGS

This invention will be readily understood by the following description in conjunction with the accompanying drawings, wherein like reference numerals designate like structural elements.

FIGS. 7A-7G illustrate a rotate gesture in accordance with an exemplary embodiment of this invention.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention can be practiced. It is to be understood that other embodiments can be utilized and structural changes can be made without departing from the scope of the preferred embodiments of the invention.

Figure 1:
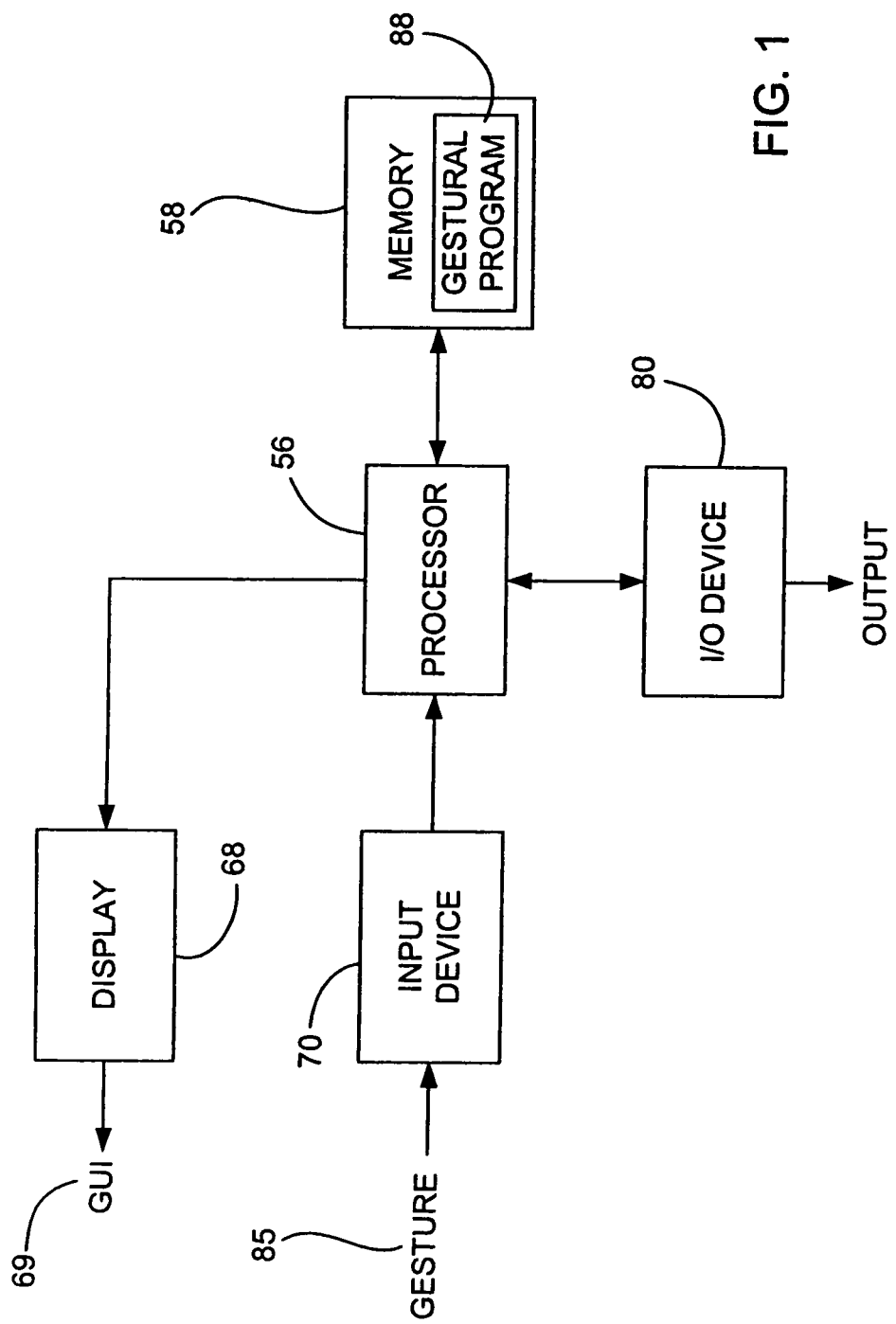
FIG. 1 is a block diagram of a computer system according to an exemplary embodiment of this invention.

FIG. 1 is a block diagram of an exemplary computer system 50 in accordance with one embodiment of the invention. The computer system 50 can correspond to a personal computer system, such as a desktops, laptops, tablets or handheld computer. The computer system can also correspond to a computing device, such as a cell phone, PDA, dedicated media player (such as an MP3 player), consumer electronic device, and the like.

The exemplary computer system 50 shown in FIG. 1 can include a processor 56 configured to execute instructions and to carry out operations associated with the computer system 50. For example, using instructions retrieved for example from memory, the processor 56 can control the reception and manipulation of input and output data between components of the computing system 50. The processor 56 can be implemented on a single-chip, multiple chips or multiple electrical components. For example, various architectures can be used for the processor 56, including dedicated or embedded processor, single purpose processor, controller, ASIC, and so forth.

In most cases, the processor 56 together with an operating system can operate to execute computer code and produce and use data. Operating systems are generally well known and will not be described in greater detail. By way of example, the operating system can correspond to OS/2, DOS, Unix, Linux, Palm OS, and the like. The operating system can also be a special purpose operating system, such as those used for limited purpose appliance-type computing devices. The operating system, other computer code and data can reside within a memory block 58 that can be operatively coupled to the processor 56. Memory block 58 can generally provide a place to store computer code and data that are used by the computer system 50. By way of example, the memory block 58 can include Read-Only Memory (ROM), Random-Access Memory (RAM), hard disk drive and/or the like. The information could also reside on a removable storage medium and loaded or installed onto the computer system 50 when needed. Removable storage mediums can include, for example, CD-ROM, PC-CARD, memory card, floppy disk, magnetic tape, and a network component.

The computer system 50 can also include a display device 68 that can be operatively coupled to the processor 56. The display device 68 can be a liquid crystal display (LCD) (e.g., active matrix, passive matrix and the like). Alternatively, the display device 68 can be a monitor such as a monochrome display, color graphics adapter (CGA) display, enhanced graphics adapter (EGA) display, variable-graphics-array (VGA) display, super VGA display, cathode ray tube (CRT), and the like. The display device can also correspond to a plasma display or a display implemented with electronic inks.

The display device 68 can be generally configured to display a graphical user interface (GUI) 69 that can provide an easy to use interface between a user of the computer system and the operating system or application running thereon. Generally speaking, the GUI 69 can represent programs, files and operational options with graphical images, objects, or vector representations. The graphical images can include windows, fields, dialog boxes, menus, icons, buttons, cursors, scroll bars, etc. Such images can be arranged in predefined layouts, or can be created dynamically to serve the specific actions being taken by a user. During operation, the user can select and/or activate various graphical images in order to initiate functions and tasks associated therewith. By way of example, a user can select a button that opens, closes, minimizes, or maximizes a window, or an icon that launches a particular program. The GUI 69 can additionally or alternatively display information, such as non interactive text and graphics, for the user on the display device 68.

The computer system 50 can also include an input device 70 that can be operatively coupled to the processor 56. The input device 70 can be configured to transfer data from the outside world into the computer system 50. The input device 70 can for example be used to perform tracking and to make selections with respect to the GUI 69 on the display 68. The input device 70 can also be used to issue commands in the computer system 50. The input device 70 can include a touch sensing device configured to receive input from a user's touch and to send this information to the processor 56. By way of example, the touch-sensing device can correspond to a touchpad or a touch screen. In many cases, the touch-sensing device can recognize touches, as well as the position and magnitude of touches on a touch sensitive surface. The touch sensing means can detect and report the touches to the processor 56 and the processor 56 can interpret the touches in accordance with its programming. For example, the processor 56 can initiate a task in accordance with a particular touch. A dedicated processor can be used to process touches locally and reduce demand for the main processor of the computer system.

The touch sensing device can be based on sensing technologies including but not limited to capacitive sensing, resistive sensing, surface acoustic wave sensing, pressure sensing, optical sensing, and/or the like. Furthermore, the touch sensing device can be based on single point sensing or multipoint sensing. Single point sensing is capable of only distinguishing a single touch, while multipoint sensing is capable of distinguishing multiple touches that occur at the same time.

As discussed above, the input device 70 can be a touch screen that can be positioned over or in front of the display 68, integrated with the display device 68, or can be a separate component, such as a touch pad.

The computer system 50 can also include capabilities for coupling to one or more I/O devices 80. By way of example, the I/O devices 80 can correspond to keyboards, printers, scanners, cameras, microphones, speakers, and/or the like. The I/O devices 80 can be integrated with the computer system 50 or they can be separate components (e.g., peripheral devices). In some cases, the I/O devices 80 can be connected to the computer system 50 through wired connections (e.g., cables/ports). In other cases, the I/O devices 80 can be connected to the computer system 80 through wireless connections. By way of example, the data link can correspond to PS/2, USB, IR, Firewire, RF, Bluetooth or the like.

In accordance with one embodiment of the invention, the computer system 50 can be designed to recognize gestures 85 applied to the input device 70 and to control aspects of the computer system 50 based on the gestures 85. In some cases, a gesture can be defined as a stylized interaction with an input device that can be mapped to one or more specific computing operations. The gestures 85 can be made through various hand, and more particularly finger motions. Alternatively or additionally, the gestures can be made with a stylus. In all of these cases, the input device 70 can receive the gestures 85 and the processor 56 can execute instructions to carry out operations associated with the gestures 85. In addition, the memory block 58 can include a gesture operational program 88, which can be part of the operating system or a separate application. The gestural operation program 88 can include a set of instructions that can recognize the occurrence of gestures 85 and can inform one or more software agents of the gestures 85 and/or what action(s) to take in response to the gestures 85. Additional details regarding the various gestures that can be used as input commands are discussed further below.

In accordance with one embodiment, upon a user performing one or more gestures, the input device 70 can relay gesture information to the processor 56. Using instructions from memory 58, and more particularly, the gestural operational program 88, the processor 56 can interpret the gestures 85 and control different components of the computer system 50, such as memory 58, a display 68 and I/O devices 80, based on the gestures 85. The gestures 85 can be identified as commands for performing actions in applications stored in the memory 58, modifying image objects shown on the display 68, modifying data stored in memory 58, and/or for performing actions in I/O devices 80.

A wide range of different gestures can be utilized. By way of example, the gestures can be single point or multipoint gestures; static or dynamic gestures; continuous or segmented gestures; and/or the like. Single point gestures can be those gestures that can be performed with a single contact point, e.g., the gesture can be performed with a single touch as for example a single finger, a palm or a stylus. Multipoint gestures can be those gestures that can be performed with multiple points, e.g., the gesture can be performed with multiple touches as for example multiple fingers, fingers and palms, a finger and a stylus, multiple styli and/or any combination thereof. Static gestures can be those gestures that do not include motion, and dynamic gestures can be those gestures that do include motion. Continuous gestures can be those gestures that are performed in a single stroke, and segmented gestures can be those gestures that are performed in a sequence of steps or strokes.

Again, although FIG. 1 illustrates the input device 70 and the display 68 as two separate boxes for illustration purposes, the two boxes can be realized on one device.

Figure 2:
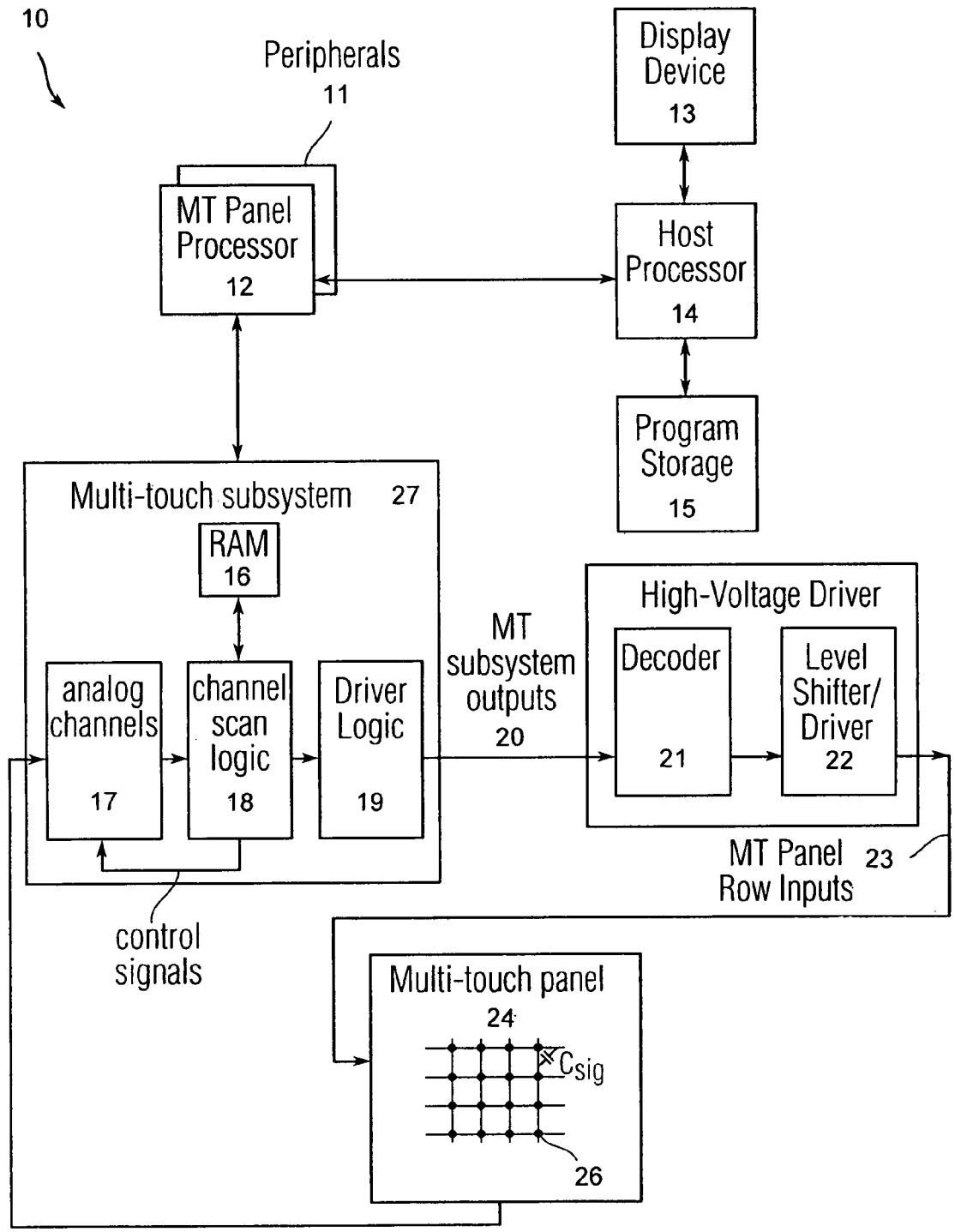
FIG. 2 illustrates another computer system according to another exemplary embodiment of this invention.

FIG. 2 illustrates an exemplary computing system 10 that can use a multi-touch panel 24 as an input device for gestures; the multi-touch panel 24 can at the same time be a display panel. The computing system 10 can include one or more multi-touch panel processors 12 dedicated to the multi-touch subsystem 27. Alternatively, the multi-touch panel processor functionality can be implemented by dedicated logic, such as a state machine. Peripherals 11 can include, but are not limited to, random access memory (RAM) or other types of memory or storage, watchdog timers and the like. Multi-touch subsystem 27 can include, but is not limited to, one or more analog channels 17, channel scan logic 18 and driver logic 19. Channel scan logic 18 can access RAM 16, autonomously read data from the analog channels and provide control for the analog channels. This control can include multiplexing columns of multi-touch panel 24 to analog channels 17. In addition, channel scan logic 18 can control the driver logic and stimulation signals being selectively applied to rows of multi-touch panel 24. In some embodiments, multi-touch subsystem 27, multi-touch panel processor 12 and peripherals 11 can be integrated into a single application specific integrated circuit (ASIC).

Driver logic 19 can provide multiple multi-touch subsystem outputs 20 and can present a proprietary interface that drives high voltage driver, which can include decoder 21 and subsequent level shifter and driver stage 22, although level-shifting functions could be performed before decoder functions. Level shifter and driver 22 can provide level shifting from a low voltage level (e.g. CMOS levels) to a higher voltage level, providing a better signal-to-noise (S/N) ratio for noise reduction purposes. Decoder 21 can decode the drive interface signals to one out of N outputs, whereas N is the maximum number of rows in the panel. Decoder 21 can be used to reduce the number of drive lines needed between the high voltage driver and multi-touch panel 24. Each multi-touch panel row input 23 can drive one or more rows in multi-touch panel 24. It should be noted that driver 22 and decoder 21 can also be integrated into a single ASIC, be integrated into driver logic 19, or in some instances be unnecessary.

The multi-touch panel 24 can include a capacitive sensing medium having a plurality of row traces or driving lines and a plurality of column traces or sensing lines, although other sensing media can also be used. The row and column traces can be formed from a transparent conductive medium, such as Indium Tin Oxide (ITO) or Antimony Tin Oxide (ATO), although other transparent and non-transparent materials, such as copper, can also be used. In some embodiments, the row and column traces can be formed on opposite sides of a dielectric material, and can be perpendicular to each other, although in other embodiments other orientations can be possible, such as a non-orthogonal orientation and a polar orientation. For example, in a polar coordinate system, the sensing lines can be concentric circles and the driving lines can be radially extending lines (or vice versa). It should be understood, therefore, that the terms "row" and "column," "first dimension" and "second dimension," or "first axis" and "second axis" as used herein are intended to encompass not only orthogonal grids, but the intersecting traces of other geometric configurations having first and second dimensions (e.g. the concentric and radial lines of a polar-coordinate arrangement). The rows and columns can be formed on a single side of a substrate, or can be formed on two separate substrates separated by a dielectric material. In some instances, an additional dielectric cover layer can be placed over the row or column traces to strengthen the structure and protect the entire assembly from damage.

At the "intersections" of the traces of the multi-touch panel 24, where the traces pass above and below (cross) each other (but do not make direct electrical contact with each other), the traces can essentially form two electrodes (although more than two traces could intersect as well). Each intersection of row and column traces can represent a capacitive sensing node and can be viewed as picture element (pixel) 26, which can be particularly useful when multi-touch panel 24 is viewed as capturing an "image" of touch. (In other words, after multi-touch subsystem 27 has determined whether a touch event has been detected at each touch sensor in the multi-touch panel, the pattern of touch sensors in the multi-touch panel at which a touch event occurred can be viewed as an "image" of touch (e.g. a pattern of fingers touching the panel).) The capacitance between row and column electrodes appears as a stray capacitance on all columns when the given row is held at DC and as a mutual capacitance Csig when the given row is stimulated with an AC signal. The presence of a finger or other object near or on the multi-touch panel can be detected by measuring changes to Csig. The columns of multi-touch panel 124 can drive one or more analog channels 17 (also referred to herein as event detection and demodulation circuits) in multi-touch subsystem 27. In some implementations, each column can be coupled to one dedicated analog channel 17. However, in other implementations, the columns can be couplable via an analog switch to a fewer number of analog channels 17.

Computing system 10 can also include host processor 14 for receiving outputs from multi-touch panel processor 12 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, etc. Host processor 14, which can be a personal computer CPU, can also perform additional functions that can not be related to multi-touch panel processing, and can be coupled to program storage 15 and display device 13 such as an LCD display for providing a user interface (UI) to a user of the device.

It should be noted that, while FIG. 2 illustrates a dedicated MT panel processor 12, the multi-touch subsystem can be controlled directly by the host processor 14. Additionally, it should also be noted that the multi-touch panel 24 and the display device 13 can be integrated into one single touch-screen display device. Further details of multi-touch sensor detection, including proximity detection by a touch panel, is described in commonly assigned co-pending applications, including U.S. application Ser. No. 10/840,862, published on May 11, 2006 as U.S. Patent Publication No. US2006/0097991, U.S. application Ser. No. 11/428,522, published on Oct. 26, 2006 as U.S. Patent Publication No. US2006/0238522, and U.S. application Ser. No. 11/649,998 entitled "Proximity and Multi-Touch Sensor Detection and Demodulation," filed on Jan. 3, 2007, the entirety of each of which are hereby incorporated herein by reference.

Figure 3:
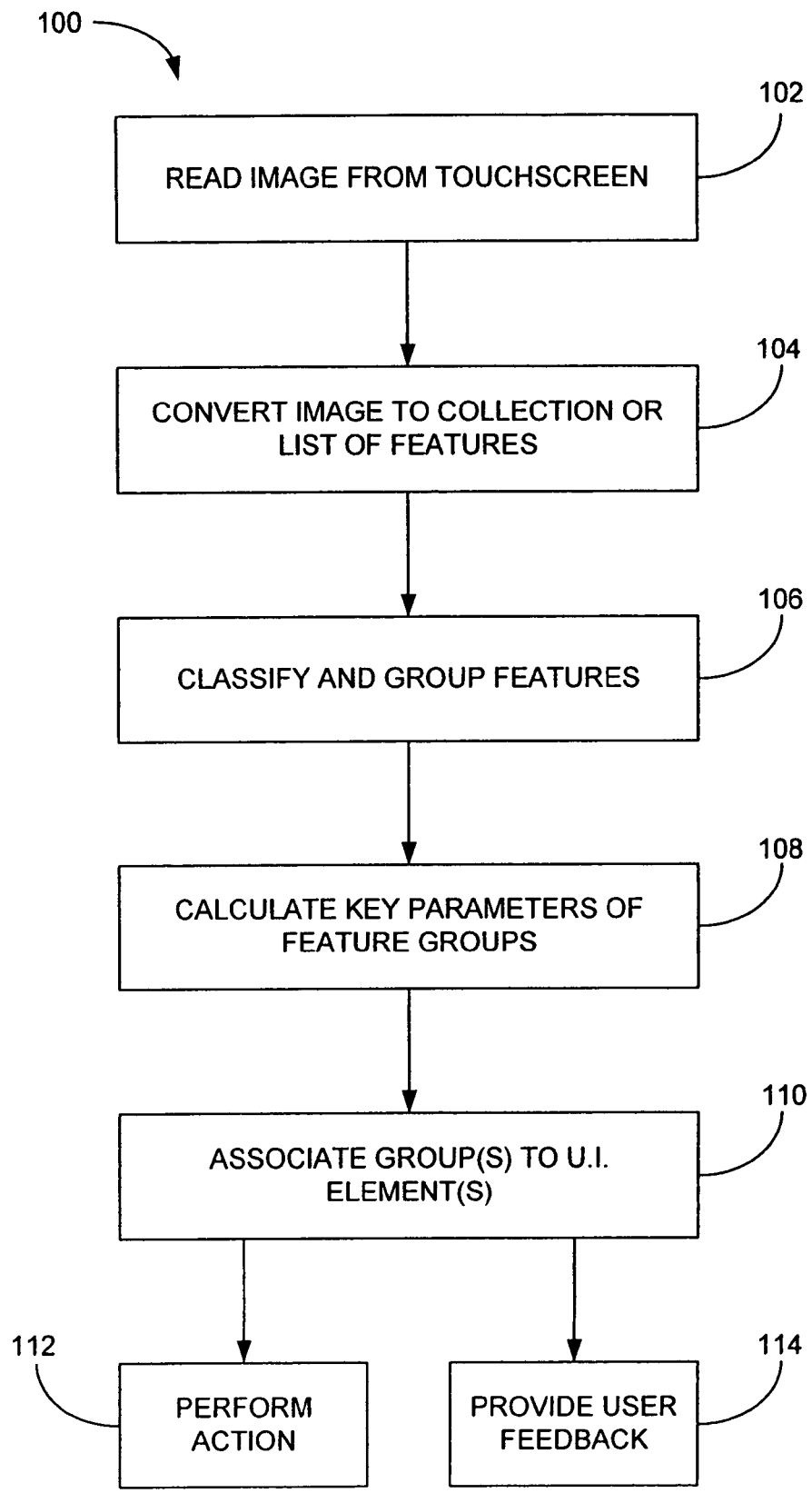
FIG. 3 is a multipoint processing method in accordance with an exemplary embodiment of this invention.

FIG. 3 illustrates a multipoint processing method 100, in accordance with one embodiment of the invention. The multipoint processing method 100 can for example be performed in the system shown in FIG. 1 or 2. The multipoint processing method 100 generally begins at block 102 where images can be read from a multipoint input device, and more particularly a multipoint touch screen. Although the term "image" is used it should be noted that the data can come in other forms. In most cases, the image read from the touch screen can provide magnitude (Z) as a function of position (x and y) for each sensing point or pixel of the touch screen. The magnitude can, for example, reflect the capacitance measured at each point.

Figure 4A:
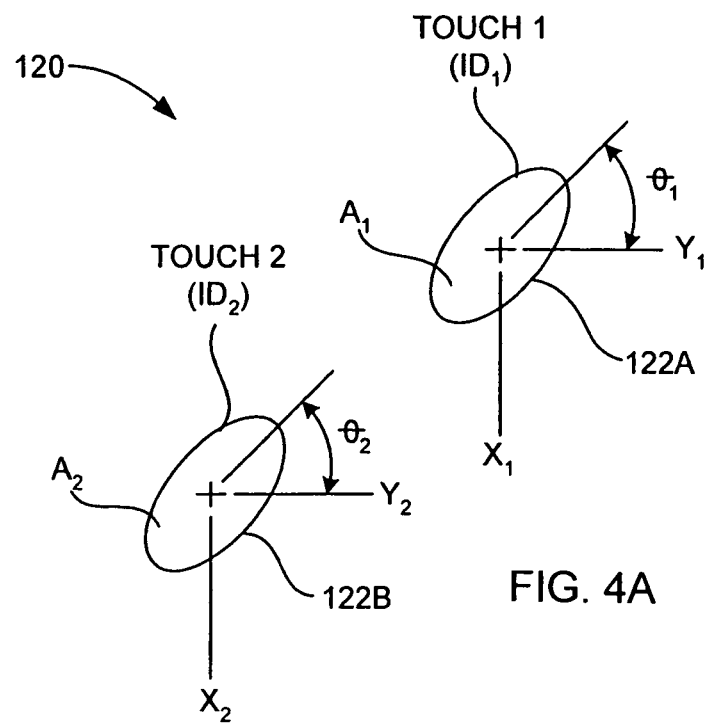
FIGS. 4A and 4B illustrate an image in accordance with an exemplary embodiment of this invention.
Figure 4B:
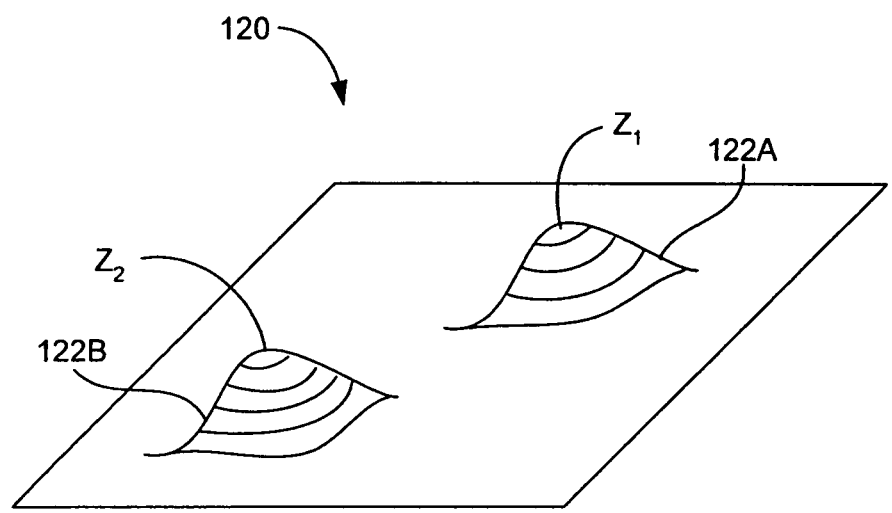

Following block 102, multipoint processing method 100 proceeds to block 104 where the image can be converted into a collection or list of features. Each feature can represent a distinct input such as a touch. In most cases, each feature can include its own unique identifier (ID), x coordinate, y coordinate, Z magnitude, angle Θ, area A, and the like. By way of example, FIGS. 4A and 4B illustrate a particular image 120 in time. In image 120, there are two features 122 based on two distinct touches. The touches can for example be formed from a pair of fingers touching the touch screen. As shown, each feature 122 can include unique identifier (ID), x coordinate, y coordinate, Z magnitude, angle theta, and area A. More particularly, the first feature 122A can be represented by $ID_1, X_1, Y_1, Z_1, \Theta_1, A_1$ and the second feature 122B can be represented by $ID_2, X_2, Y_2, Z_2, \Theta_2, A_2$. This data can be outputted for example using a multi-touch protocol.

The conversion from data or images to features can be accomplished using methods described in copending U.S. patent application Ser. No. 10/840,862, published as U.S. Patent Publication No. US2006/009771, which is hereby again incorporated herein by reference. As disclosed therein, the raw data can be typically received in a digitized form, and can include values for each node of the touch screen. The values can be between 0 and 256 where 0 equates to no touch pressure and 256 equates to full touch pressure. Thereafter, the raw data can be filtered to reduce noise. Once filtered, gradient data, which indicates the topology of each group of connected points, can be generated. Thereafter, the boundaries for touch regions can be calculated based on the gradient data (i.e., a determination can be made as to which points are grouped together to form each touch region). By way of example, a watershed algorithm can be used. Once the boundaries are determined, the data for each of the touch regions can be calculated (e.g., X, Y, Z, Θ, A).

Following block 104, multipoint processing method 100 proceeds to block 106 where feature classification and groupings can be performed. During classification, the identity of each of the features can be determined. For example, the features can be classified as a particular finger, thumb, palm or other object. Once classified, the features can be grouped. The manner in which the groups can be formed can be widely varied. In most cases, the features can be grouped based on some criteria (e.g., they carry a similar attribute). For example, the two features shown in FIGS. 4A and 4B can be grouped together because each of these features is located in proximity to each other or because they are from the same hand. The grouping can include some level of filtering to filter out features that are not part of the touch event. In filtering, one or more features can be rejected because they either meet some predefined criteria or because they do not meet some criteria. By way of example, one of the features can be classified as a thumb located at the edge of a tablet PC. Because the thumb is being used to hold the device rather than being used to perform a task, the feature generated therefrom can be rejected, i.e., not considered part of the touch event being processed.

Figure 5:
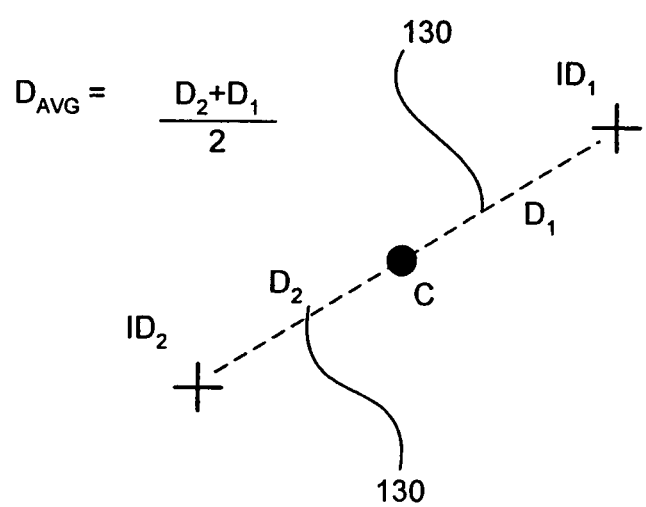
FIG. 5 illustrates a group of features in accordance with an exemplary embodiment of this invention.

Following block 106, the multipoint processing method 100 proceeds to block 108 where key parameters for the feature groups can be calculated. The key parameters can include distance between features, x/y centroid of all features, feature rotation, total pressure of the group (e.g., pressure at centroid), and the like. As shown in FIG. 5, the calculation can include finding the centroid C, drawing a virtual line 130 to each feature from the centroid C, defining the distance D for each virtual line ($D_1$ and $D_2$), and then averaging the distances $D_1$ and $D_2$. Once the parameters are calculated, the parameter values can be reported. The parameter values can be typically reported with a group identifier (GID) and number of features within each group (in this case three). In most cases, both initial and current parameter values can be reported. The initial parameter values can be based on touch down, i.e., when the user sets their fingers on the touch screen, and the current values can be based on any point within a stroke occurring after touch down.

As should be appreciated, blocks 102-108 can be repetitively performed during a user stroke thereby generating a plurality of sequentially configured signals. The initial and current parameters can be compared in later steps to perform actions in the system.

Following block 108, the process flow proceeds to block 110 where the group is or can be associated with a user interface (UI) element. UI elements can be buttons boxes, lists, sliders, wheels, knobs, pictures, documents, icons, etc. Each UI element can represent a component or control of the user interface. The application behind the UI element(s) can have access to the parameter data calculated in block 108. In one implementation, the application can rank the relevance of the touch data to the UI element corresponding there to. The ranking can be based on some predetermined criteria. The ranking can include producing a figure of merit, and whichever UI element has the highest figure of merit, giving it sole access to the group. There can even be some degree of hysteresis as well (once one of the UI elements claims control of that group, the group sticks with the UI element until another UI element has a much higher ranking). By way of example, the ranking can include determining proximity of the centroid (or features) to the image object associated with the UI element.

Following block 110, the multipoint processing method 100 proceeds to blocks 112 and 114. The blocks 112 and 114 can be performed approximately at the same time. From the user perspective, in one embodiment, the blocks 112 and 114 appear to be performed concurrently. In block 112, one or more actions can be performed based on differences between initial and current parameter values, and can also be based to a UI element to which they can be associated, if any. In block 114, user feedback pertaining to the one or more actions being performed can be provided. By way of example, user feedback can include display, audio, tactile feedback and/or the like.

Figure 6:
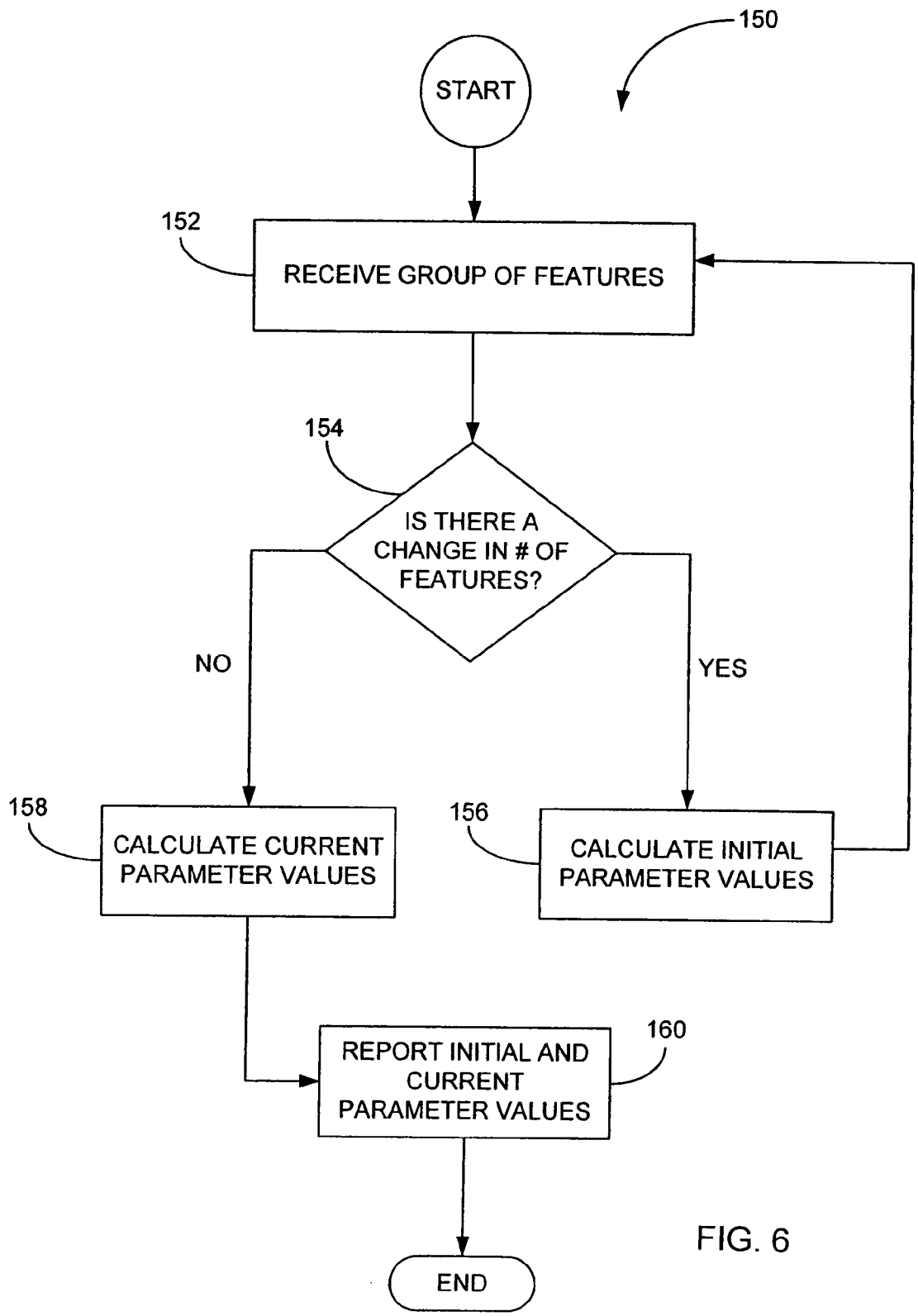
FIG. 6 is a parameter calculation method in accordance with an exemplary embodiment of this invention.

FIG. 6 is a parameter calculation method 150, in accordance with one embodiment of the invention. The parameter calculation method 150 can, for example, correspond to block 108 shown in FIG. 3. The parameter calculation method 150 generally begins at block 152 where a group of features can be received. Following block 152, the parameter calculation method 150 proceeds to block 154 where a determination can be made as to whether or not the number of features in the group of features has changed. For example, the number of features can have changed due to the user picking up or placing an additional finger. Different fingers can be needed to perform different controls (e.g., tracking, gesturing). If the number of features has changed, the parameter calculation method 150 proceeds to block 156 where the initial parameter values can be calculated. If the number stays the same, the parameter calculation method 150 proceeds to block 158 where the current parameter values can be calculated. Thereafter, the parameter calculation method 150 proceeds to block 160 where the initial and current parameter values can be reported. By way of example, the initial parameter values can contain the average initial distance between points (or Distance (AVG) initial) and the current parameter values can contain the average current distance between points (or Distance (AVG) current). These can be compared in subsequent steps in order to control various aspects of a computer system.

The above methods and techniques can be used to implement any number of GUI interface objects and actions. For example, gestures can be created to detect and effect a user command to resize a window, scroll a display, rotate an object, zoom in or out of a displayed view, delete or insert text or other objects, etc. Gestures can also be used to invoke and manipulate virtual control interfaces, such as volume knobs, switches, sliders, keyboards, and other virtual interfaces that can be created to facilitate human interaction with a computing system or a consumer electronic item.

To cite an example using the above methodologies, and referring to FIGS. 7A-7G, a rotate gesture for controlling a virtual volume knob 170 on a GUI interface 172 of a display 174 of a tablet PC 175 will be described. In order to actuate the knob 170, the user places their fingers 176 on a multipoint touch screen 178. The virtual control knob can already be displayed, or the particular number, orientation or profile of the fingers at touch down, or the movement of the fingers immediately thereafter, or some combination of these and other characteristics of the user's interaction can invoke the virtual control knob to be displayed. In either case, the computing system can associate a finger group to the virtual control knob and can make a determination that the user intends to use the virtual volume knob.

This association can also be based in part on the mode or current state of the computing device at the time of the input. For example, the same gesture can be interpreted alternatively as a volume gesture if a song is currently playing on the computing device, or as a rotate command if an object editing application is being executed. Other user feedback can be provided, including for example audible or tactile feedback.

Figure 7A:
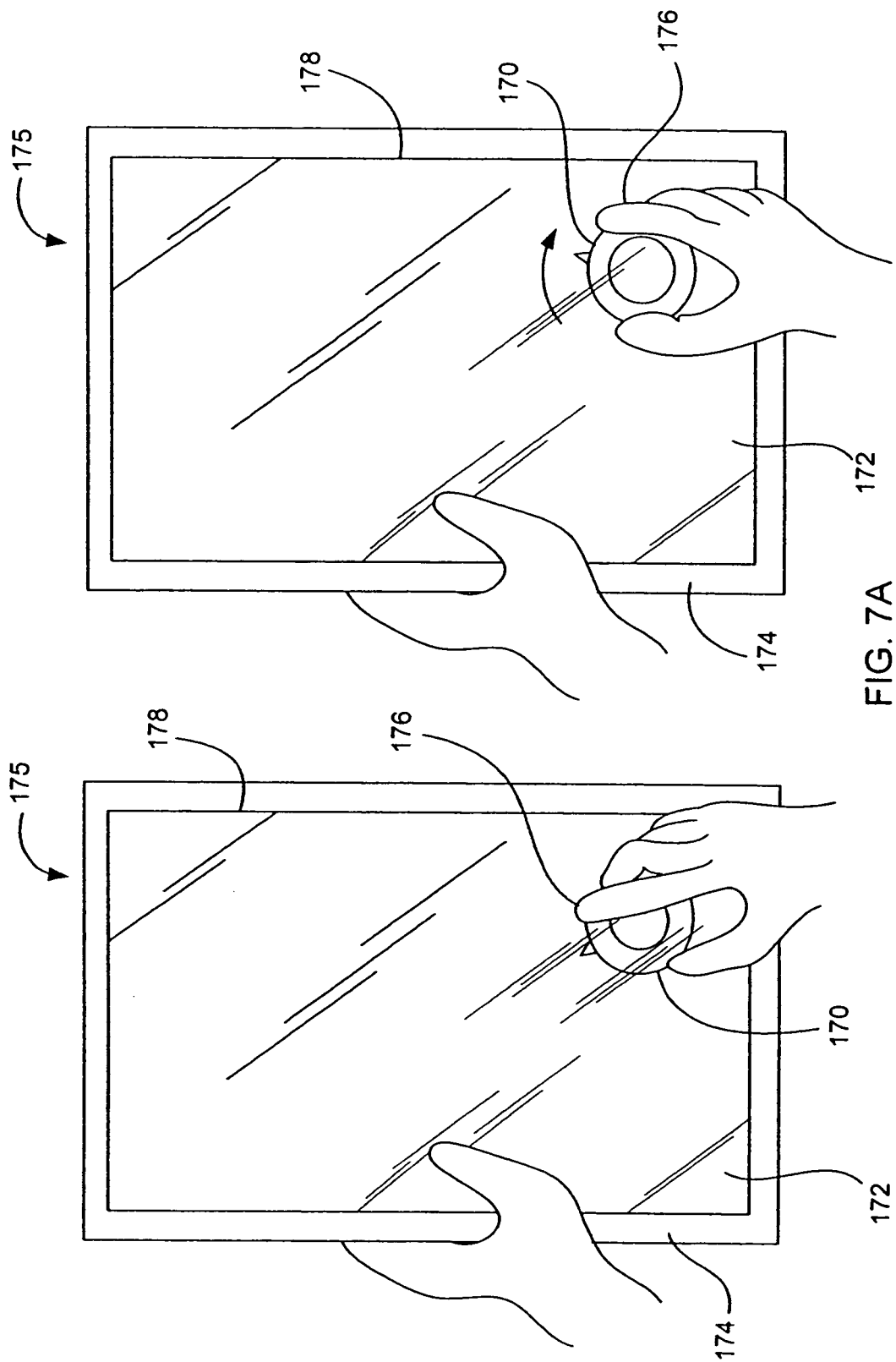

Once the knob 170 is displayed as shown in FIG. 7A based on the gesture, the user's fingers 176 thereafter can be rotated around the knob 170 in order to simulate turning the knob 170. Again, audible feedback in the form of a clicking sound or tactile feedback in the form of vibration, for example, can be provided as the knob 170 is "rotated." The user can also use their other hand to hold the tablet PC 175.

Figure 7B:
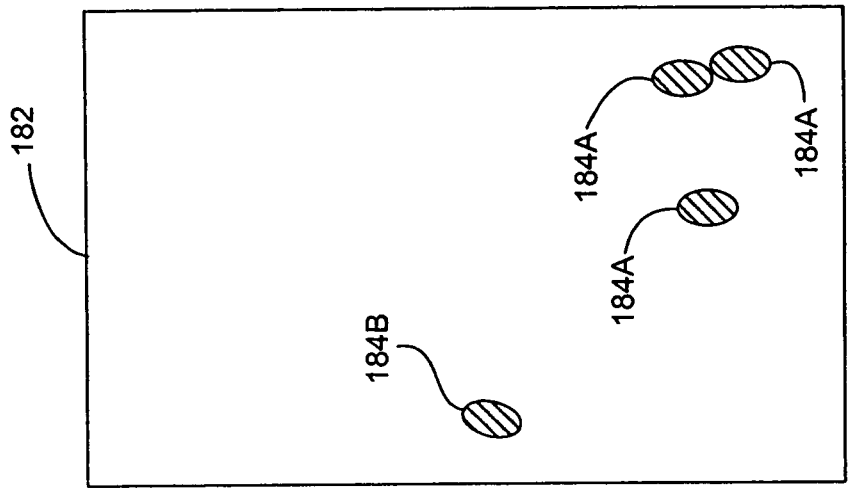
Figure 7B:
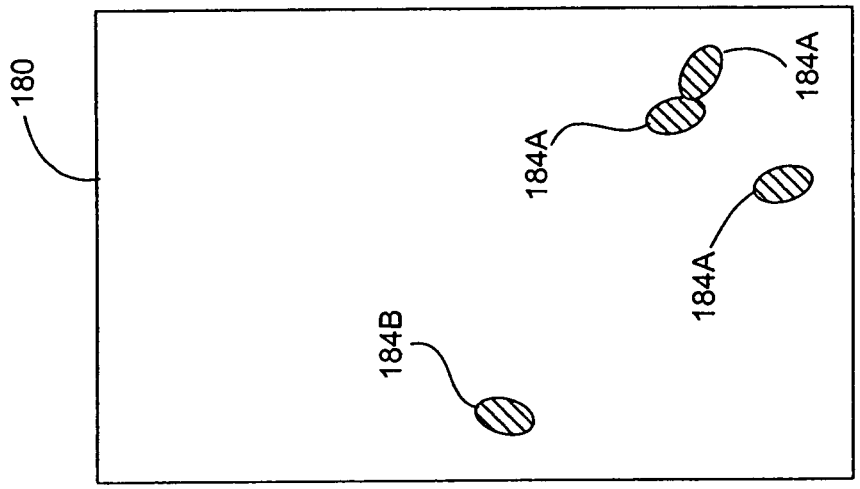

As shown in FIG. 7B, the multipoint touch screen 178 can detect at least a pair of images. In particular, a first image 180 can be created at touch down, and at least one other image 182 can be created when the fingers 176 are rotated. Although only two images are shown, in most cases there can be many more images that incrementally occur between these two images. Each image can represent a profile of the fingers in contact with the touch screen at a particular instant in time. These images can also be referred to as touch images. It will be understood that the term "image" does not mean that the profile is displayed on the screen 178 (but rather imaged by the touch sensing device). It should also be noted that although the term "image" is used, the data can be in other forms representative of the touch plane at various times.

Figure 7C:
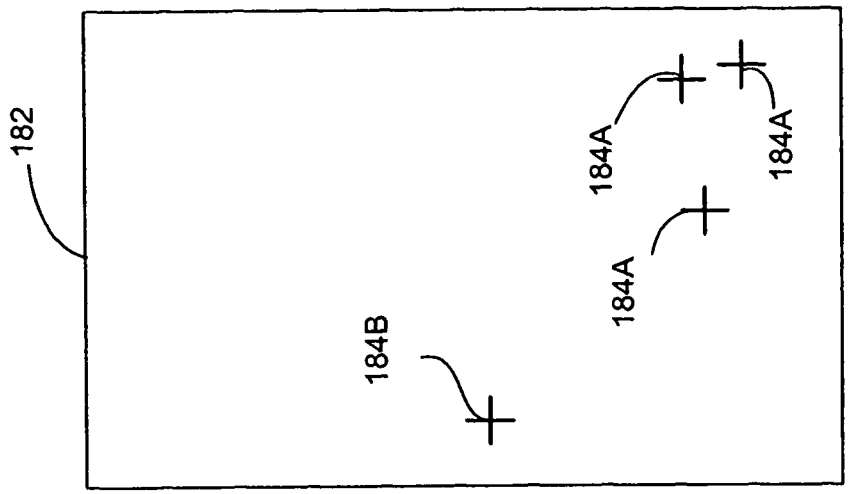
Figure 7C:
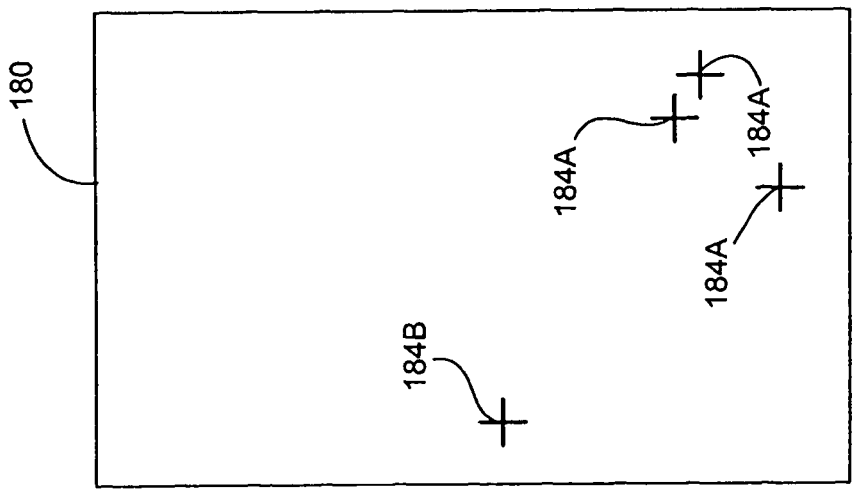

As shown in FIG. 7C, each of the images 180 and 182 can be converted to a collection of features 184. Each feature 184 can be associated with a particular touch as for example from the tips each of the fingers 176 surrounding the knob 170 as well as the thumb of the other hand 177 used to hold the tablet PC 175.

Figure 7D:
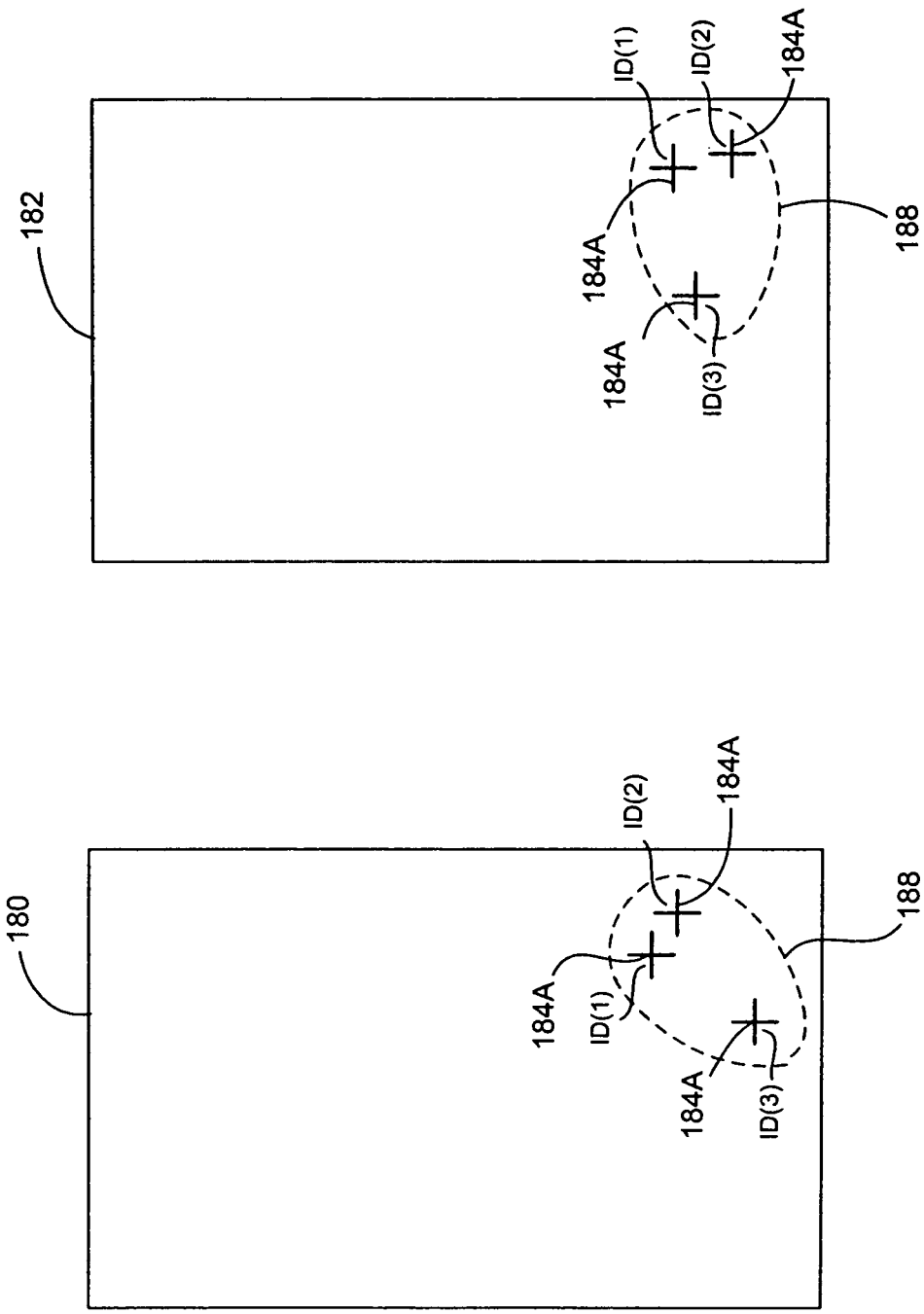

As shown in FIG. 7D, the features 184 can be classified, i.e., each finger/thumb can be identified, and grouped for each of the images 180 and 182. In this particular case, the features 184A associated with the knob 170 can be grouped together to form group 188 and the feature 184B associated with the thumb is filtered out. In alternative arrangements, the thumb feature 184B can be treated as a separate feature by itself (or in another group), for example, to alter the input or operational mode of the system or to implement another gesture, for example, a slider gesture associated with an equalizer slider displayed on the screen in the area of the thumb (or other finger).

As shown in FIG. 7E, the key parameters of the feature group 188 can be calculated for each image 180 and 182. The key parameters associated with the first image 180 can represent the initial state and the key parameters of the second image 182 can represent the current state.

Also as shown in FIG. 7E, the knob 170 can be the UI element associated with the feature group 188 because of its proximity to the knob 170. Thereafter, as shown in FIG. 7F, the key parameter values of the feature group 188 from each image 180 and 182 can be compared to determine the rotation vector, i.e., the group of features rotated five (5) degrees clockwise from the initial to current state. In FIG. 8F, the initial feature group (image 180) can be shown in dashed lines while the current feature group (image 182) can be shown in solid lines.

Figure 7G:
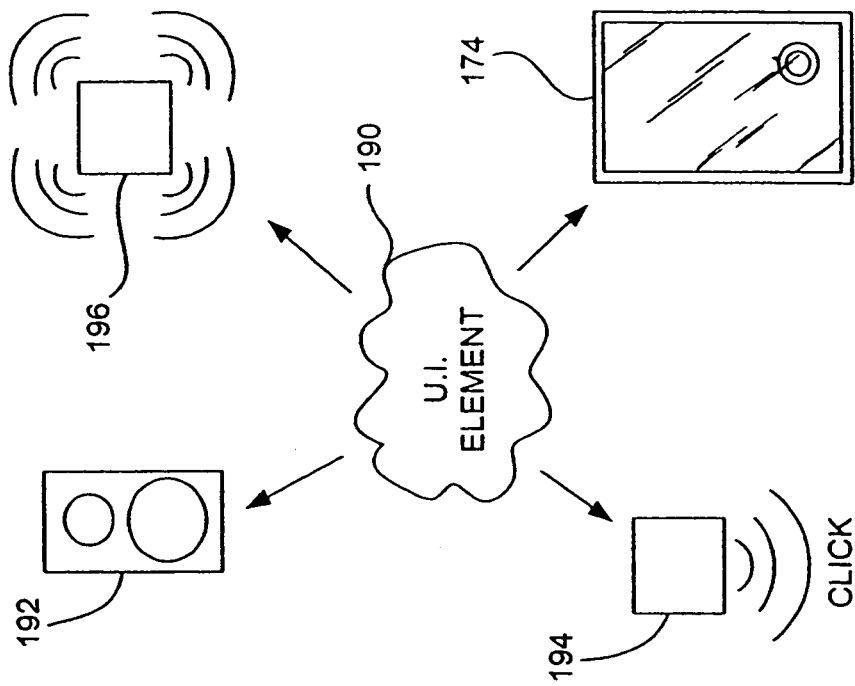
Figure 7F:
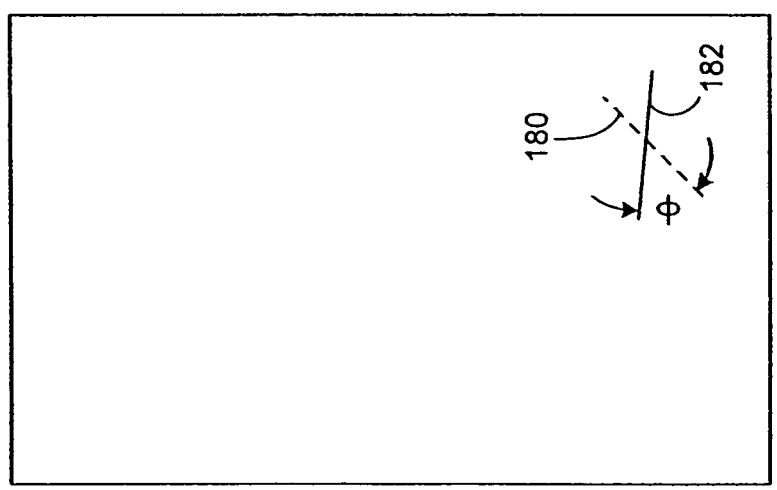

As shown in FIG. 7G, based on the rotation vector the speaker 192 of the tablet PC 175 can increase (or decrease) its output in accordance with the amount of rotation of the fingers 176, i.e., increase the volume by 5% based on rotation of 5 degrees. The display 174 of the tablet PC can also adjust the rotation of the knob 170 in accordance with the amount of rotation of the fingers 176, i.e., the position of the knob 170 rotates five (5) degrees. In most cases, the rotation of the knob can occur simultaneously with the rotation of the fingers, i.e., for every degree of finger rotation the knob can rotate a degree. In essence, the virtual control knob follows the gesture occurring on the screen. Still further, an audio unit 194 of the tablet PC can provide a clicking sound for each unit of rotation, e.g., provide five clicks based on rotation of five degrees. Still yet further, a haptics unit 196 of the tablet PC 175 can provide a certain amount of vibration or other tactile feedback for each click thereby simulating an actual knob.

It should be noted that additional gestures can be performed simultaneously with the virtual control knob gesture. For example, more than one virtual control knob can be controlled at the same time using both hands, i.e., one hand for each virtual control knob. Alternatively or additionally, one or more slider bars can be controlled at the same time as the virtual control knob, i.e., one hand operates the virtual control knob, while at least one finger and maybe more than one finger of the opposite hand operates at least one slider and maybe more than one slider bar, e.g., slider bar for each finger.

It should also be noted that although the embodiment can be described using a virtual control knob, in another embodiment, the UI element can be a virtual scroll wheel. As an example, the virtual scroll wheel can mimic an actual scroll wheel such as those described in U.S. Patent Publication Nos. US2003/0076303A1, US2003/0076301A1, and US2003/0095096A1, all of which are herein incorporated by reference.

Figure 8:
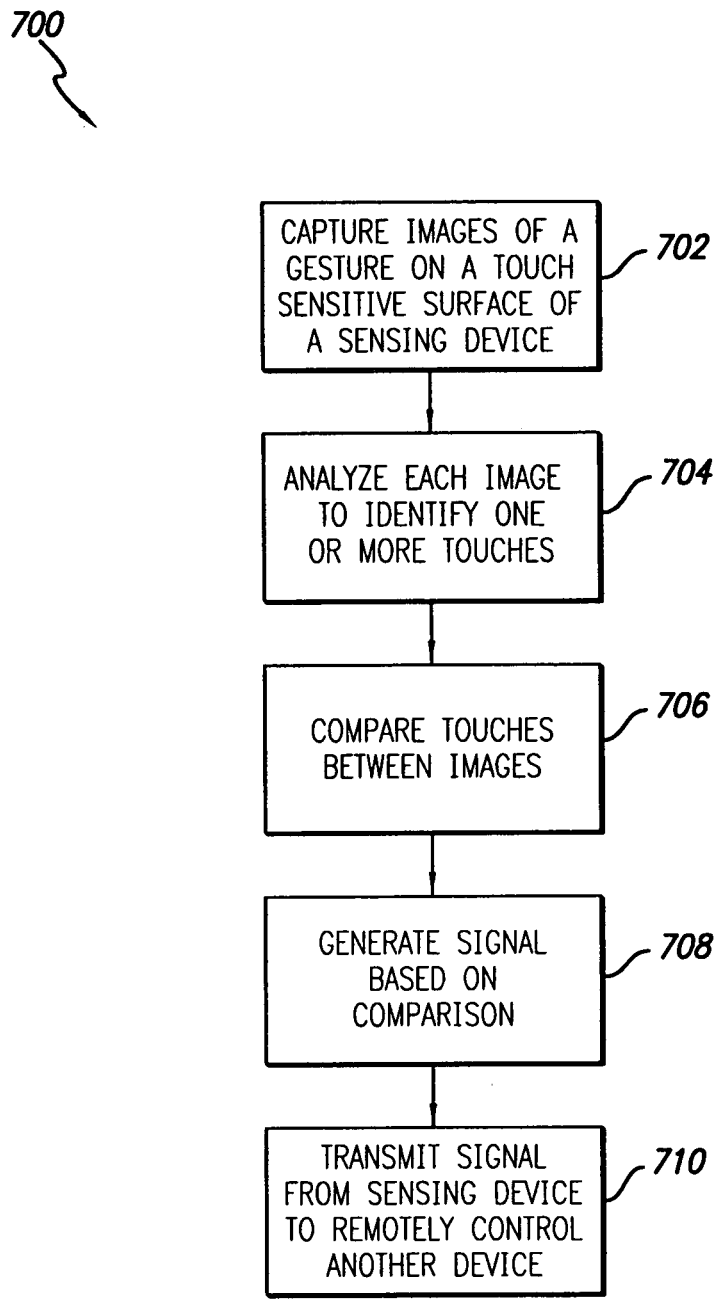
FIG. 8 is a diagram of a touch-based method in accordance with an exemplary embodiment of this invention.

FIG. 8 is a diagram of a touch-based method 700 in which a gesture on a touch sensitive surface of a sensing device can be used to remotely control another device. At block 702, images of the gesture can be captured as the user inputs the gesture on the touch sensitive surface. The gesture can be, for example, placing one finger at a location on the touch sensitive surface and rolling the finger as a joystick. The images of the gesture can produce snapshots of finger contacts with the touch sensitive surface. As described above with respect to FIG. 3, each image can be analyzed to identify one or more touches at block 704. Data or parameters for each touch, such as the x coordinate and y coordinate, can be calculated. Then, at block 706, the data or parameters for touches, such as from two consecutive images, can be compared. The sensing device at block 708 can generate a control signal based on the comparison. The signal can be then transmitted to another device to remotely control it at block 710 in accordance with the content of the signal.

Figure 9:
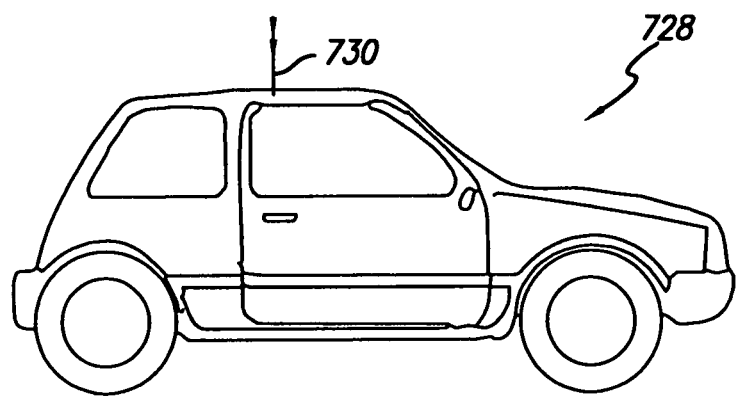
FIG. 9 illustrates one system for implementing the touch-based method of FIG. 8.
Figure 9:
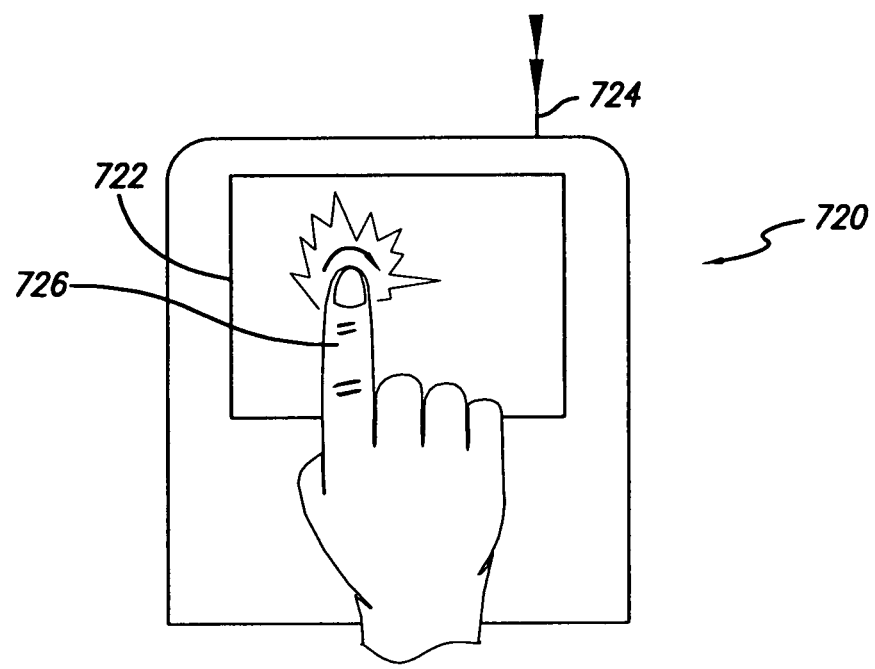

FIG. 9 illustrates one system for implementing the touch-based method of FIG. 8. The system can comprise a device such as tablet PC 720 having a touch sensitive surface 722, such as a touch pad or a-touch sensitive display screen. A user can input a gesture on surface 722. FIG. 9 illustrates one example of a user performing a rolling gesture, as indicated by the arrow, with his index finger 726 on surface 722. The tablet PC 724 can have an antenna for transmitting signals to another device such as car 728. The car 728 can have an antenna 730 for receiving signals transmitted from tablet PC 720. Although not shown, car 728 can have the processing capability well known in the art of analyzing the received signal and performing one or more actions based on the contents of the signal. It should be noted that the wireless connection between tablet PC 720 and car 728 can correspond to any well-known wireless protocol such as Bluetooth, WiFi and the like. Alternatively, tablet PC 720 and car 728 can be connected together through a wired connection.

Figure 10A:
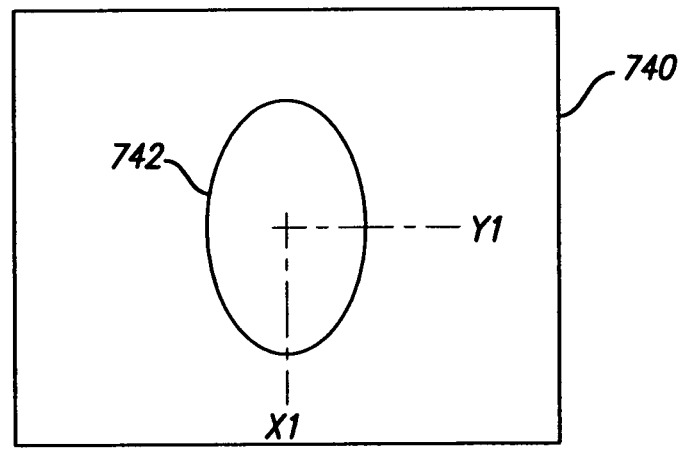
FIGS. 10A-10C illustrate a rolling sequence in accordance with an exemplary embodiment of this invention.
Figure 10B:
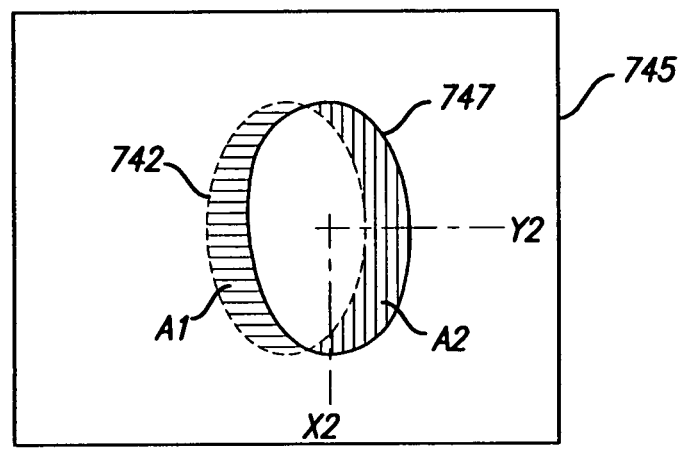
Figure 10C:
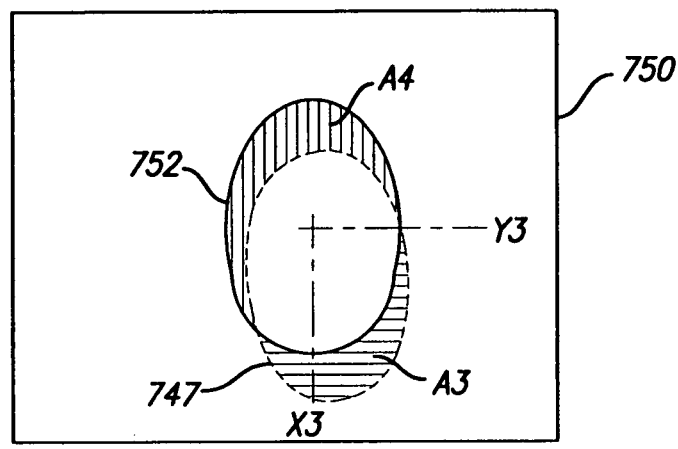

FIGS. 10A-10C illustrate a sequence using the touch-based method 700 with the system of FIG. 9. FIGS. 10A-10C show three images 740, 745 and 750 captured by tablet PC 720 as finger 726 performs two rolling gestures on surface 722. FIG. 10A illustrates the image captured when the user first sets down his finger 726 on surface 722. The image 740 can be analyzed by the tablet PC 720 to identify touch 742. Once identified, data or parameters of touch 742, such as x coordinate X1 and y coordinate Y1, can be determined. For the purposes of FIGS. 10A-10C, the x and y coordinates can correspond to the center of a touch in a given image, but the x and y coordinates can correspond to other geometrical features of the touch.

FIG. 10B illustrates the image captured after the user has rolled his finger 726 to the right. The initial touch down 742 can be shown with dotted lines, while touch 747 can be the touch resulting from the roll. In performing the roll from touch 742 to touch 747, the user has lifted a portion of his finger 726 previously touching surface 722. This portion corresponds to section A1 having horizontal hatch marks. The user has also placed a portion of his finger 726, which was not previously on surface 722, onto surface 722. This portion can correspond to section A2 having vertical hatch marks. A portion of his finger indicated without any hatch marks remains in contact throughout the roll. As a result, data or parameters for touch 747, such as x coordinate X2 and y coordinate Y2 can be different than coordinates X1 and Y1 for touch 742.

The data or parameters between these consecutive images can be compared and the difference between them can be used to generate a control signal for remotely controlling the car 728. For example, a comparison of x coordinates X1 and X2 can indicate a roll direction or vector at least to the right. The sensing device can generate a control signal directing the car 728 to move in the direction of the roll and transmit that signal to the car 728 to remotely effectuate a movement operation.

A comparison of x coordinates X1 and X2 can also be used to provide other means of control beyond directional control. The amount of difference in the x coordinates X1 and X2 can be considered the magnitude of the roll, e.g., how pronounced the user has rolled his finger in a given direction. The magnitude of the roll can be used, for example, to generate a signal for controlling the velocity of the car 728. The user can control the velocity by controlling the magnitude of the roll. For example, a more pronounced roll will correlate to the car operating with greater velocity. In this way, one gesture, such as the roll of a finger in one direction, can both control the direction and velocity of the car. Alternatively, the roll of one finger on surface 772 can be used to control the direction, and the placement of two fingers on surface 722 can indicate a change in mode, such that a subsequent roll of one or more of the two fingers controls velocity rather than direction.

The comparison is not limited to a single type of data or parameter. The Y1 and Y2 coordinates can also be compared and a signal generated to move the car in a backwards or forward direction based on the comparison after or in conjunction with the car's movement in the x direction.

It should also be noted that the comparison is not limited to only positional coordinates, such as the x and y coordinates. As described above, each touch can be defined by a number of touch data or parameters and any one or more of these data or parameters can be the basis for the generated control signal. Moreover, the direction and magnitude of the roll does not have to be mapped to the direction and velocity of the controlled device's movement. The direction and magnitude of the roll can be mapped to other actions such as turning the device on or off.

It should further be noted that the comparison between two images does not necessarily have to reflect a difference in a touch data to generate a signal. For example, a touch on a specific portion of the touch sensitive surface can be correlated to turning on the car. Such a touch can have the same or essentially the same data over several images. This similarity of data over a number of images can be the basis of generating a control signal as much as a dissimilarity as discussed above.

FIG. 10C illustrates an image 750 of a second roll of the user's finger 726 toward the top of surface 722 (not shown in FIG. 9). The roll can be continuous with the roll of FIG. 10B or as a separate roll at a different time. The previous touch 747 is shown with dotted lines, while touch 752 is the touch resulting from the roll. In performing the roll from touch 747 to touch 752, the user has lifted a portion of his finger 726 previously touching surface 722. This portion can correspond to section A3 having horizontal hatch marks. The user has also placed a portion of his finger 726, which was not previously on the surface 722, onto surface 722. This portion can correspond to section A4 having vertical hatch marks. A portion of his finger indicated without any hatch marks can remain in contact throughout the roll. As a result, touch data, such as an x coordinate X3 and a y coordinate Y3 for touch 752 can be different than coordinates X2 and Y2 from touch 747. These touch data can be compared and the difference between them can be used to generate a control signal in the same manner as discussed above with respect to FIG. 10B.

In this manner, a user's gestures, such as a roll, on a touch sensitive surface of a sensing device can be used to remotely control another device such as a car. The user can use his finger as a joystick to control the movement of the car in a number of ways (such as its direction and velocity) with a single gesture.

While FIGS. 10A-10C show an image of a single finger touch, multi-finger touches can also be used, such as a combination of the index finger with the thumb. The index finger and thumb can be pressed together or separated.

While FIGS. 10A-10C show only rolls, different type of gestures can be combined to more efficiently operate the controlled device. With an actual joystick, the directional movement can be controlled by returning the joystick to the center or null. For example, a quick right movement can be performed by tapping the joystick to the right and having the joystick return to the center. The directional operation can be performed, as discussed above, with a slight right roll of a finger on a touch sensitive surface. The return to center or null can be performed by a subsequent push gesture forward or to the north of the surface. The pushing gesture can be used to generate a signal to be transmitted to the car such that the car adjusts back to the center-line. In this way, a combination of a roll gesture followed by a push gesture can be used to efficiently operate the controlled device, such as by preventing over-rolling the finger and thereby over-steering the controlled object in a given direction.

Gestures other than a push can be used to perform such control and even other types of operations. For example, gestures such as subtracting fingers to slow down or stop altogether the controlled device or adding fingers to increase the rate that the operation is performed can also be used.

It should be noted that a remotely controlled device is not limited to a car as illustrated in FIG. 9. The device can be any object that can receive a signal and have operations to be controlled. This can include robots, vacuums, machinery and consumer electronic devices such as televisions, computers, dedicated music players, mobile phones and the like.

Figure 11:
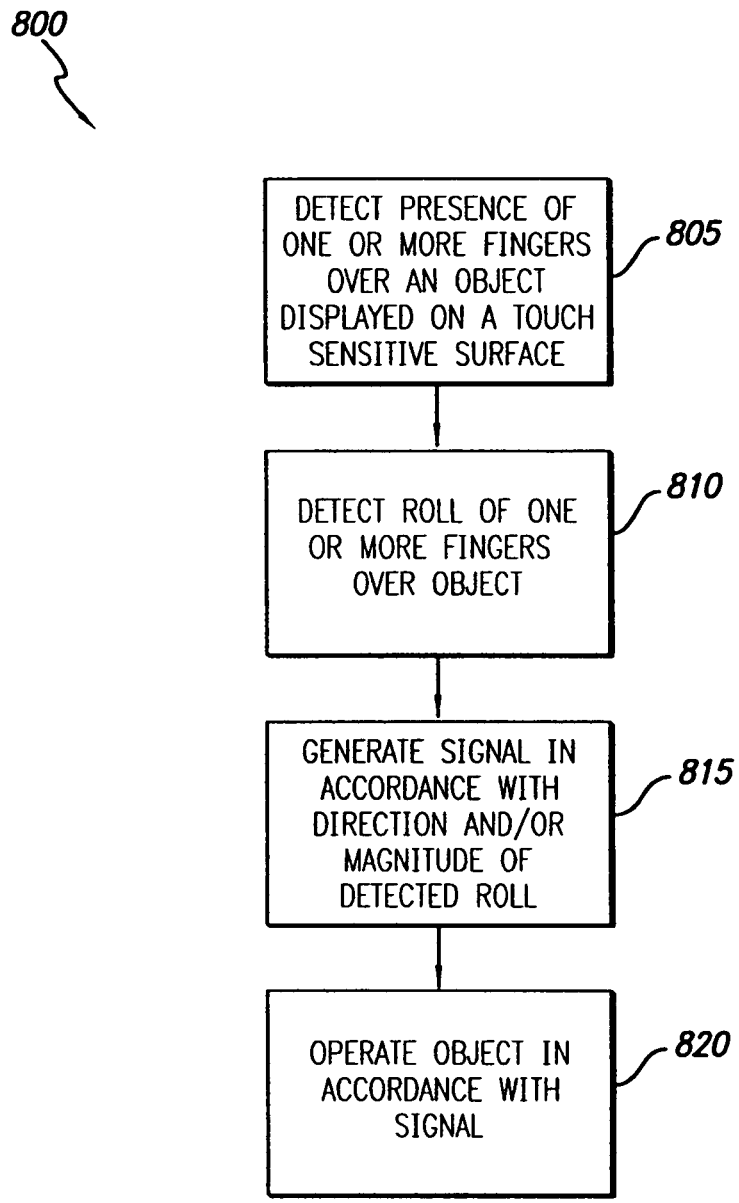
FIG. 11 is a diagram of a touch-based method in accordance with an exemplary embodiment of this invention.

The rolling gesture can be used not only to remotely control another device but also to operate the device itself. FIG. 11 is a diagram of a touch-based method 800 in which a rolling gesture on a touch sensitive surface of a sensing device can be used to operate an object or element displayed on the surface. At block 805, the sensing device can detect the presence of one or more fingers in relation to the displayed object. This can indicate to the sensing device that the user wishes to operate the object or element. At block 810, sensing device can detect a roll of the one or more fingers over the object. The user can perform this gesture to operate the selected object in the manner that he wishes. It should be noted that the detection at blocks 805 and 810 can be performed in the same manner as discussed above. Images of the touch sensitive surface can be captured, analyzed and compared to determine the manual action that is being performed on the surface. Based on the detection, the sensing device can determine the desired operation and can generate a corresponding control signal at block 815. The detection can, for example, analyze parameters such as the direction and/or magnitude of the roll. The signal can be then used to operate the object at block 820. For example, the signal can direct a scroll through the object in a direction corresponding to the direction of the roll.

Figure 12:
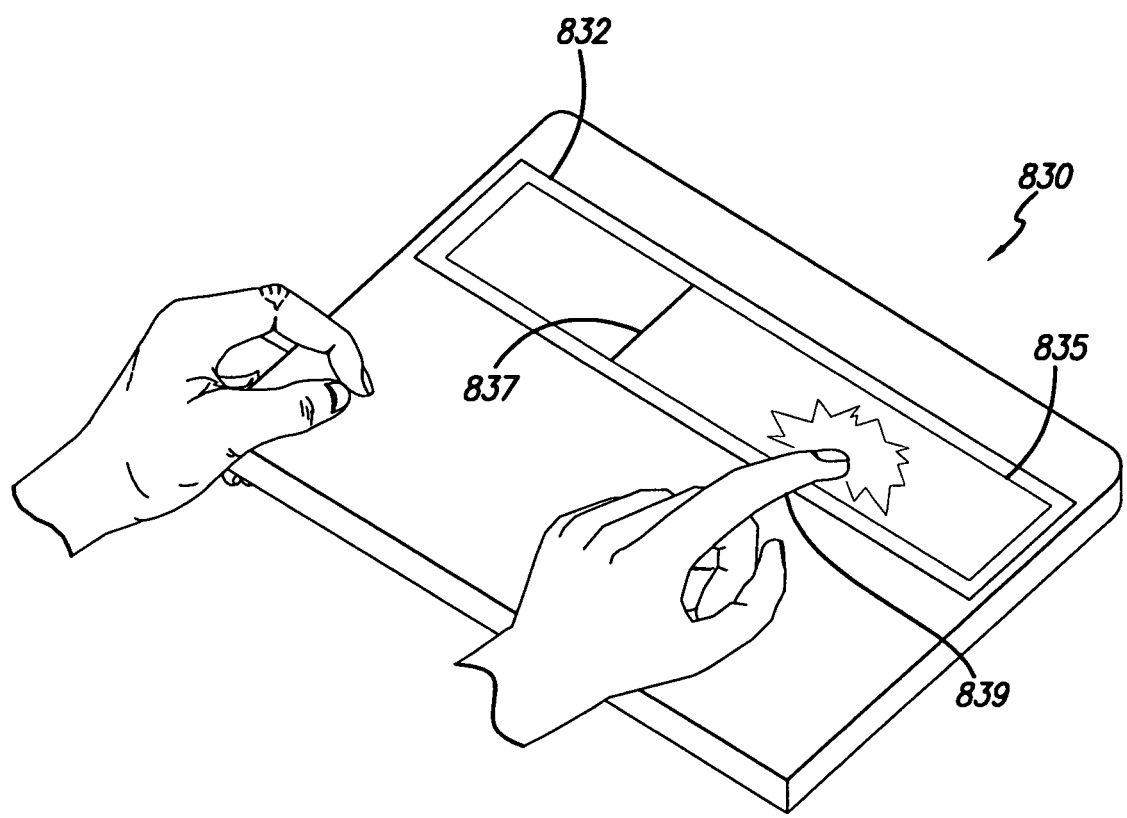
FIG. 12 illustrate a device for implementing the touch-based method of FIG. 11.

FIG. 12 illustrates a device for implementing the touch-based method of FIG. 11. The system can include a device such as dedicated media player 830 having touch sensitive display 832. Display 832 displays one or more graphical objects or elements. In FIG. 12, display 832 displays a one-dimensional timeline 835 for an audio performance played by media player 830. The timeline can include a bar 837 indicating the current play position of the audio performance. As the audio performance proceeds, bar 832 can move along the timeline from left to right. A user can input a touch on any portion of display 835, including over the timeline 835, with one or more fingers. FIG. 12 illustrates that the user is inputting a touch with his index finger 839 on timeline 835.

Figure 13A:
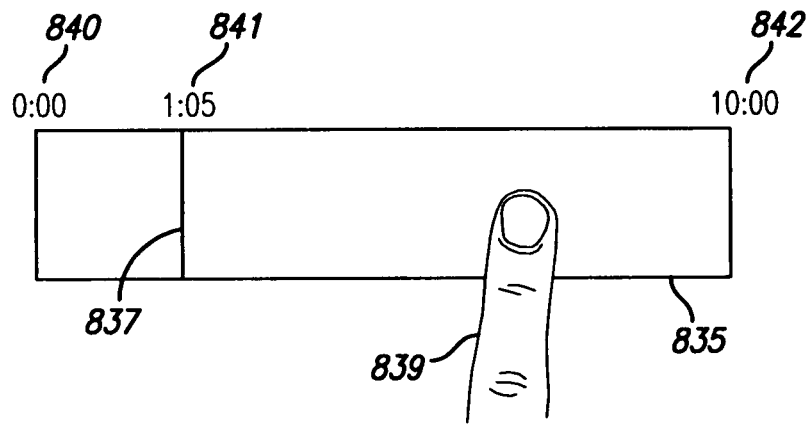
FIG. 13A-13C illustrate a rolling sequence in accordance with an exemplary embodiment of this invention.
Figure 13B:
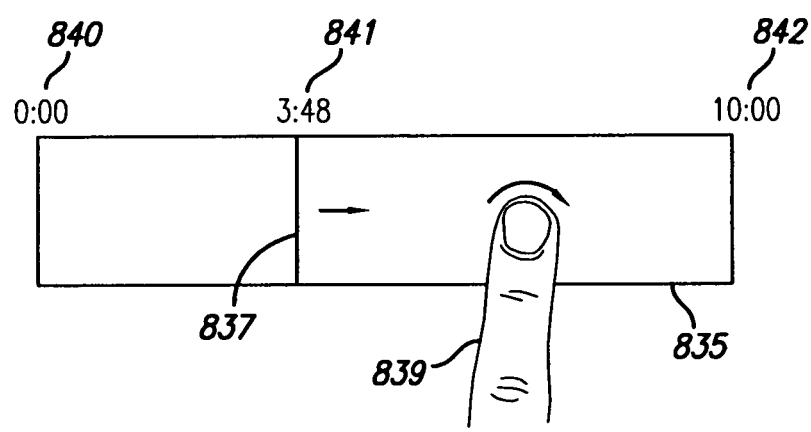
Figure 13C:
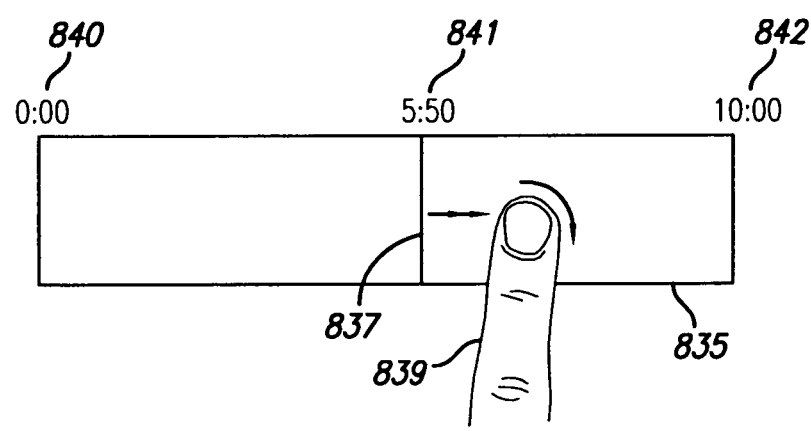

FIGS. 13A-13C provide a more detailed view of timeline 835 illustrated in FIG. 12. Timeline 835 provides a starting time 840 of the performance and an ending time 842. Above bar 837 the time 841 of the current play position is shown.

FIGS. 13A-13C also illustrate a sequence using the touch-based method 800 with the device of FIG. 12. The device can detect the user placing his finger 839 on timeline 835 as illustrated in FIG. 13A. At that moment, the current time 841 of the play position is 1:05. That is, 1:05 minutes of the performance has elapsed. The device can then detect a roll of finger 839 toward the right as indicated by the arrow above finger 839 in FIG. 13B. This gesture over the timeline can indicate that the user wants to change the play position of bar 837 by scrolling or translating through timeline 835. The roll can be analyzed to determine its direction and magnitude and a control signal can be generated based on this analysis. As shown in FIG. 13B, bar 837 begins to scroll to the right corresponding to the direction of the roll. The rate or velocity of the scroll through the timeline can be based on the magnitude of the roll. FIG. 13B shows that the roll has slowly moved bar 837 from a position at 1:05 minutes to a current position of 3:48 minutes. The user can stop the scroll with any number of gestures, such as by lifting his finger 839 or reversing the direction of the roll.

If the user wishes to rapidly scroll to the right, he can control the scroll speed by a further roll. For example, the user can roll his finger even further to the right than the roll performed in FIG. 13B. This action is illustrated in FIG. 13C by the arrow over finger 839 showing a more pronounced roll to the right. This can be done continuously with the roll of FIG. 13B. In other words, the user can place his finger on the timeline, roll it to the right and, if he wishes a faster scroll, continue his roll further to the right. Alternatively, the roll of FIG. 13C can be done at a later time. In either case, the device can detect the roll and generate a signal in accordance with the direction and magnitude of the roll. FIG. 13C illustrates bar 837 at time 5:50 and advancing faster than in FIG. 13B as indicated by the double arrows near bar 837.

It should be noted that the rolling gesture does not have to be performed on the object for the object to be operated. For example, the user can perform a gesture on a portion of the display separated from the timeline itself. The gesture can also be performed on a touch sensitive surface separated from the display of the object, such as a touchpad located below a display of a user interface. Other data from the roll could also be used in operating the element, such as the pressure of the roll or the location of the roll with respect to the timeline.

It should also be noted that the object does not have to be a timeline for an audio or video performance. The object, for example, can be a displayed video clip in which the user can scroll through the clip by rolling his finger over the displayed clip.

While the examples above have used the roll as a scroll function, the roll can be mapped to other operations. For example, a roll to the right can be used to indicate play while a roll to the left can be used to indicate stopping play.

It should also be noted that the gesture for operating of the device does not have to relate to a displayed object or element. For example, a rolling gesture to the right can be used to turn on the device and a rolling gesture to the left can be used to turn off the device. Each of these gestures is not connected to any object or element displayed on the device.

Figure 14:
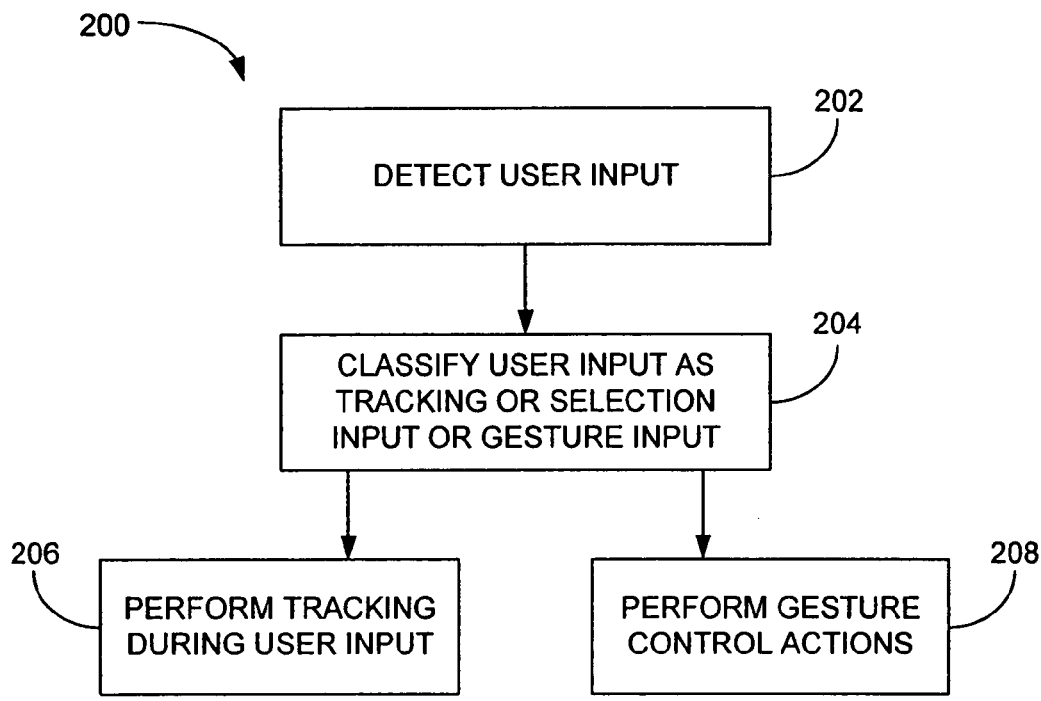
FIG. 14 is a diagram of a touch-based method in accordance with an exemplary embodiment of this invention.

FIG. 14 is a diagram of a touch-based method 200 in accordance with one embodiment of the invention. The method generally begins at block 202 where a user input that occurs over a multipoint sensing device is detected. The user input can include one or more touch inputs, with each touch input having a unique identifier. Following block 202, the touch-based method 200 proceeds to block 204 where the user input can be classified as a tracking or selection input when the user input includes a single unique identifier (one touch input), or can be classified as a gesture input when the user input includes at least two unique identifiers (more than one touch input). If the user input is classified as a tracking input, the touch-based method 200 proceeds to block 206 where tracking can be performed corresponding to the user input.

If the user input is classified as a gesture input, the touch-based method 200 proceeds to block 208 where one or more gesture control actions can be performed corresponding the user input. The gesture control actions can be based at least in part on changes that occur with or between the at least two unique identifiers.

Figure 15:
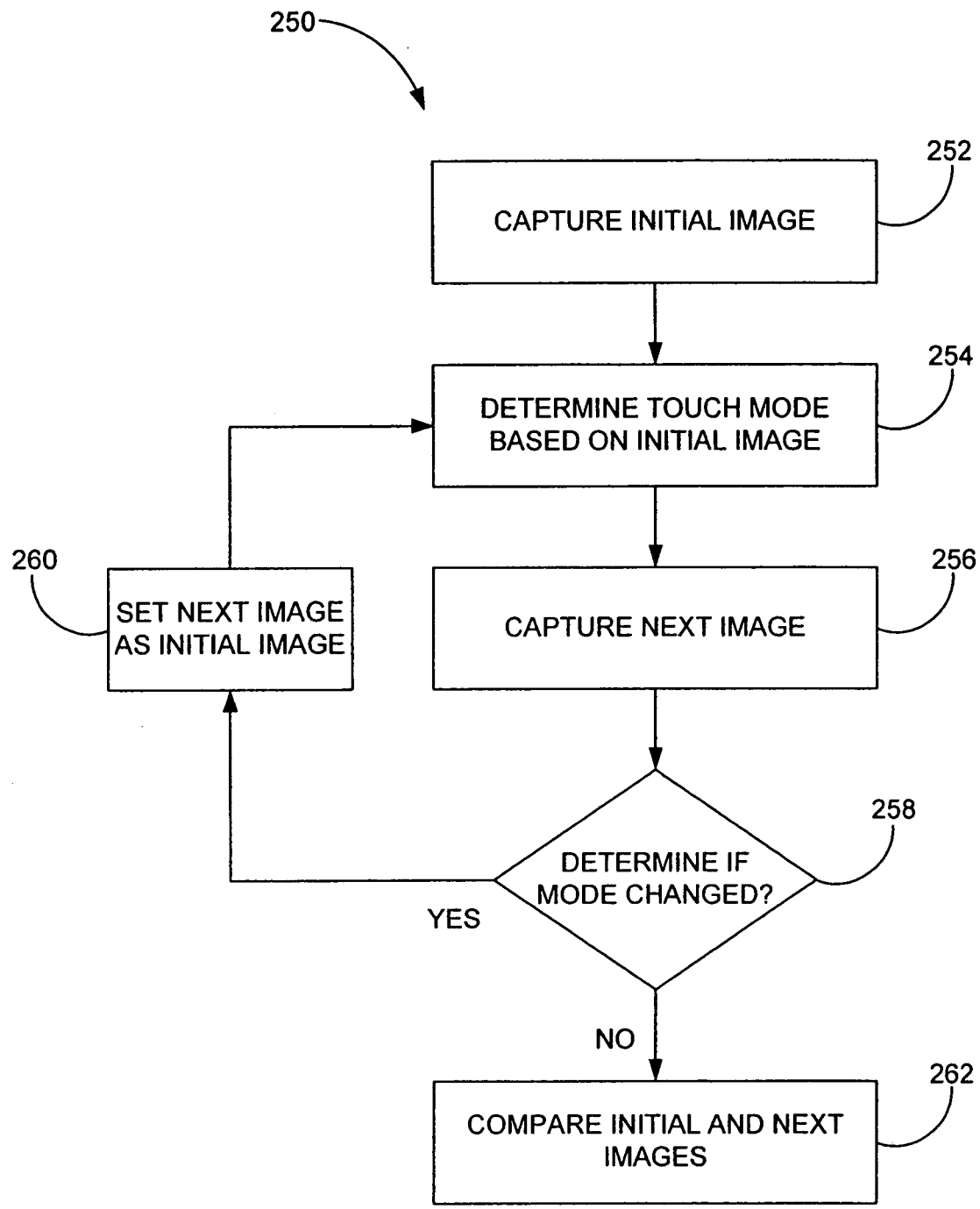
FIG. 15 is a diagram of a touch-based method in accordance with an exemplary embodiment of this invention.

FIG. 15 is a diagram of a touch-based method 250 in accordance with one embodiment of the invention. The touch-based method 250 generally begins at block 252 where an initial image can be captured during an input stroke on a touch sensitive surface. Following block 252, the touch-based method 250 proceeds to block 254 where the touch mode can be determined based on the initial image. For example, if the initial image includes a single unique identifier then the touch mode can correspond to a tracking or selection mode. On the other hand, if the image includes more than one unique identifier, then the touch mode can correspond to a gesture mode.

Following block 254, the touch-based method 250 proceeds to block 256 where a next image can be captured during the input stroke on the touch sensitive surface. Images can be typically captured sequentially during the stroke and thus there can be a plurality of images associated with the stroke.

Following block 256, touch-based method 250 proceeds to block 258 where a determination can be made as to whether the touch mode changed between capture of the initial image and capture of the next image. If the touch mode changed, the touch-based method 250 proceeds to block 260 where the next image can be set as the initial image and thereafter the touch mode can be again determined at block 254 based on the new initial image. If the touch mode stayed the same, the touch-based method 250 proceeds to block 262 where the initial and next images can be compared and one or more control signals can be generated based on the comparison.

Figure 16:
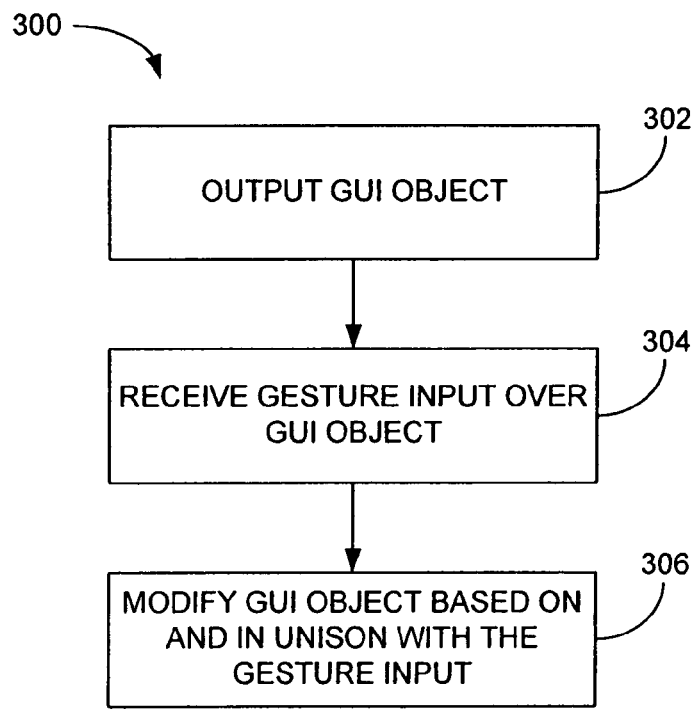
FIG. 16 is a diagram of a touch-based method in accordance with an exemplary embodiment of this invention.

FIG. 16 is a diagram of a touch-based method 300 in accordance with one embodiment of the invention. The touch-based method 300 begins at block 302 where an image object, which can be a GUI object, can be output. For example, a processor can instruct a display to display a particular image object. Following block 302, the touch-based method 300 proceeds to block 304 where a gesture input can be received over the image object. For instance, a user can set or move their fingers in a gestural way on the surface of the touch screen and while over the displayed image object. The gestural input can include one or more single gestures that occur consecutively or multiple gestures that occur simultaneously. Each of the gestures can generally have a particular sequence, motion, or orientation associated therewith. For example, a gesture can include spreading fingers apart or closing fingers together, rotating the fingers, translating the fingers, and/or the like.

Following block 304 the touch-based method 300 proceeds to block 306 where the image object can be modified based on and in unison with the gesture input. By modified, it is meant that the image object can change according to the particular gesture or gestures being performed. By in unison, it is meant that the changes can occur approximately while the gesture or gestures are being performed. In most cases, there can be a one to one relationship between the gesture(s) and the changes occurring at the image object, and they can occur substantially simultaneously. In essence, the image object can follow the motion of the fingers. For example, spreading of the fingers can simultaneously enlarge the object, closing of the fingers can simultaneously reduce the image object, rotating the fingers can simultaneously rotate the object, and translating the fingers can allow simultaneous panning or scrolling of the image object.

In one embodiment, block 306 can include determining which image object is associated with the gesture being performed, and thereafter locking the displayed object to the fingers disposed over it such that the image object changes in accordance with the gestural input. By locking or associating the fingers to the image object, the image object can continuously adjust itself in accordance to what the fingers are doing on the touch screen. Often the determination and locking can occur at touch down, i.e., when the finger is positioned on the touch screen.

Figure 17:
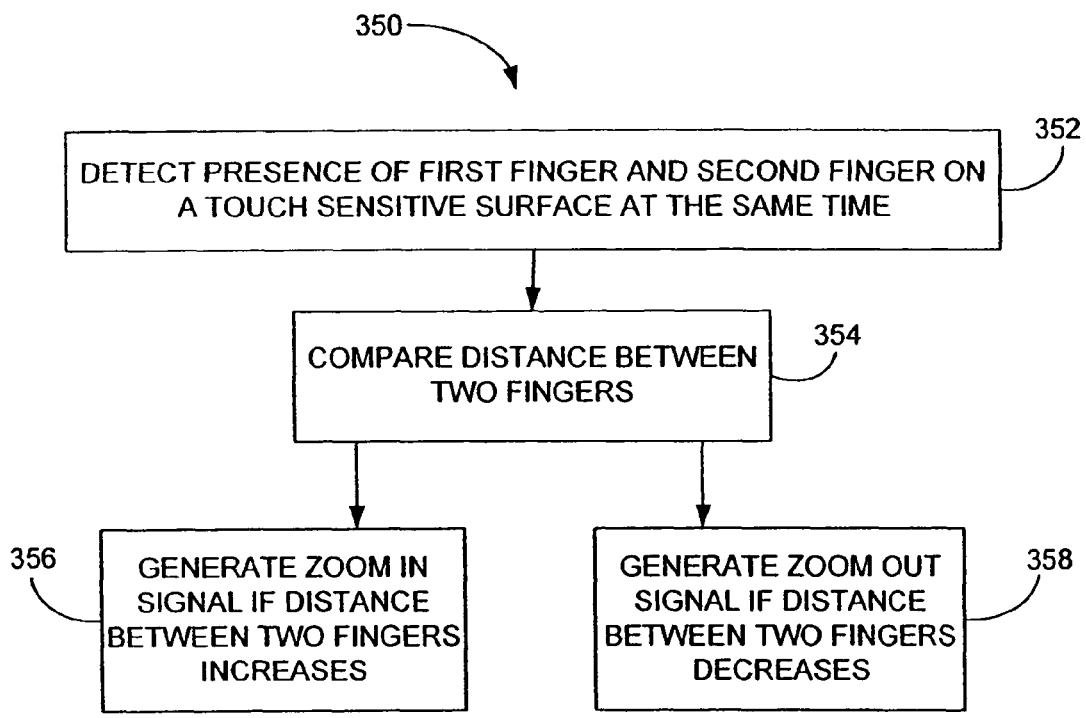
FIG. 17 is a diagram of a zoom gesture method in accordance with an exemplary embodiment of this invention.

FIG. 17 is a diagram of a zoom gesture method 350, in accordance with one embodiment of the invention. The zoom gesture can be performed on a multipoint touch screen such as the multi-touch panel 24 shown in FIG. 2. The zoom gesture method 350 generally begins at block 352 where the presence of at least a first finger and a second finger can be detected on a touch sensitive surface at the same time. The presence of at least two fingers can be configured to indicate that the touch is a gestural touch rather than a tracking touch based on one finger. In some cases, the presence of only two fingers can indicate that the touch is a gestural touch. In other cases, any number of more than two fingers can indicate that the touch is a gestural touch. In fact, the gestural touch can be configured to operate whether two, three, four or more fingers are touching, and even if the numbers change during the gesture, i.e., only need a minimum of two fingers at any time during the gesture.

Following block 352, the zoom gesture method 350 proceeds to block 354 where the distance between at least the two fingers can be compared. The distance can be from finger to finger or from each finger to some other reference point as for example the centroid. If the distance between the two fingers increases (spread apart), a zoom-in signal can be generated as shown in block 356. If the distance between two fingers decreases (close together), a zoom-out signal can be generated as shown in block 358. In most cases, the touch down of the fingers can associate or lock the fingers to a particular image object being displayed. For example, the touch sensitive surface can be a touch screen, and the image object can be displayed on the touch screen. This typically occurs when at least one of the fingers can be positioned over the image object. As a result, when the fingers are moved apart, the zoom-in signal can be used to increase the size of the embedded features in the image object and when the fingers are pinched together, the zoom-out signal can be used to decrease the size of embedded features in the object. The zooming typically occurs within a predefined boundary such as the periphery of the display, the periphery of a window, the edge of the image object, and/or the like. The embedded features can be formed on a plurality of layers, each of which represents a different level of zoom.

In most cases, the amount of zooming varies according to the distance between the two objects. Furthermore, the zooming typically can occur substantially simultaneously with the motion of the objects. For instance, as the fingers spread apart or closes together, the object zooms in or zooms out at the same time. Although this methodology is directed at zooming, it should be noted that it can also be used for enlarging or reducing. The zoom gesture method 350 can be particularly useful in graphical programs such as publishing, photo, and drawing programs. Moreover, zooming can be used to control a peripheral device such as a camera, i.e., when the finger is spread apart, the camera zooms out, and when the fingers are closed the camera zooms in.

Figure 18A:
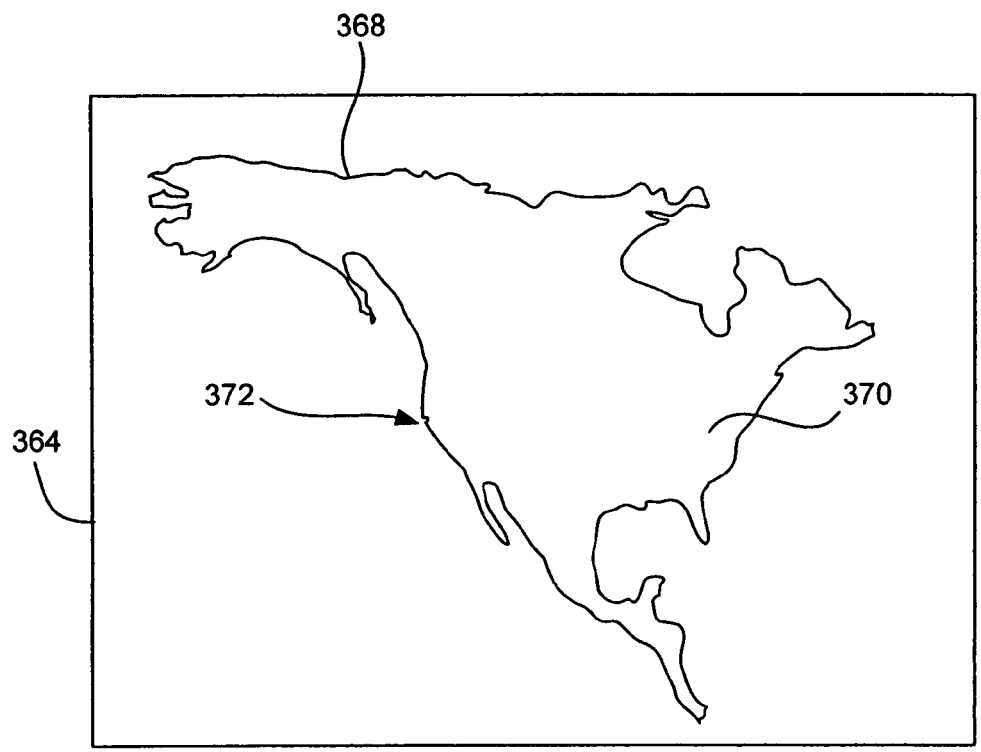
FIG. 18A-18H illustrates a zooming sequence in accordance with an exemplary embodiment of this invention.
Figure 18B:
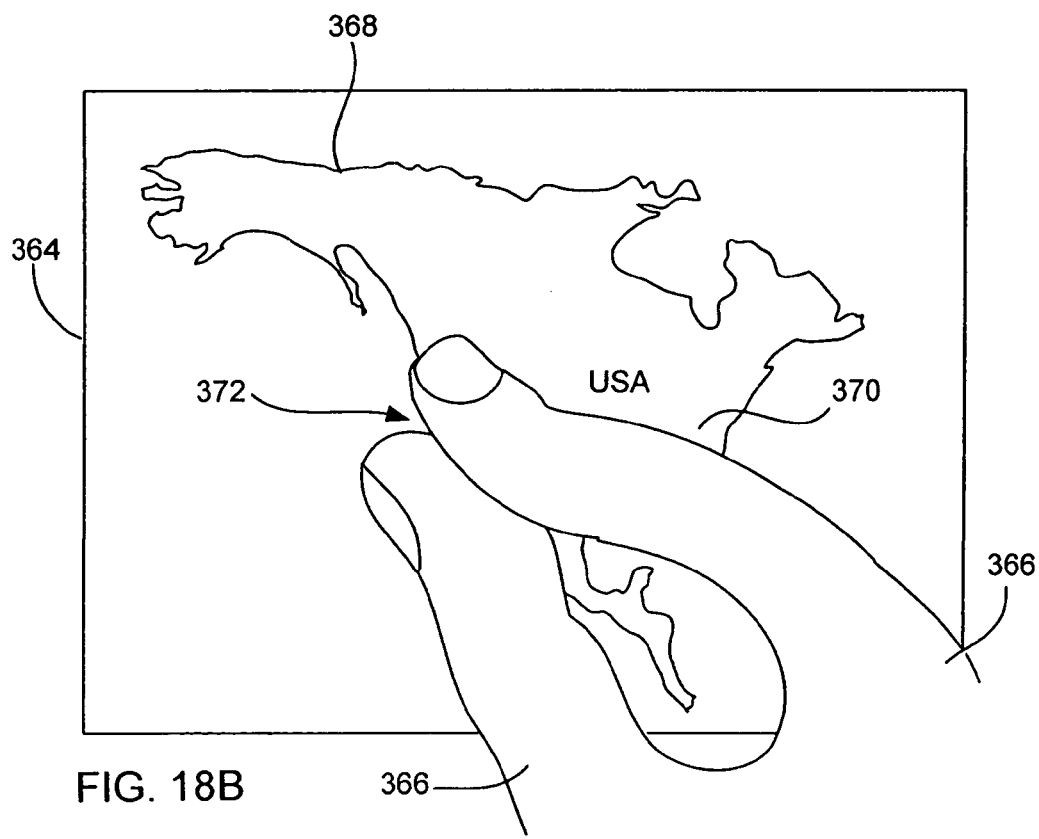
Figure 18C:
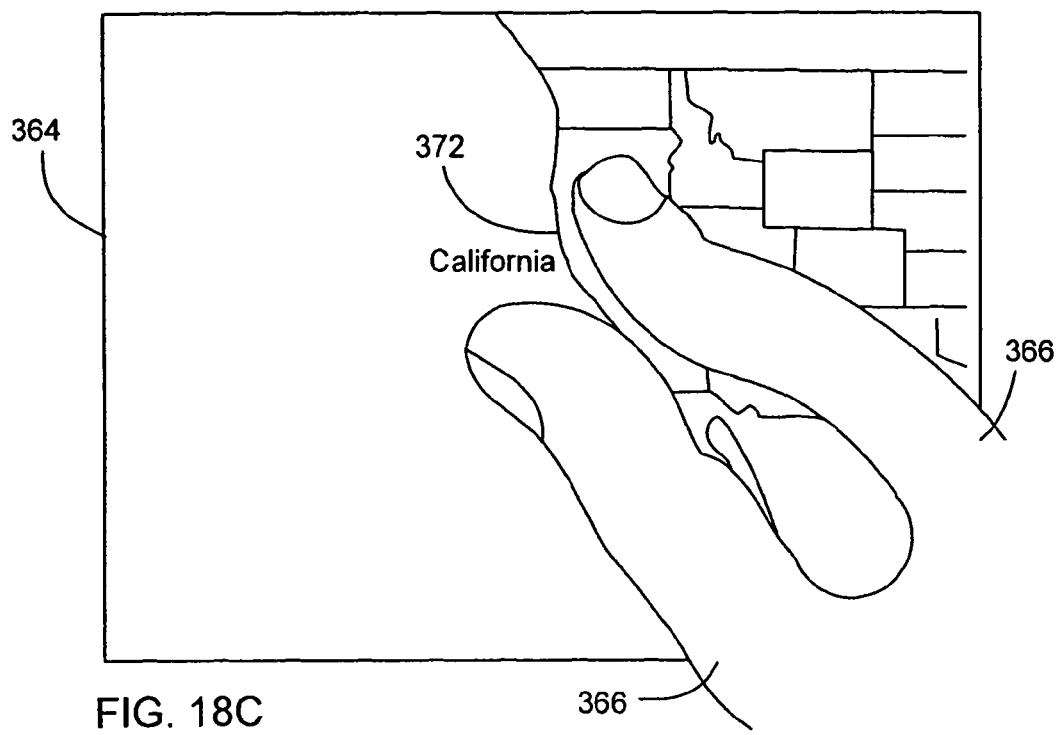
Figure 18D:
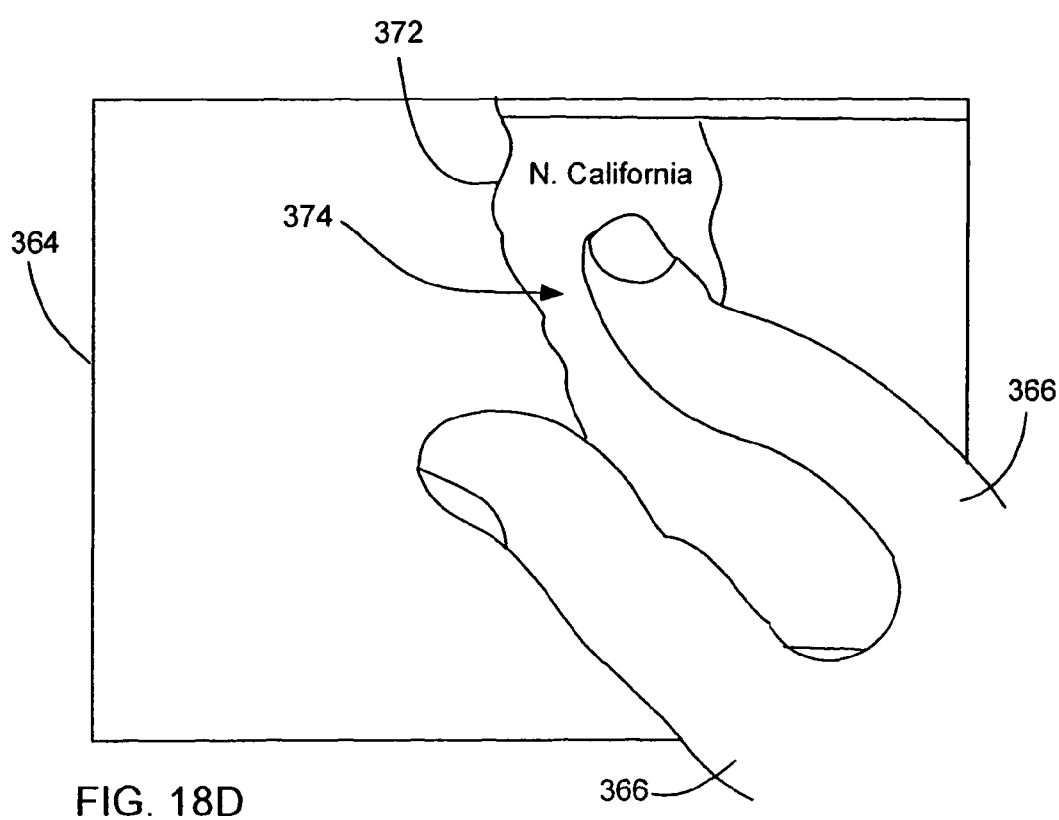
Figure 18E:
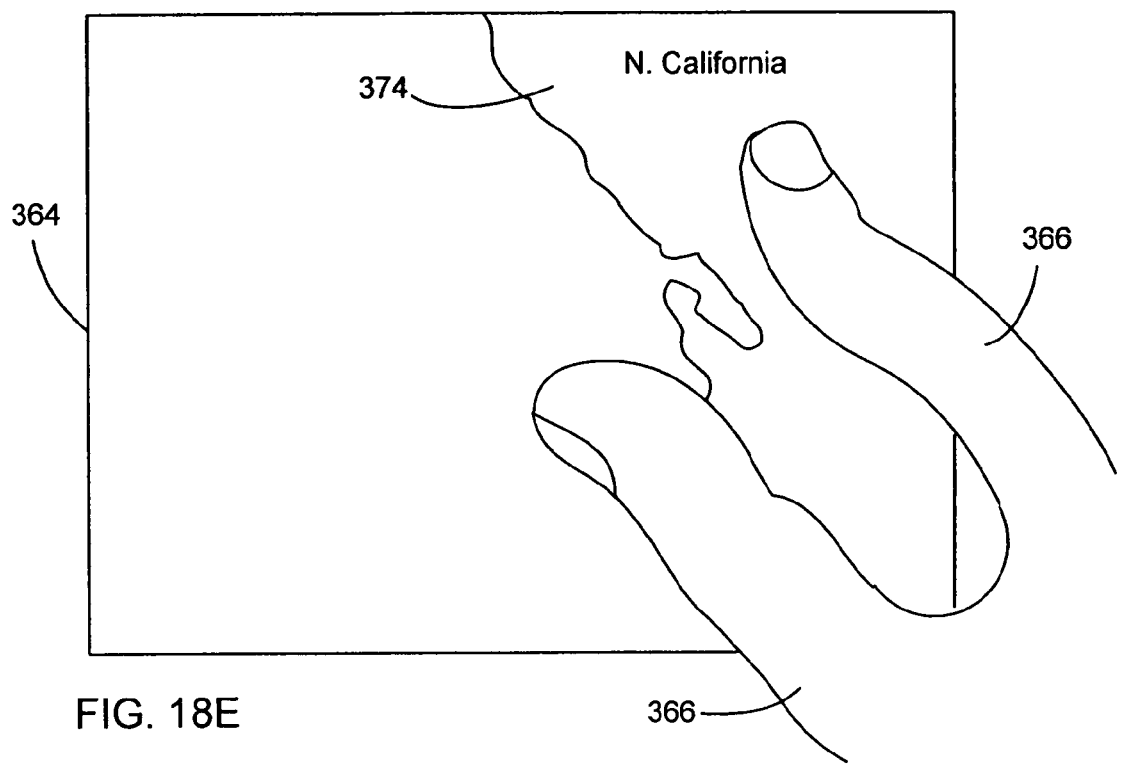
Figure 18F:
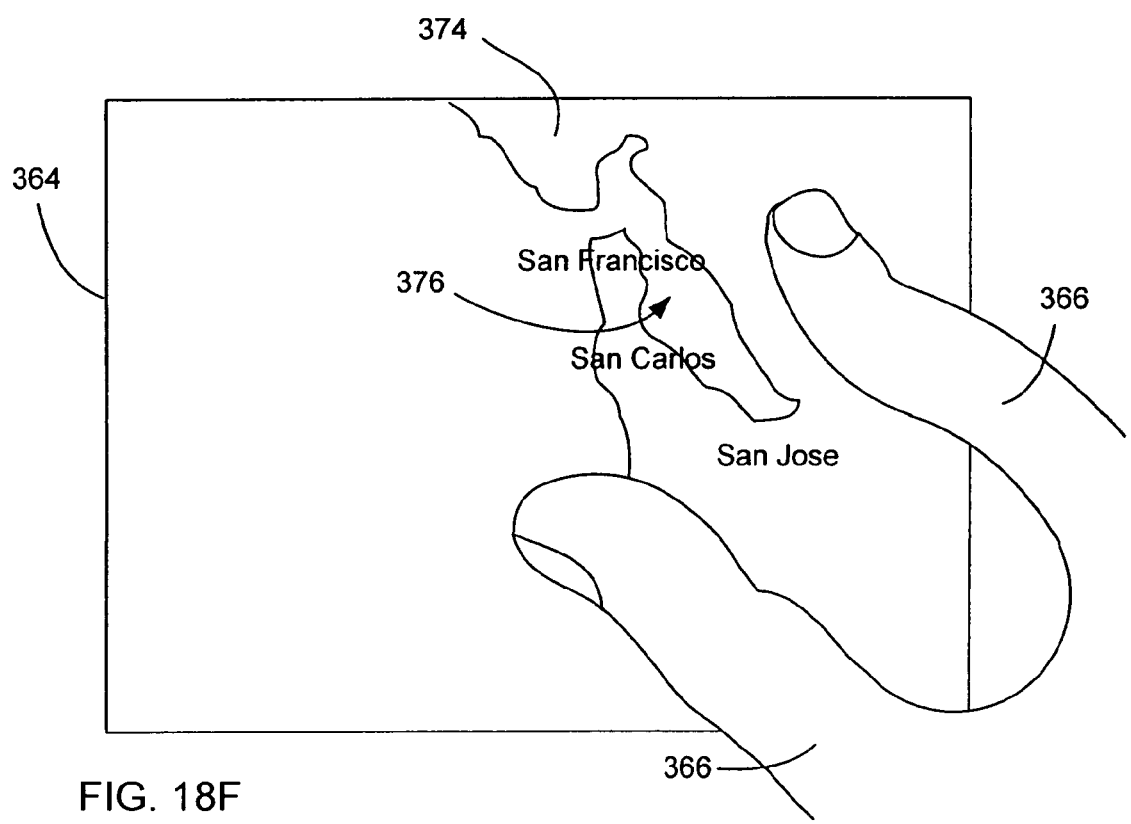
Figure 18G:
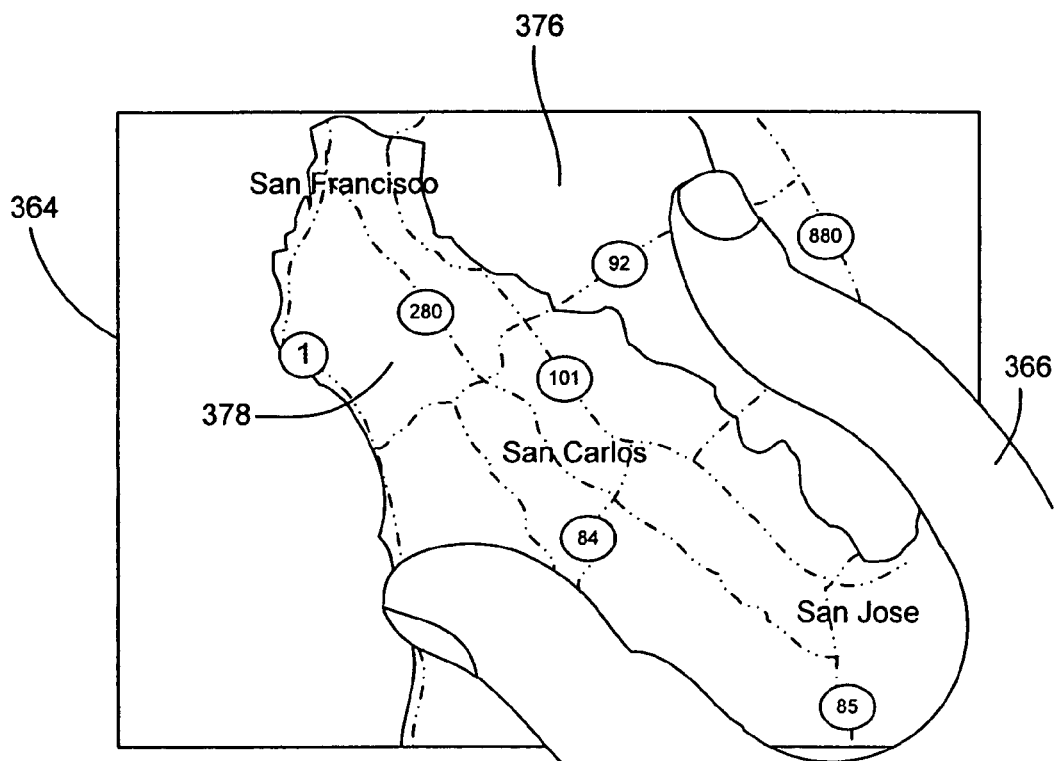
Figure 18H:
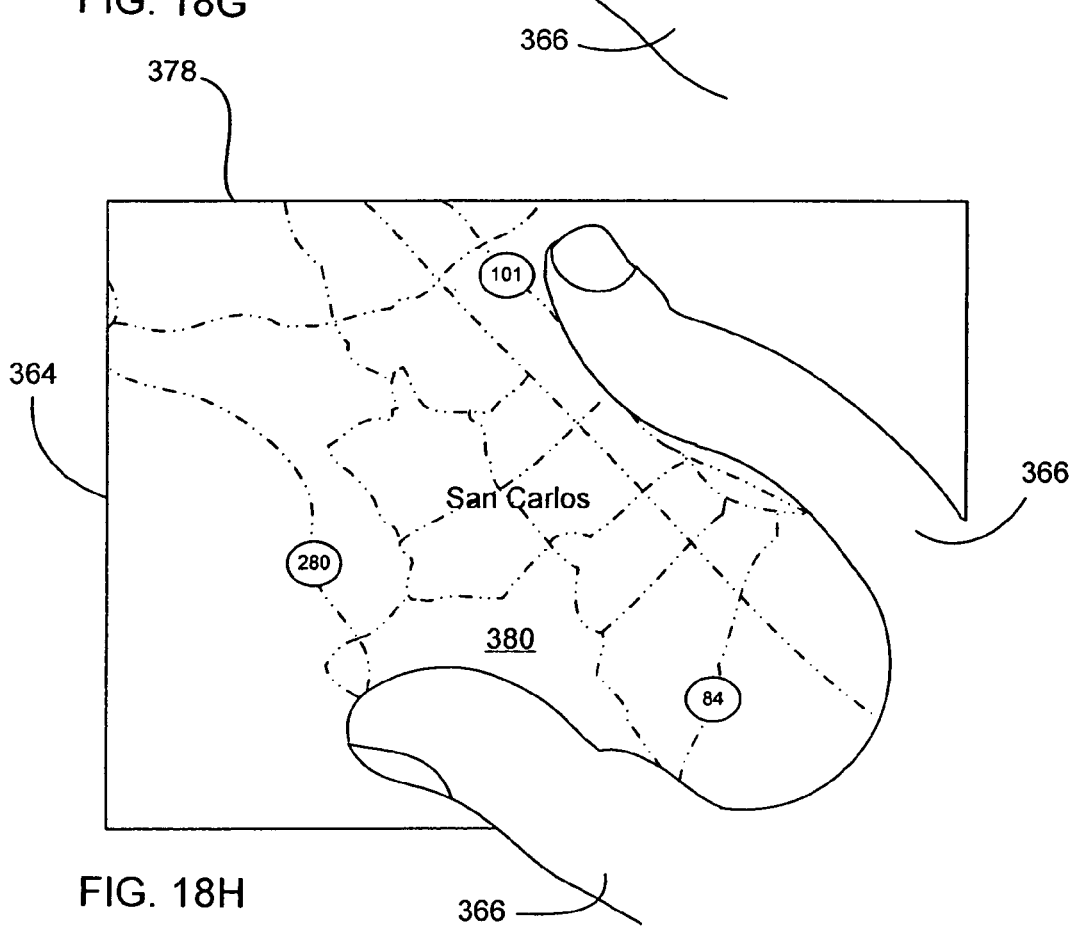

FIGS. 18A-18H illustrate a zooming sequence using the method described above. FIG. 18A illustrates a display presenting an image object 364 in the form of a map of North America with embedded levels which can be zoomed. In some cases, as shown, the image object can be positioned inside a window that forms a boundary of the image object 364. FIG. 18B illustrates a user positioning their fingers 366 over a region of North America 368, particularly the United States 370 and more particularly California 372. In order to zoom in on California 372, the user can start to spread their fingers 366 apart as shown in FIG. 18C. As the fingers 366 spread apart further (detected distance increases), the map can zoom in further on Northern California 374, then to a particular region of Northern California 374, then to the Bay area 376, then to the peninsula 378 (e.g., the area between San Francisco and San Jose Area), and then to the city of San Carlos 380 located between San Francisco and San Jose as illustrated in FIGS. 18D-18H. In order to zoom out of San Carlos 380 and back to North America 368, the fingers 366 can be closed back together following the sequence described above, but in reverse.

Figure 19:
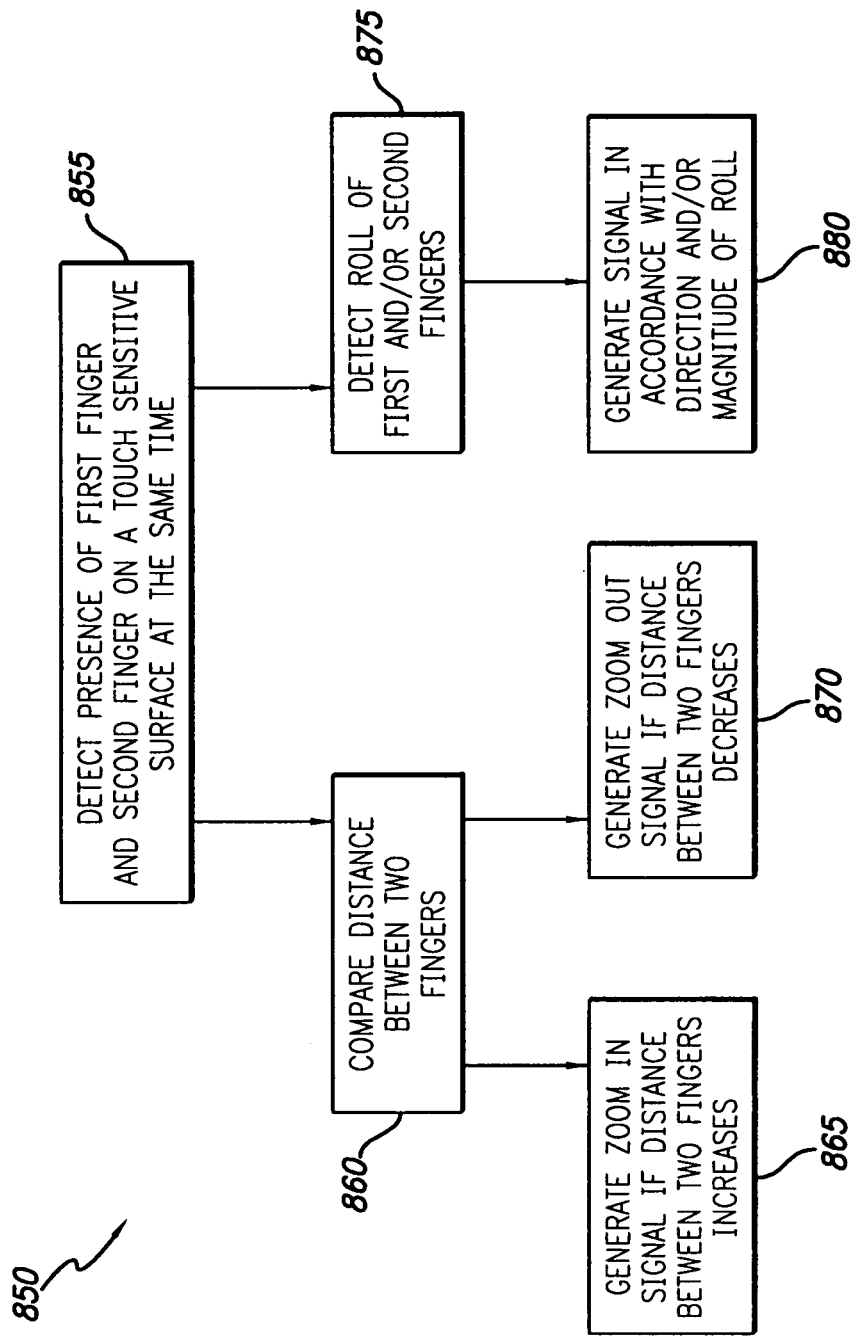
FIG. 19 is a diagram of a zoom gesture and a rolling gesture method in accordance with an exemplary embodiment of this invention.

The rolling gesture described above with respect to FIG. 11 can be used with other gestures to provide a robust control over, for example, a user interface. FIG. 19 is a diagram of a zoom gesture method described above with respect to FIG. 17 used in conjunction with the rolling gesture method described above with respect to FIG. 11. The combination of gestures can be performed on a touch sensitive surface of a device.

The method 850 begins at block 855 where the presence of a first finger and a second finger can be detected on the touch sensitive surface. After block 855, images of the fingers can be captured and analyzed to compare the distance between the two fingers at block 865 and to detect whether one or both fingers have been rolled at block 875. The analysis of the images can be performed in the same manner as discussed above. For example, touches can be identified in the images and touch data between images can be compared to determine if the distance between the fingers has increased or decreased or whether one or both fingers has rolled. Such analysis can determine whether the user has performed a zoom gesture, a roll gesture or even both at the same time.

Based on the gesture or gestures performed, the method proceeds to the remaining blocks. If the distance between the two fingers has increased, a zoom in signal can be generated at block 865 as discussed above. Similarly, if the distance between the two fingers has decreased, a zoom out signal can be generated at block 875 as discussed above. If a roll is detected, a signal can be generated in accordance with the direction and/or magnitude of the roll at block 880. If both a zoom gesture and a roll gesture are performed, two signals can be simultaneously generated to perform a zoom operation and a roll operation. As can be appreciated, images of the fingers can be repetitively captured and analyzed, so that consecutive gestures, such as a zoom gesture followed by a roll gesture, can also be detected.

Figure 20A:
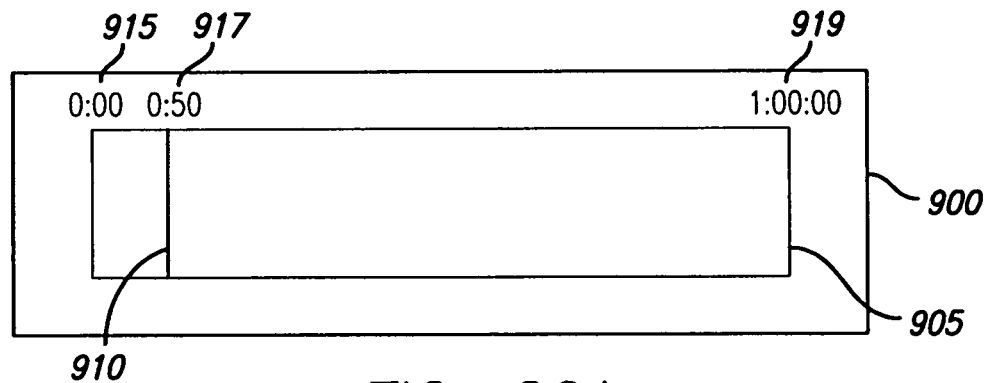
FIGS. 20A-20C illustrate a zooming and rolling sequence in accordance with an exemplary embodiment of this invention.
Figure 20B:
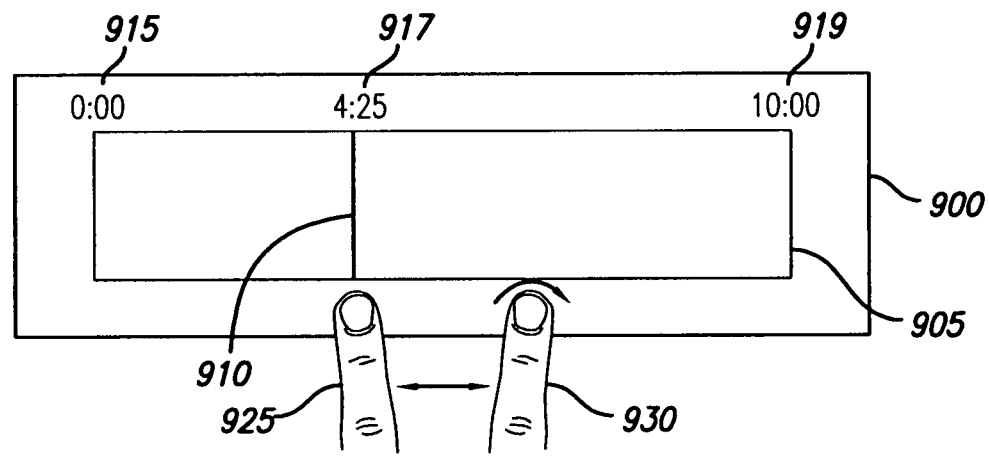
Figure 20C:
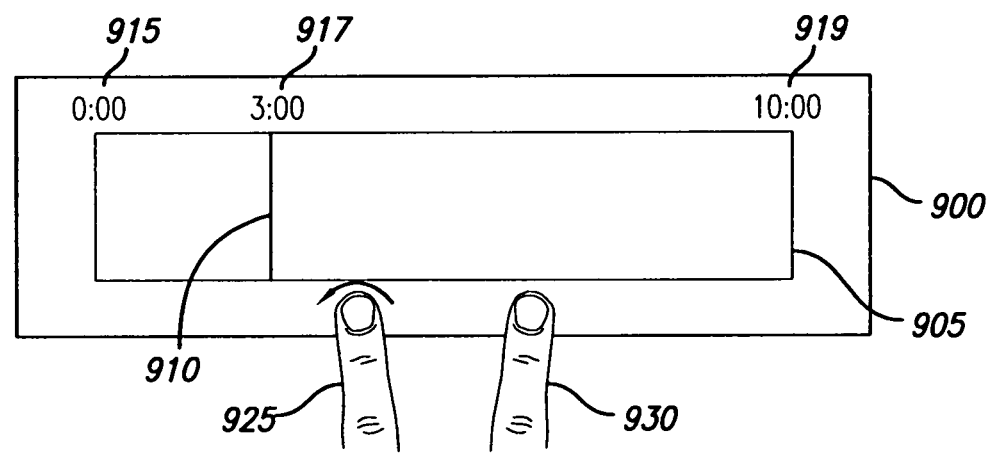

FIGS. 20A-20C illustrate a zooming and rolling sequence using the touch based method 900 described above. In this exemplary sequence, a zoom gesture and a roll gesture can be performed simultaneously and another roll gesture is performed thereafter. FIGS. 20A-20C illustrate touch sensitive surface 900 of a device displaying a timeline 905 of an audio performance such as described with respect to FIGS. 12-13C. As illustrated in FIG. 20A, the timeline can display a bar 910 corresponding to the current play position of the audio performance. Surface 900 can display the time 915 when the performance began, the time 917 of the current play position and the time 919 when the performance will end. Specifically, the performance begins at 0 minutes and 0 seconds, the current play position is at 0.50 seconds and the performance terminates at 1 hour.

In this example, the one-hour length of the performance can make it difficult for the user to adequately scroll to a desired play position early in the performance, such as in the first five minutes. To easily scroll to the desired play position, the user can place two figures on surface 900 and perform a zoom and roll gesture simultaneously.

Specifically, FIG. 20B illustrates the user placing two fingers 925 and 930 on surface 900. The device can detect the presence of these two fingers. As illustrated by the arrows, the distance between the fingers can be increased as finger 930 is simultaneously turned to the right. These two simultaneous gestures can indicate a zoom in and a roll to the right. The device can generates a zoom in signal to zoom in to the timeline. In this example, the zoom in can correspond to a change in scale of the timeline. As the distance between the fingers 925 and 930 expands, the scale can correspondingly reduce. In this example, the timeline is scaled down to from 0 minutes at 915 to 1 hour at 919 in FIG. 20A to 0 minutes at 915 to 10 minutes at 919 in FIG. 20B. The device can also generate a signal to scroll bar 910 in the right direction such that the bar is moved to a current play position of 4:25 at 917 in FIG. 20B. The merged gestures of zooming in and rolling can allow the user to better control the position of the bar in the first five minutes of the timeline by reducing the scale of the timeline so that the rolling can be more finely controlled.

FIG. 20C shows that the user performing another gesture, either continuously with the gestures of FIG. 20B or at a time interval thereafter. The device can detect a roll gesture to the left by finger 925. It can generate a signal to move the current play position from 4:25 at 917 in FIG. 20B to 3:00 minutes at 917 in FIG. 20C. Because the user has not changed the distance between his fingers in performing this roll, the scale of the timeline can remain the same.

It should be noted that zoom out can be performed to scale up the timeline. This can be useful if the performance is lengthy and the user wishes to quickly scroll to end of the performance. While the zoom in and zoom out gestures are illustrated as being performed with two fingers, others gestures can also be used. For example, zoom in could be performed by a swipe in a given direction and zoom out by a swipe in another direction.

Other gestures, such as pan and rotate, can also be used in conjunction with the rolling gesture in a similar manner. For example, the user can pan to different portions of the timeline and roll his finger to control the current play position in the panned portioned. The pan and rotate gestures are discussed below.

Figure 21:
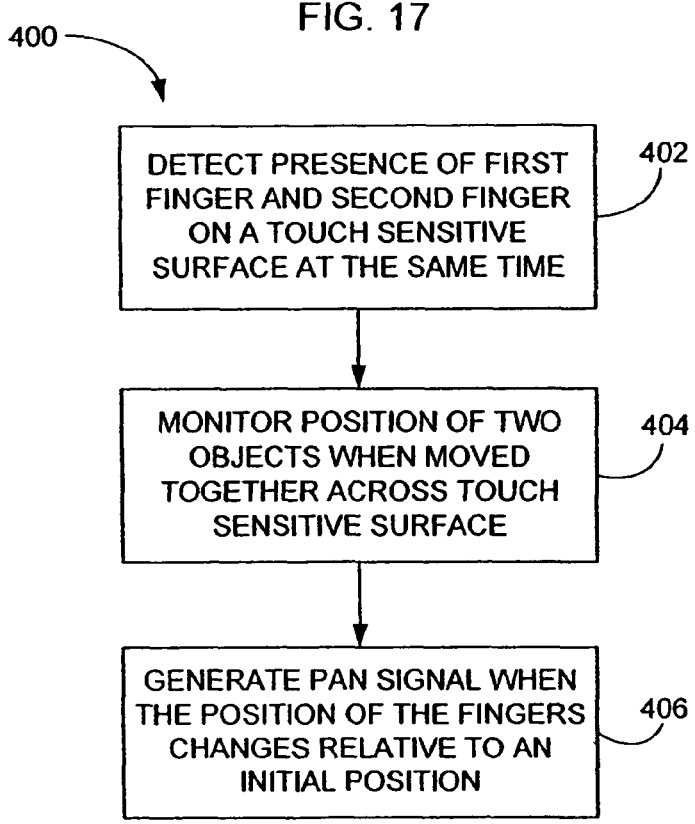
FIG. 21 is a diagram of a pan method, in accordance with one embodiment of this invention.

FIG. 21 is a diagram of a pan method 400, in accordance with one embodiment of the invention. The pan gesture can be performed on a multipoint touch screen. The pan method 400 generally begins at block 402 where the presence of at least a first object and a second object can be detected on a touch sensitive surface at the same time. The presence of at least two fingers can be configured to indicate that the touch is a gestural touch rather than a tracking touch based on one finger. In some cases, the presence of only two fingers can indicate that the touch is a gestural touch. In other cases, any number of more than two fingers can indicate that the touch is a gestural touch. In fact, the gestural touch can be configured to operate whether two, three, four or more fingers are touching, and even if the numbers change during the gesture, i.e., need a minimum of only two fingers.

Following block 402, the pan method 400 proceeds to block 404 where the position of the two objects when the objects are moved together across the touch screen can be monitored. Following block 404, the pan method 400 proceeds to block 406 were a pan signal can be generated when the position of the two objects changes relative to an initial position. In most cases, the touch down of the fingers can associate or lock the fingers to a particular image object displayed on the touch screen, typically, when at least one of the fingers is positioned over the position on the image object. As a result, when the fingers are moved together across the touch screen, the pan signal can be used to translate the image in the direction of the fingers. In most cases, the amount of panning can vary according to the distance the two objects move. Furthermore, the panning typically can occur substantially simultaneously with the motion of the objects. For instance, as the fingers move, the object can move with the fingers at the same time.

Figure 22A:
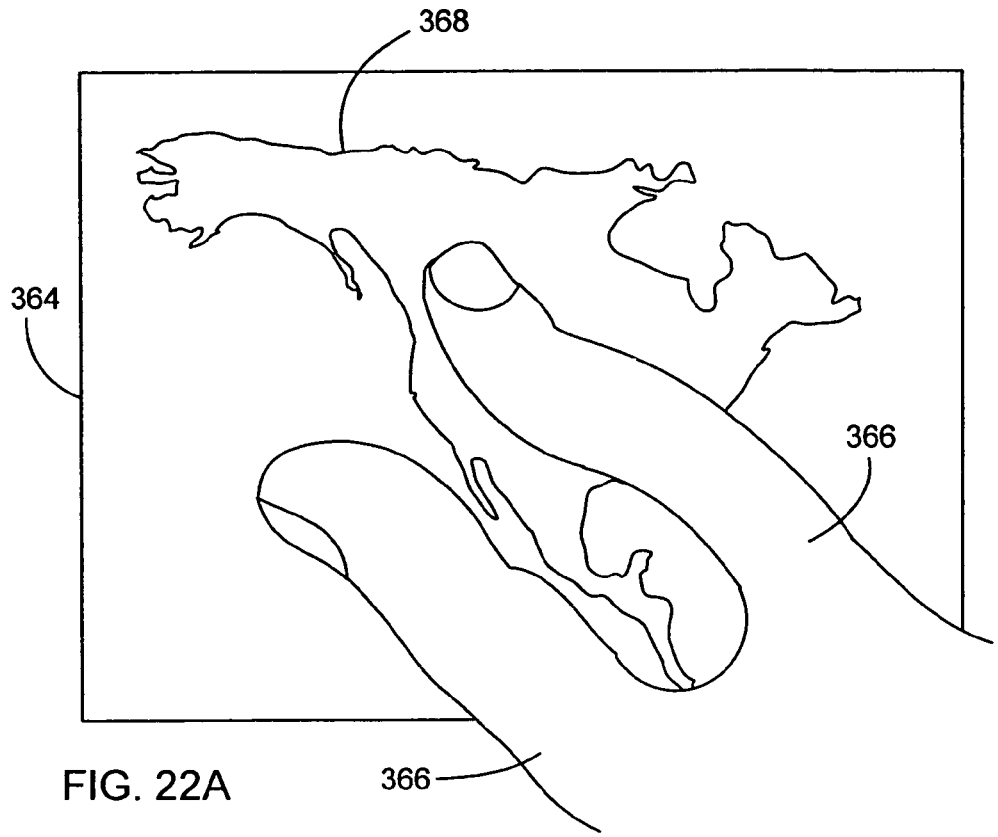
FIGS. 22A-22D illustrate a panning sequence in accordance with an exemplary embodiment of this invention.
Figure 22B:
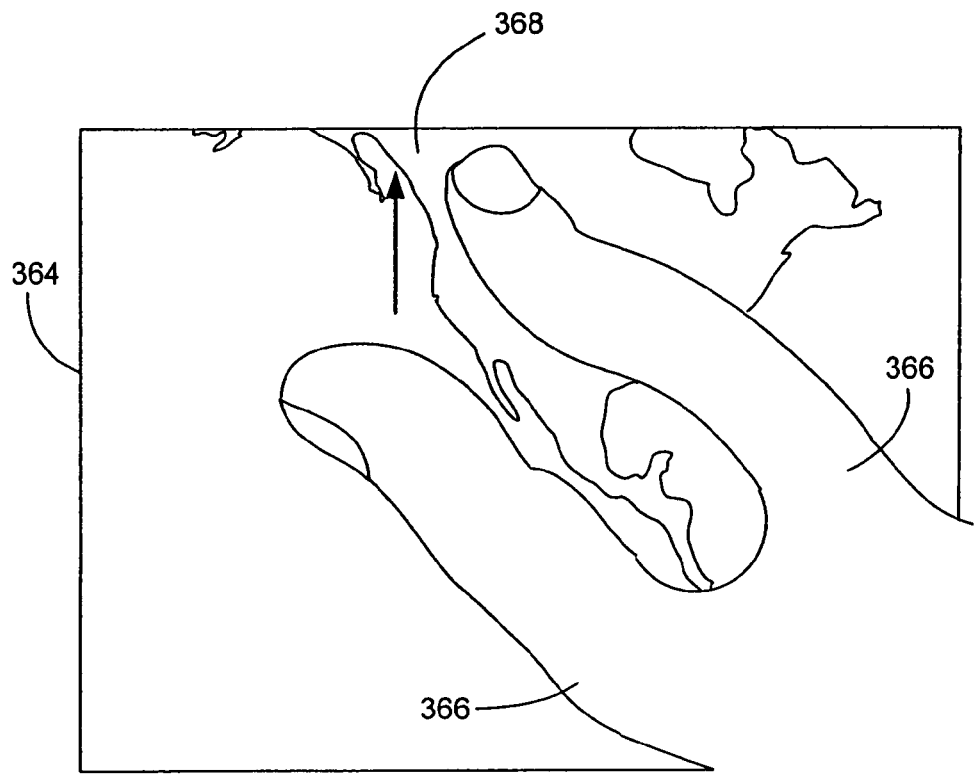
Figure 22C:
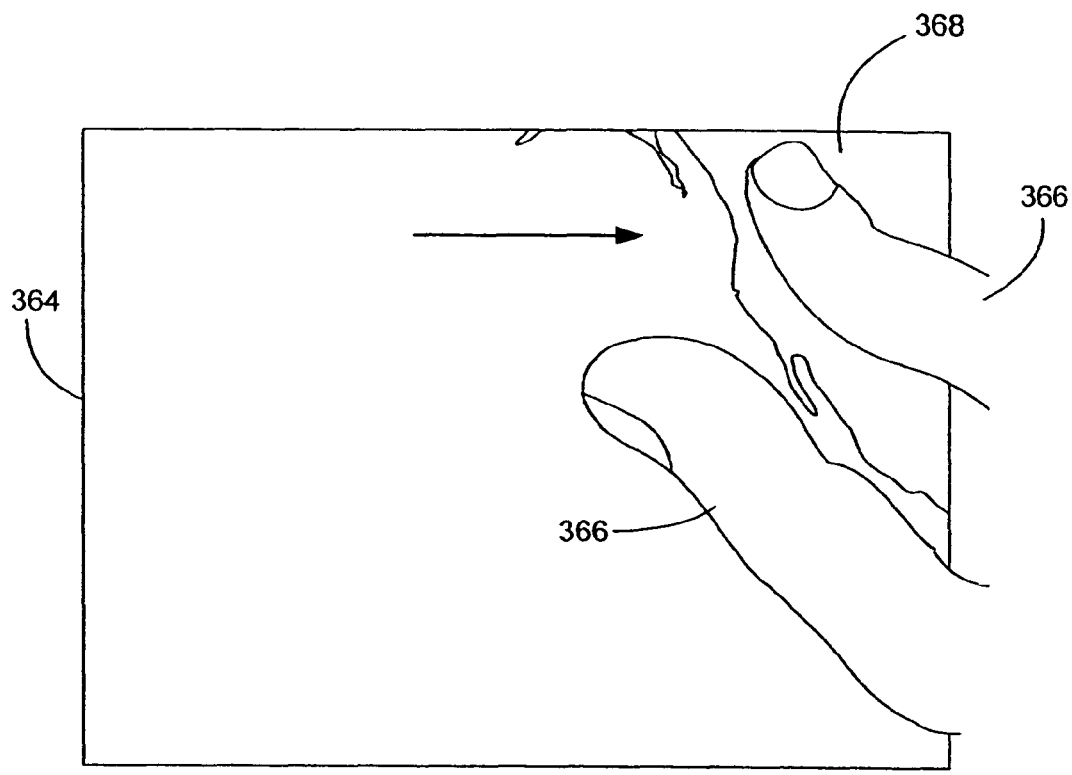
Figure 22D:
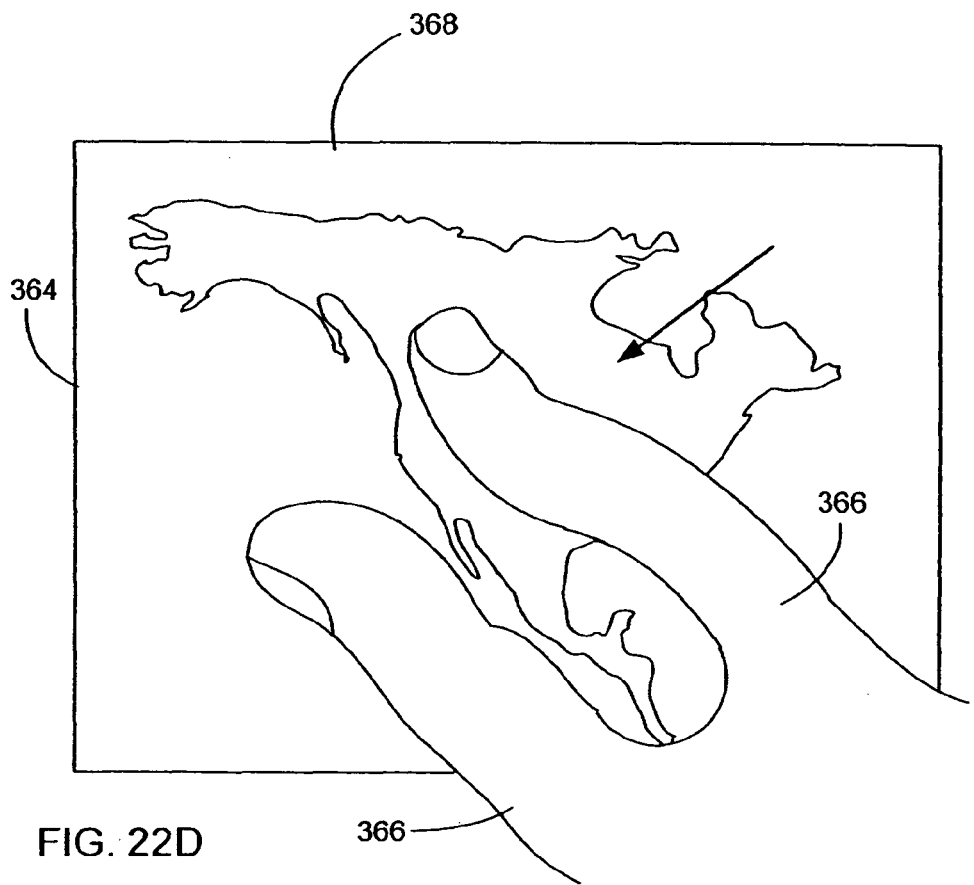

FIGS. 22A-22D illustrate a panning sequence based on the pan method 400 described above. Using the map of FIG. 18A, FIG. 22A illustrates a user positioning their fingers 366 over the map. Upon touch down, the fingers 366 can be locked to the map. As shown in FIG. 22B, when the fingers 366 are moved vertically up, the entire map 364 can be moved up thereby causing previously seen portions of map 364 to be placed outside the viewing area and unseen portions of the map 364 to be placed inside the viewing area. As shown in FIG. 22C, when the fingers 366 are moved horizontally sideways, the entire map 364 can be moved sideways thereby causing previously seen portions of map 364 to be placed outside the vowing area and unseen portions of the map to be placed inside the viewing area. As shown in FIG. 22D, when the fingers 366 are moved diagonally, the entire map 364 can be moved diagonally thereby causing previously seen portions of map 364 to be placed outside the viewing area and unseen portions of the map to be placed inside the viewing area. As should be appreciated, the motion of the map 364 can follow the motion of the fingers 366. This process is similar to sliding a piece of paper along a table. The pressure the fingers exert on the paper can lock the paper to the fingers and when the fingers are slid across the table, the piece of paper moves with them.

Figure 23:
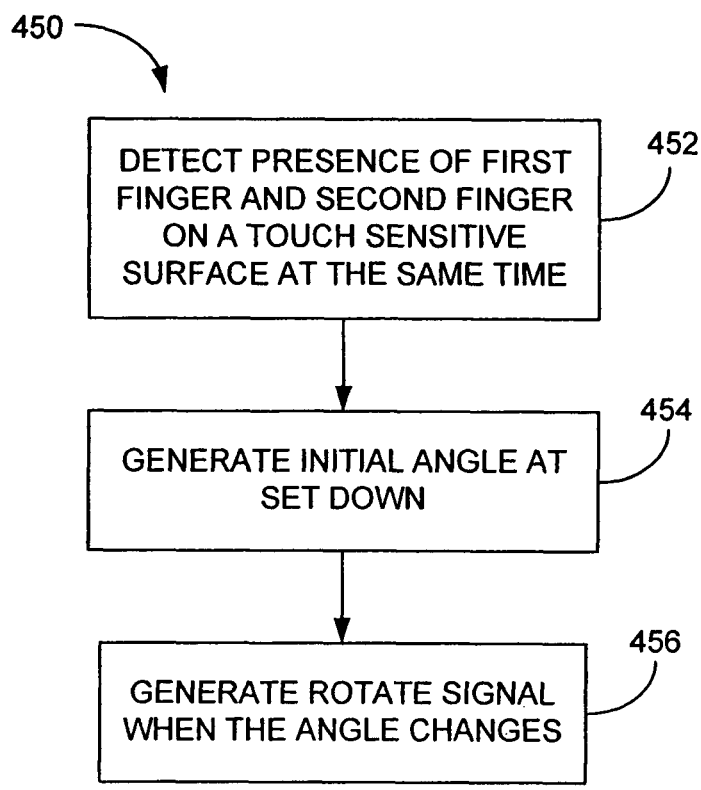
FIG. 23 is a diagram of a rotate method in accordance with an exemplary embodiment of this invention.

FIG. 23 is a diagram of a rotate method 450, in accordance with one embodiment of the invention. The rotate gesture can be performed on a multipoint touch screen. The rotate method 450 generally begins at block 452 where the presence of a first object and a second object can be detected at the same time. The presence of at least two fingers can be configured to indicate that the touch is a gestural touch rather than a tracking touch based on one finger. In some cases, the presence of only two fingers can indicate that the touch is a gestural touch. In other cases, any number of more than two fingers can indicate that the touch is a gestural touch. In still some other instances, the gestural touch can be configured to operate whether two, three, four or more fingers are touching, and even if the numbers change during the gesture, i.e., only need a minimum of two fingers.

Following block 452, the rotate method 450 proceeds to block 454 where the angle of each of the finger can be set. The angles can be typically determined relative to a reference point. Following block 454; rotate method 450 proceeds to block 456 where a rotate signal can be generated when the angle of at least one of the objects changes relative to the reference point. In most cases, the touch down of the fingers can associate or lock the fingers to a particular image object displayed on the touch screen. Typically, when at least one of the fingers is positioned over the image on the image object, the image object can be associated with or locked to the fingers. As a result, when the fingers are rotated, the rotate signal can be used to rotate the object in the direction of finger rotation (e.g., clockwise, counterclockwise). In most cases, the amount of object rotation varies according to the amount of finger rotation, i.e., if the fingers move 5 degrees then so will the object. Furthermore, the rotation typically can occur substantially simultaneously with the motion of the fingers. For instance, as the fingers rotate, the object can rotate with the fingers at the same time.

Figure 24A:
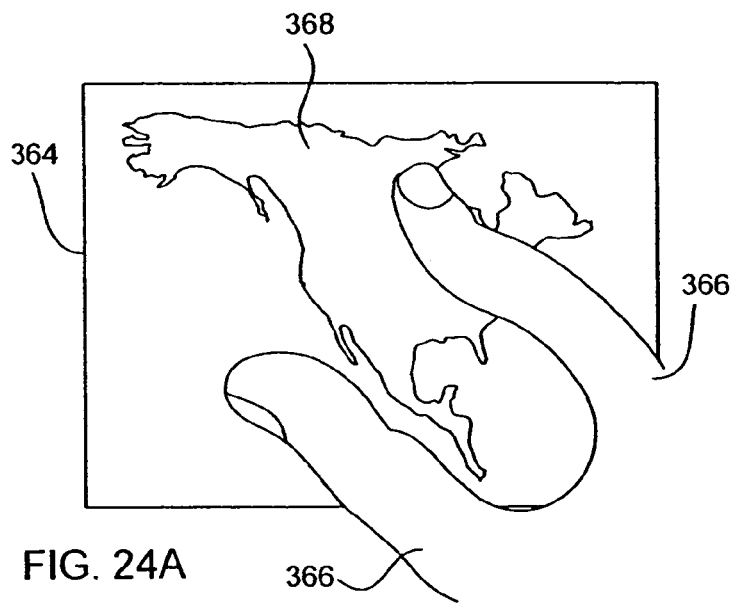
FIGS. 24A-24C illustrate a rotating sequence in accordance with an exemplary embodiment of this invention.
Figure 24B:
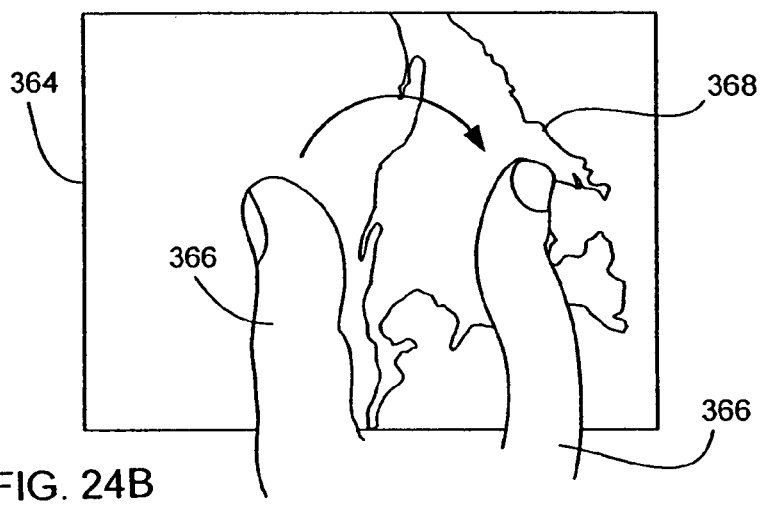
Figure 24C:
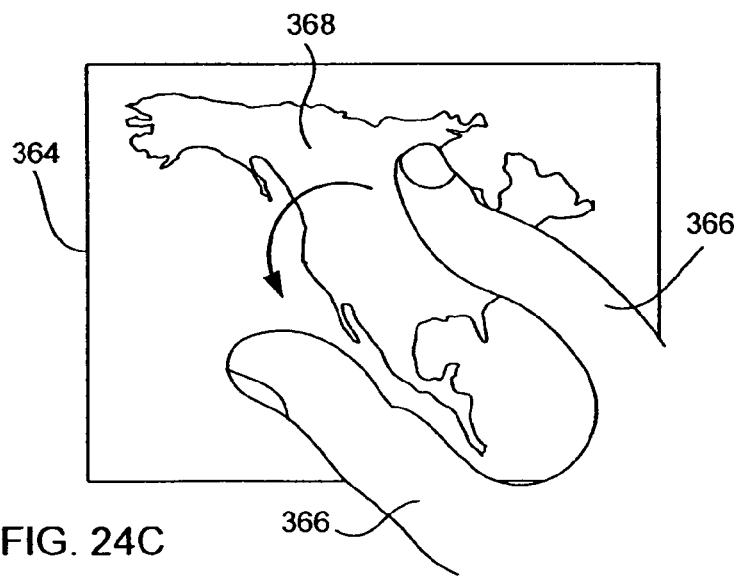

FIGS. 24A-24C illustrate a rotating sequence based on the method describe above. Using the map of. FIG. 18, FIG. 24A illustrates a user positioning their fingers 366 over the map 364. Upon touch down, the fingers 366 can be locked to the map 364. As shown in FIG. 24B, when the fingers 366 are rotated in a clockwise direction, the entire map 364 can be rotated in the clockwise direction in accordance with the rotating fingers 366. As shown in FIG. 24C, when the fingers 366 are rotated in a counterclockwise direction, the entire map 364 can be rotated in the counter clockwise direction in accordance with the rotating fingers 366.

It should be noted that the methods described above can be implemented simultaneously during the same gestural stroke. That is, selecting, tracking, zooming, rotating and panning can all be performed during a gestural stroke, which can include spreading, rotating and sliding fingers. For example, upon touch down with at least two fingers, the displayed object (map) can be associated or locked to the two fingers. In order to zoom, the user can spread or close their fingers. In order to rotate, the user can rotate their fingers. In order to pan, the user can slide their fingers. Each of these actions can occur simultaneously in a continuous motion. For example, the user can spread and close their fingers while rotating and sliding them across the touch screen. Alternatively, the user can segment each of these motions without having to reset the gestural stroke. For example, the user can first spread their fingers, then rotate their fingers, then close their fingers, then slide their fingers and so on.

It should also be noted that it is not necessary to always use a human finger to effect gestural input. Where possible, it can be also sufficient to use a pointing device, such as a stylus, to effect gestural input.

Additional examples of gestural strokes that can be used as inputs for effecting interface commands, including interactions with UI elements (e.g., a virtual scroll wheel), are shown and described in commonly assigned co-pending U.S. application Ser. No. 11/038,590, published as U.S. patent publication no. US2006/0026535, the entirety of which is hereby incorporated by reference, and commonly assigned co-pending application Ser. No. 10/903,964, published as U.S. patent publication no. US2006/0026521, the entirety of which is also hereby incorporated by reference.

The placement of a touch sensitive surface on a device can enable a set of gestures. For example, expanding the size of the touch sensitive surface or placing touch sensitive surfaces on more than one surface of a device can enable a set of gestures for configuring the operation of the device, for operating the device or object and for enabling additional gestures for operating the device or object.

Figure 25:
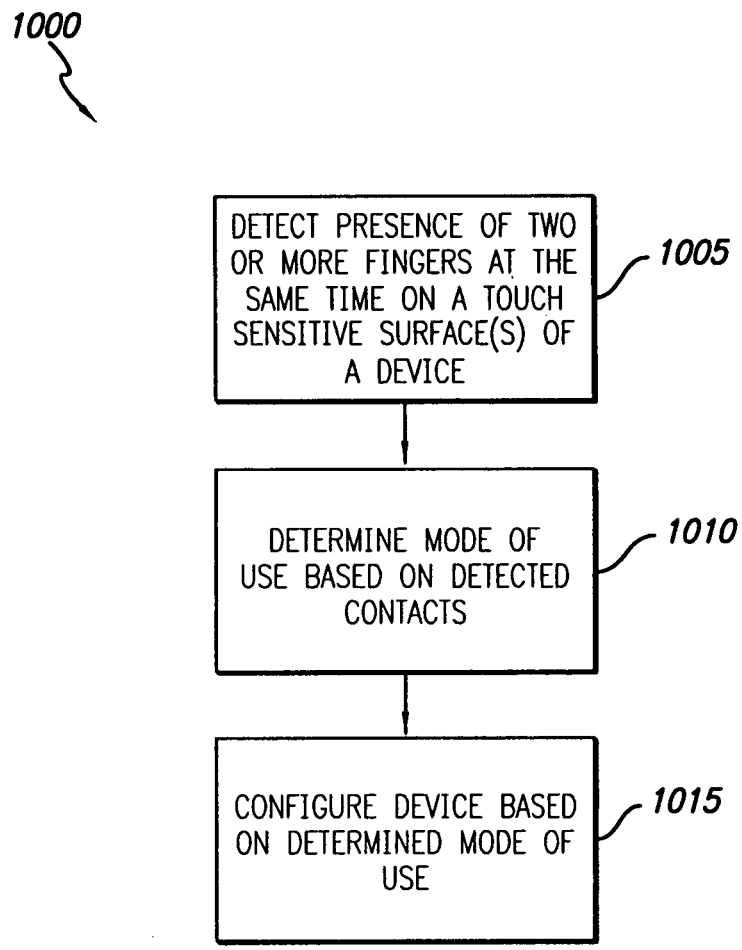
FIG. 25 is a diagram of a touch-based method in accordance with an exemplary embodiment of this invention.

FIG. 25 is a diagram of a touch-based method 1000. The method begins at block 1005 where the presence of two or more fingers can be detected on a touch sensitive surface or surfaces of a device at the same time. The surface or surfaces can be placed on the device in a manner that allows the detection of gestures, such as a right handed grasp, that would not be easily detected by a small, rectangular touch sensitive surface on a front surface of the device.

The images of the touch sensitive surface or surfaces can be analyzed to determine data or parameters such as in the manner discussed above. Based on the analysis, at block 1010, the detected contacts can be used to determine the mode of use of the device. For example, the mode of use can be that a right hand has grasped the device. At block 1015, the device can be configured based on the detected mode of use. For example, the user interface of the device can be adjusted based on a left hand operation given that the right hand has grasped the device. Configuration can also relate to recalibrating the sensor bias for operations based on a right or left hand operation.

Figure 26A:
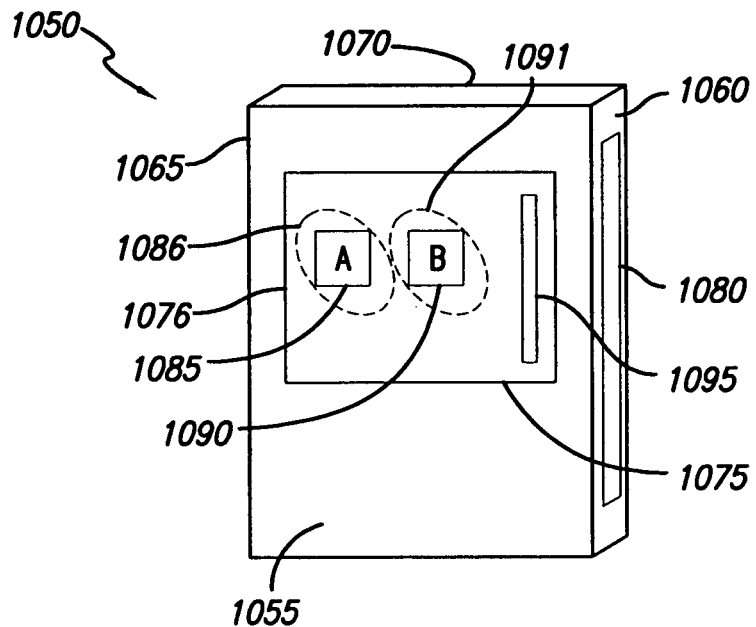
FIGS. 26A and 26B illustrate a device for implementing the touch-based method of FIG. 25.
Figure 26B:
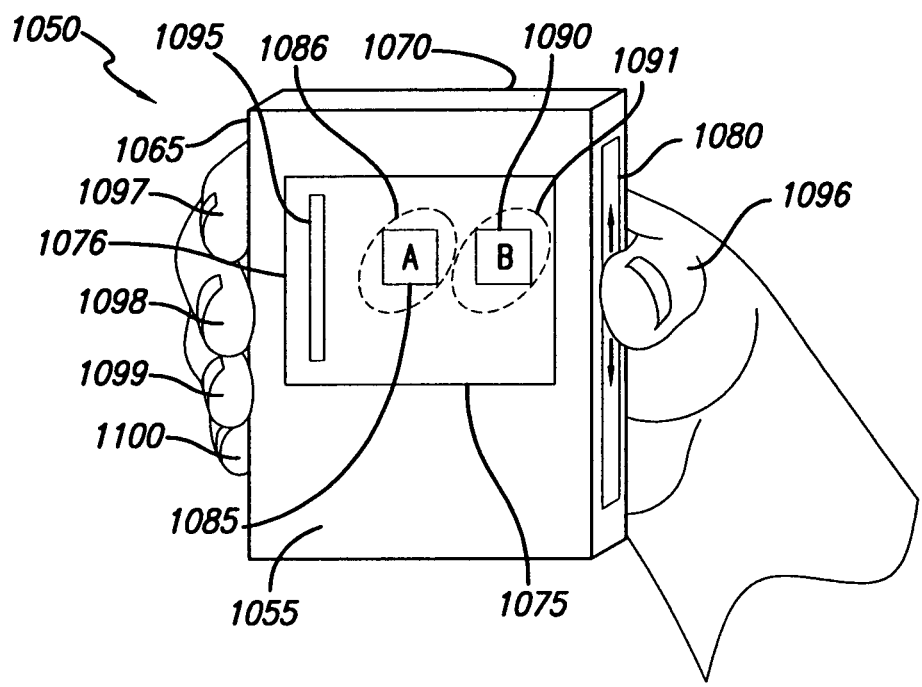

FIGS. 26A and 26B illustrate a device for implementing the touch-based method 1000 of FIG. 25. FIGS. 26A and 26B illustrate a device 1050 having a plurality of touch sensitive surfaces. The touch sensitive surfaces have been positioned on the device to enable the detection of a set of gestures, such as grasping. Specifically, a touch sensitive display 1075 can be positioned on the front surface 1055 of the device 1050, a touch sensitive strip or pads 1080 can be placed on the right surface 1060 of the device 1050 and similar strips or pads (not shown) can be placed on the left surface 1065 and back side 1070 of the device 1050. The placement of these four touch sensitive surfaces allow the detection of a new set of gestures, such as a right hand grasp, that would not be easily detected if the device only had the touch sensitive display 1075.

Display 1075 can display a number of object or graphical user elements as shown, such as virtual buttons 1085 and 1090 and scroll bar 1095.

FIG. 26A shows device 1050 in its default state where the device is to be held by the left hand. In this mode of use, scroll bar 1095 can be conveniently placed to the right of touch sensitive display 1075. Moreover, the device can have its sensors calibrated for detecting an operation of virtual buttons 1085 and 1090 by fingers of the right hand. This is shown in FIG. 26A by the dotted lines 1086 and 1091 which show a sensor orientation tilted to the left corresponding to a finger operation with the right hand.

FIG. 26B shows device 1050 being held by the user's right hand. The device can detect the presence of the thumb 1096 on touch sensitive strip 1080 on the right surface 1060 of the device 1050. The device can also detect at the same time the presence of four fingers 1097-1100 on the corresponding touch sensitive strip on the left surface 1065 of the device 1050. Based on this pattern of touches on the right and left surfaces, device 1050 can determine that the device is being grasped by the right hand and that the mode of use is left handed, given that the fingers of the left hand is free for performing operations.

Device 1050 can be then configured for the left hand mode of use. As illustrated in FIG. 26B, scroll bar 1095 can be placed on the left side of display 1075. This can be more convenient for a left hand operation as the user does not have to cross over the display to perform scrolling operations. The positions of virtual buttons 1085 and 1090 can be also changed to provide for more efficient operations. Moreover, the sensors for detecting an operation of virtual buttons 1085 and 1090 can be recalibrated for an operation by the fingers of the left hand. This is shown in FIG. 26B by the dotted lines 1086 and 1091 which show a sensor orientation tilted to the right corresponding to a finger operation with the left hand. It should be noted the memory of the device can store a multiple calibrations based on possible gestures such as a right hand grasp. Once the mode of use is determined, the appropriate calibration is quickly retrieved from the device's memory.

Such configurations are not limited to displayed items on a display. The device can be configured to recognize and respond to additional gestures for operating the device once the mode of use is determined by a hand grasping gesture. For example, once it is determined that the right hand is grasping the device 1050 as illustrated in FIG. 26B, the device can be configured so that it recognizes the movement of thumb 1096 along the right surface 1080. That is, the sensors for the touch sensitive surface 1080 on the left surface 1060 can be recalibrated to detect vertical up and down gestures near where the thumb 1096 is placed as indicated by the arrows in FIG. 26B. The recognized gesture can be used to provide additional operational capability. For example, the up and down gesture of thumb 1096 can act as virtual scroll wheel similar in operation to the displayed scroll 1095.

Another example is page flipping. Once it is determined that the right hand is grasping the device 1050 as illustrated in FIG. 26B, the device can be configured to recognize a swipe or touch of the finger on the right side (opposite to edge 1076) of the display 1075 as an act of page flipping, similar to how one would hold a small book and flip pages with the left hand. The sensors near the right side of the display can be calibrated to detect such a gesture and the device operates to change the screen or objects displayed on the screen as if the user is flipping through them.

In this manner, the placement of plurality of touch sensitive surfaces can enables the detection of a new set of gestures, such as a grasp by a right hand or left hand, that can be used to efficiently configure the device for use and can enable even further gestures for operating the device. It should be noted that FIGS. 26A and 26B show segmented touch sensitive surfaces, but the device can have a continuous touch sensitive strip running around a portion of the device or covering the entire device.

While FIGS. 26A-26B relate to a mode of use based on which hand the device is grasped, there can be other modes of use. For example, another mode of use can be orientation. The orientation of a device can be determined based on detecting how the device is grasped. For example, if the device detects two thumbs being placed near the edge 1076 of display 1075 in FIG. 26A, such data can be used to determine that the user is holding device 1050 along its length as opposed to its width as shown in FIG. 26A.

Based on this mode of use, e.g., a length-wise orientation, the device can be configured. For example, virtual buttons 1085 and 1090 and scroll bar 1095 can be rotated to match the new orientation. The buttons and scroll bar can also be positioned near the edge 1076 of the display so that the user can easily access them with his thumbs. Moreover, because the presence of two thumbs on the display indicates that the device is being held by two hands as opposed to one, the sensors for the buttons and the scroll bar can be recalibrated to detect either an operation by a finger of the right hand or by a finger of the left hand.

It should be noted that the new set of gestures enabled by the placement of one or more touch sensitive surfaces on a device can be dynamic. For example, the user can pinch the device on two touch sensitive surfaces and spin the device. As the device spins, the images of the fingers on the touch sensitive surfaces rotate. Touch data based on the rotation can be used to determine the mode of use, such as pinched rotating grasp, and the device can be configured based on the direction of the rotation of the device and its final orientation.

Touch sensitive surfaces do not have to be placed on more than one surface of a device to enable the set of gestures, such as grasping, for configuring the operation of the device. Such gestures can be enabled by placing a single touch sensitive surface along a single surface of the device. For example, a touch sensitive surface can be wrapped around a lens of a camera, thereby enabling gestures for configuring the operation of the camera and for operating the camera.

Figure 27:
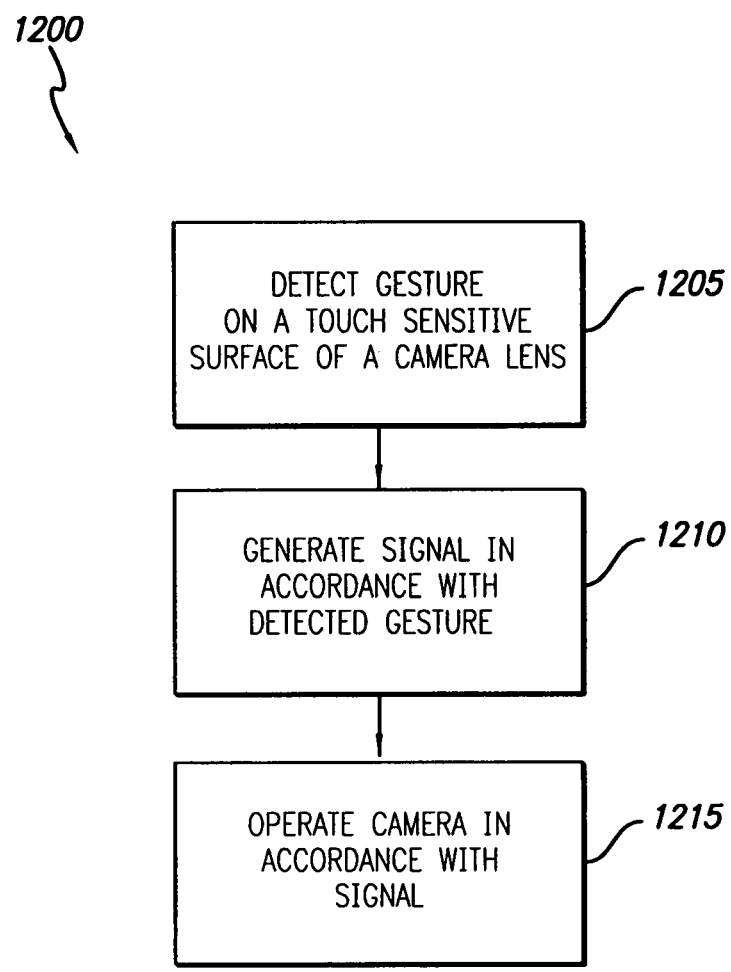
FIG. 27 is a diagram of a touch-based method in accordance with an exemplary embodiment of this invention.

FIG. 27 is a diagram of a touch-based method to be implemented with a camera. The method 1200 begins at block 1205 with a detection of a gesture on a touch sensitive surface on a camera lens. The detection of the gesture can be performed in the manner discussed above. Images of the gesture can be captured and analyzed to detect one or more touches performed on the lens of the camera. The camera at block 1210 can then generate a signal in accordance with the detected touch. The camera can be then operated at block 1215 based on the generated signal.

FIGS. 28A-28D illustrate a sequence and device for implementing method 1200 of FIG. 27. FIGS. 28A-28D illustrate camera 1250 having lens 1255. A touch sensitive surface 1260 can be wrapped around the lens to detect gestures performed on the surface.

Figures 28A, 28B:
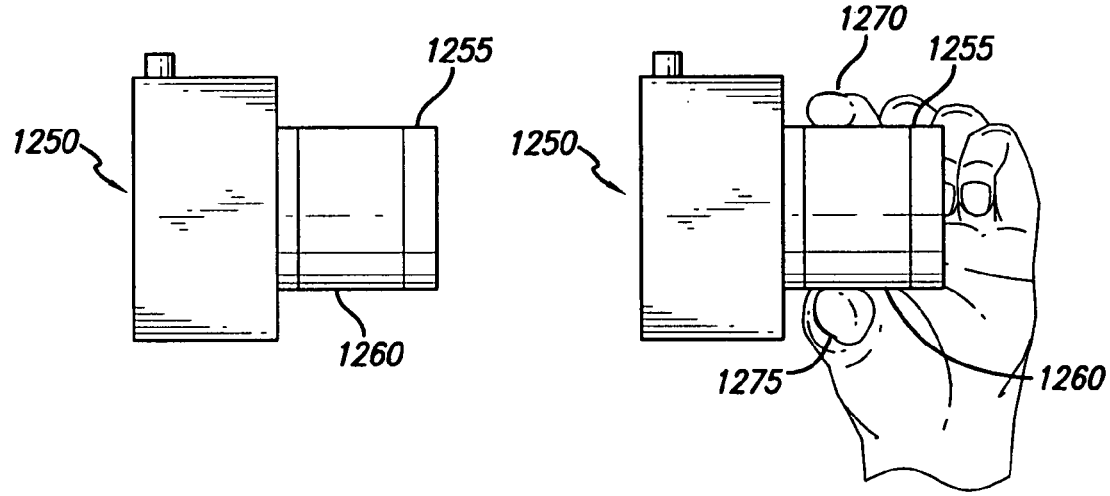
FIGS. 28A-28D illustrate a sequence and a device for implementing the touch-based method of FIG. 27.

The placement of the touch sensitive surface 1260 around the lens can enable the detection of gestures for configuring the operation of the camera and for operating the camera. For example, FIG. 28B illustrates the user grasping the lens with his left index finger 1270 and his left thumb 1275. The two-fingered grasp can be used to configure the device, for example, to set the mode of operation relating to exposure. The grasp can then be used to operate the camera. For example, if the index finger 1270 is slid forward around the circumference of the lens, the aperture of the camera can open incrementally. If the index finger 1270 is slid backwards around the circumference of the lens, the grasp can be used to close the aperture incrementally.

Figures 28C, 28D:
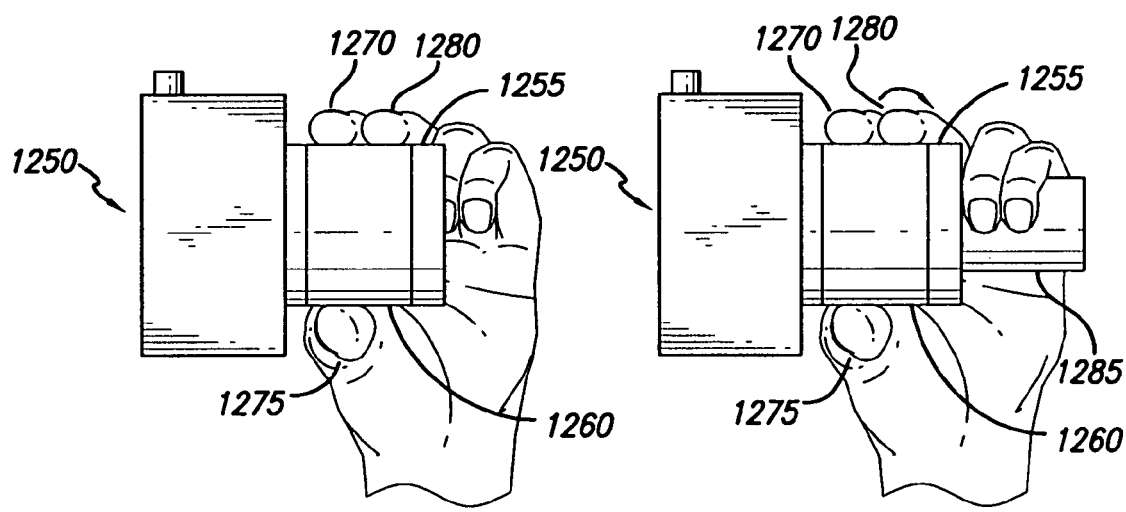

Once the user has completed his exposure operation, he can simply change the mode of operation by changing the number of fingers touching surface 1260 as reflected through his grasp. For example, FIG. 28C illustrates the user additionally placing the middle finger 1280 on touch sensitive surface 1260. This three-fingered grasp can be used, for example, to set the mode of operation relating to zooming or focusing. In the zooming mode, any of the gestures described above can be used to operate the camera. For example, FIG. 28D shows the middle finger 1280 rolling to the right as indicated by the illustrated arrow. This gesture can perform a telephoto operation with the extension of lens 1285. A roll of middle finger 1280 in the other direction can be used to perform a wide angle operation.

In this way, the placement of a touch sensitive surface around the lens of a camera can enable a set of gestures that can be used to configure the operation of the camera and to operate the camera. The surface can be used to detect a gesture, such as the number of fingers in a grasp, to set or change the mode of operation of the camera. That gesture can be combined with other gestures, such as a rolling gesture of one of the fingers performing the grasp, to operate the camera in that mode. For example, once the zoom mode is set with a three-finger grasp, a roll of one of the three fingers can operate the telephoto and wide angle operation.

Figure 29:
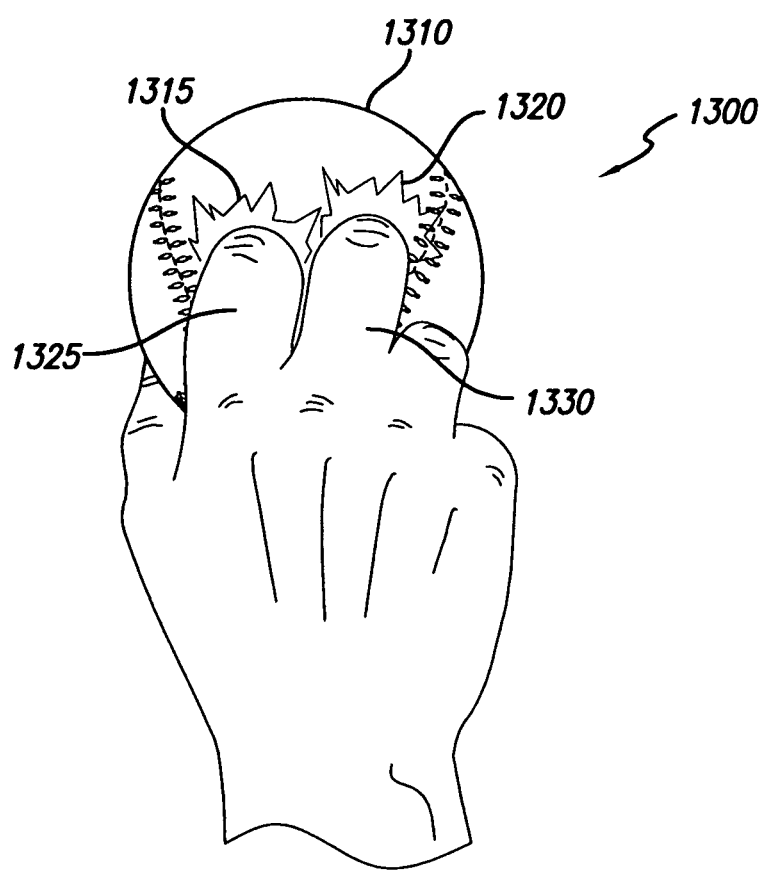
FIG. 29 illustrates a baseball having a touch sensitive surface in accordance with an exemplary embodiment of this invention.

Another example can be the placement of a touch sensitive surface on a gaming object. The surface enables gestures that can be used to configure the operation of the object and its use. FIG. 29 illustrates an exemplary embodiment with a baseball 1300 as part of a video gaming system. The baseball can have a touch sensitive surface 1310 placed on the entire surface of the ball, or part of the surface. The surface can enable gestures that can be used to configure the operation of the baseball and its use. For example, the detection of three fingers on the touch sensitive surface, including fingers 1325 and 1330 at 1315 and 1320, can be used to indicate to the video gaming system that the ball has been grasped and is ready for use. The detection of the two fingers 1325 and 1330 can be further analyzed to detect the type of pitch. In this case, the detection of the placement of the knuckles of fingers 1325 and 1330 can be used to signal to the video gaming system that the user has selected a knuckleball.

Another example in which a touch sensitive surface can be placed on an object can be a musical instrument. The surfaces can be placed on keys or the like to enable gestures relating to the operation of the instrument.

Many alterations and modifications can be made by those having ordinary skill in the art without departing from the spirit and scope of the invention. Therefore, it must be understood that the illustrated embodiments have been set forth only for the purposes of example and that they should not be taken as limiting the invention as defined by the following claims. For instance, although many of the embodiments of the invention are described herein with respect to personal computing devices, it should be understood that the present invention is not limited to desktop or laptop computers, but is generally applicable to other computing applications such as mobile communication devices, standalone multimedia reproduction devices, etc.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements can be made for any one of the elements in the claims below or that a single element can be substituted for two or more elements in a claim.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined claim elements.

The claims are thus to be understood to include what is specifically illustrated and described above, what is conceptually equivalent, and what can be obviously substituted. For instance, the term "computer" or "computer system" as recited in the claims shall be inclusive of at least a desktop computer, a laptop computer, or any mobile computing device such as a mobile communication device (e.g., a cellular or WiFi/Skype phone, e-mail communication devices, personal digital assistant devices), and multimedia reproduction devices (e.g., iPod, MP3 players, or any digital graphics/photo reproducing devices).

What is claimed is:

1. A computer implemented method for performing operations on a device having a touch sensitive display, said method comprising:
    determining a number of fingers touching the display;
    detecting a rolling gesture at a surface of the display by one or more fingers, the rolling gesture including lifting a portion of the one or more fingers previously touching the surface of the display off the display, and placing a portion of the one or more fingers previously above the surface of the display onto the display;
    associating the rolling gesture with an object displayed on the display;
    determining a parameter of the rolling gesture;
    performing at least one operation on the object based on the parameter of the rolling gesture; and
    changing a rate of the at least one operation dynamically in response to a detected change in a number of fingers touching the surface of the display during the rolling gesture.

2. The computer implemented method of claim 1, wherein determining a parameter of the rolling gesture comprises determining a direction of the rolling gesture.

3. The computer implemented method of claim 2 wherein performing at least one operation on the object based on the parameter of the rolling gesture comprising scrolling in the direction of the rolling gesture.

4. The computer implemented method of claim 3 wherein determining a parameter of the rolling gesture further comprises determining a magnitude of the rolling gesture.

5. The computer implemented method of claim 4 wherein performing at least one operation on the object based on the parameter of the rolling gesture further comprises scrolling in the direction of the rolling gesture at a speed based on the magnitude of the rolling gesture.

6. The computer implemented method of claim 1, further comprising:
    detecting a second gesture at the surface of the display by the one or more fingers; and
    performing the at least one operation on the object based on the detected second gesture.

7. The computer implemented method of claim 6 wherein detecting a second gesture at the surface of the display comprises detecting a difference in distance between at least two of the fingers; and performing at least one operation on the object based on the detected second gesture comprises changing the scale of the object based on the detected distance.

8. The computer implemented method of claim 6 wherein said detecting a rolling gesture is simultaneous in time with said detecting a second gesture.

9. The computer implemented method of claim 1 wherein associating the rolling gesture with an object comprises determining whether the detected rolling gesture is positioned over the object on the display.

10. A computer system comprising:
a touch sensitive display;
means for determining a number of fingers touching the display;
means for detecting a rolling gesture at a surface of the display by one or more fingers, the roll including lifting a portion of the one or more fingers previously touching the surface of the display off the display, and placing a portion of the one or more fingers previously above the surface of the display onto the display;
means for associating the rolling gesture with an object displayed on the display;
means for determining a parameter of the rolling gesture;
means for performing at least one operation on the object based on the parameter of the rolling gesture; and
changing a rate of the at least one operation dynamically in response to a detected change in a number of fingers touching the surface of the display during the rolling gesture.

11. The computer system of claim 10 wherein the computer system is a mobile telephone.

12. The computer system of claim 10 wherein the computer system is a digital media player.

13. A method of using a first device to control a second device, said method comprising:
determining a number of fingers touching a touch sensitive display surface of the first device:
detecting a rolling gesture by one or more fingers on the touch sensitive display surface of the first device, the rolling gesture including lifting a portion of the one or more fingers previously touching the surface of the device off the device, and placing a portion of the one or more fingers previously above the surface of the device onto the device;
determining a parameter of the roll;
generating a signal according to the determined parameter;
transmitting the generated signal from the first device to the second device;
controlling the second device according to the transmitted signal; and
changing a rate of the at least one operation dynamically in response to a detected change in a number of fingers touching the surface of the display during the rolling gesture.

14. The method of claim 13 wherein determining a parameter of the rolling gesture comprises determining a direction of the rolling gesture.

15. The method of claim 14 wherein controlling the second device comprises directing the second device in the direction of the rolling gesture.

16. The method of claim 15 wherein determining a parameter of the rolling gesture further comprises determining a magnitude of the rolling gesture.

17. The method of claim 13 further comprising
detecting a second gesture by the one or more fingers on the touch sensitive display surface of the first device;
generating a second signal according to the second gesture;
transmitting the generated second signal to the second device; and
adjusting control of the second device based on the generated second signal.

18. The method of claim 17 wherein
detecting a second gesture comprises detecting a push by the one or more fingers; and
adjusting control of the second device comprises directing the second device in a direction opposite to the direction of the rolling gesture.

19. The method of claim 13 wherein
transmitting the generated signal comprises transmitting the generated signal wirelessly from the first device to the second device.

* * * * *